US012514938B2

(12) United States Patent
Schultz et al.

(10) Patent No.: US 12,514,938 B2
(45) Date of Patent: *Jan. 6, 2026

(54) FIBROBLAST ACTIVATION PROTEIN TARGETING PEPTIDES

(71) Applicant: PERSPECTIVE THERAPEUTICS, INC., Seattle, WA (US)

(72) Inventors: Michael K. Schultz, Coralville, IA (US); Mengshi Li, Coralville, IA (US); Brianna S. Cagle, Coralville, IA (US); Nicholas Baumhover, Coralville, IA (US); Ivy Vance, Coralville, IA (US); Dijie Liu, Coralville, IA (US); Samuel Rodman, III, Coralville, IA (US)

(73) Assignee: Perspective Therapeutics, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/930,419

(22) Filed: Oct. 29, 2024

(65) Prior Publication Data

US 2025/0186632 A1 Jun. 12, 2025

Related U.S. Application Data

(63) Continuation of application No. 18/767,232, filed on Jul. 9, 2024, which is a continuation of application No. 18/537,730, filed on Dec. 12, 2023.

(51) Int. Cl.
*A61K 51/08* (2006.01)
*A61K 47/64* (2017.01)
*A61P 35/00* (2006.01)

(52) U.S. Cl.
CPC .............. *A61K 51/08* (2013.01); *A61K 47/64* (2017.08); *A61P 35/00* (2018.01)

(58) Field of Classification Search
CPC .......... A61K 51/08; A61K 47/64; A61P 35/00
See application file for complete search history.

(56) References Cited

U.S. PATENT DOCUMENTS

| | | |
|---|---|---|
| 4,559,157 A | 12/1985 | Smith et al. |
| 4,608,392 A | 8/1986 | Jacquet et al. |
| 4,820,508 A | 4/1989 | Wortzman |
| 4,992,478 A | 2/1991 | Geria |
| 9,346,814 B2 | 5/2016 | Jansen et al. |
| 2004/0214762 A1 | 10/2004 | Demuth et al. |
| 2008/0280856 A1 | 11/2008 | Cohen et al. |
| 2018/0022822 A1 | 1/2018 | Brokopp et al. |
| 2019/0298865 A1 | 10/2019 | Cuthbertson et al. |
| 2020/0330624 A1* | 10/2020 | Yang ................. A61K 51/0455 |
| 2021/0379190 A1 | 12/2021 | Bachovchin et al. |
| 2023/0105190 A1 | 4/2023 | Chen et al. |

FOREIGN PATENT DOCUMENTS

| | | | | |
|---|---|---|---|---|
| EP | 3763726 | 1/2021 | | |
| WO | 2006042282 | 4/2006 | | |
| WO | 2008116054 | 9/2008 | | |
| WO | 2010036814 | 4/2010 | | |
| WO | 2012020006 | 2/2012 | | |
| WO | 2019154886 | 8/2019 | | |
| WO | WO-2019154886 A1 * | 8/2019 | ......... | A61K 51/0459 |
| WO | 2021005131 | 1/2021 | | |
| WO | 2021234181 | 11/2021 | | |
| WO | 2023202655 A1 | 10/2023 | | |

OTHER PUBLICATIONS

Spatola "Peptide Backbone Modifications: A Structure-Activity Analysis of Peptides Containing Amide Bond Surrogates, Conformational Constraints and Rela," (1983) in Chemistry and Biochemistry of Amino Acids, Peptides and Proteins, vol. 7, 93 pages, Marcel Dekker, N.Y.
Creighton, "Chemical Properties of Polypeptides," Proteins Structure and Molecular Properties, 2nd Ed., W. H. Freeman and Company, New York (1993), 31 pages.
Zboralski et al. "Preclinical evaluation of FAP-2286 for fibroblast activation protein targeted radionuclide imaging and therapy" European Journal of Nuclear Medicine and Molecular Imaging (2022) 49: 3651-3667.
Grindel et al "Matrilysin/matrix metalloproteinase-7(MMP7) cleavage of perlecan/HSPG2 creates a molecular switch to alter prostate cancer cell behavior," Matrix Biology, 36 (2014) pp. 64-76.
Xin et al. "Fibroblast Activation Protein-alpha as a Target in the Bench-to-Bedside Diagnosis and Treatment of Tumors: A Narrative Review," Front. Oncol. 11:648187, 16 pages, Aug. 2021.
Bandari et al. "Synthesis and biological evaluation of copper-64 radiolabeled [DUPA-6-Ahx-(NODAGA)-5-Ava-BBN(7-14)NH2], a novel bivalent targeting vector having affinity for two distinct biomarkers (GRPr/PSMA) of prostate cancer," Nucl Med Biol. 2014; 41(4):355-63.
Dumont et al. "Targeted radiotherapy of prostate cancer with a gastrin-releasing peptide receptor antagonist is effective as monotherapy and in combination with rapamycin," J Nucl Med. 2013; 54(5):762-769. Doi: 10.2967/jnumed.112.112169. PubMed PMID: 2349.
Gourni et al. "N-terminal modifications improve the receptor affinity and pharmacokinetics of radiolabeled peptidic gastrin-releasing peptide receptor antagonists: examples of 68Ga- and 64Cu-labeled peptides for PET imaging," J Nucl Med. 2014; 55(10):1719.
Jamous et al. "PEG spacers of different length influence the biological profile of bombesin-based radiolabeled antagonists," Nucl Med Biol. 2014; 41(6):464-470. Doi: 10.1016/j.nucmedbio.2014. 03.014. PubMed PMID: 24780298.
Mansi et al. "Evaluation of three different families of bombesin receptor radioantagonists for targeted imaging and therapy of gastrin releasing peptide receptor (GRPR) positive tumors," J Med Chem. 2015; 58(2):682-691. Doi: 10.1021/jm5012066. PubMed PMID.

(Continued)

*Primary Examiner* — Michael G. Hartley
*Assistant Examiner* — Jagadishwar R Samala
(74) *Attorney, Agent, or Firm* — Bryan Cave Leighton Paisner LLP

(57) ABSTRACT

The present invention relates to a fibroblast activation protein alpha (FAP)-targeting peptides A-[Z-$AA^1$-$AA^2$-$AA^3$-$AA^4$-$AA^5$-$AA^6$-$AA^7$-Z]-B. A is N-terminal structure. B is C-terminal structure, and each of the Z, $AA^1$, $AA^2$, $AA^3$, $AA^4$, $AA^5$, $AA^6$, $AA^7$ is a residue of an amino acid. The peptides can be linear or cyclized.

10 Claims, 44 Drawing Sheets

(56) References Cited

OTHER PUBLICATIONS

Pan et al. "A new (68)Ga-labeled BBN peptide with a hydrophilic linker for GRPR-targeted tumor imaging," Amino Acids. 2014; 46(6):1481-1489. Doi: 10.1007/s00726-014-1718-y. PubMed PMID: 24633452.
Reynolds et al. "Characterization and evaluation of DOTA-conjugated Bombesin/RGD-antagonists for prostate cancer tumor imaging and therapy," Nucl Med Biol. 2015; 42(2):99-108. Doi: 10.1016/j.nucmedbio.2014.10.002. PubMed PMID: 25459113.
Posttranslational Covalent Modification of Proteins, B. C. Johnson, Ed., Academic Press, New York, pp. 1-12 (1983).
Society of Nuclear Medicine and Molecular Imaging (SNMMI) Annual Meeting 2024, Abstract ID: 241158.

\* cited by examiner

VMT-FAP-2-26

VMT-FAP-2-30

VMT-FAP-2-42

VMT-FAP-2-43

VMT-FAP-2-33

VMT-FAP-2-36

VMT-FAP-2-39

VMT-FAP-2-48

VMT-FAP-2-51

VMT-FAP-2-53

VMT-FAP-2-55

VMT-FAP-2-57

VMT-FAP-2-59

VMT-FAP-2-60

VMT-FAP-2-61

VMT-FAP-2-62

VMT-FAP-2-67

VMT-FAP-2-68

VMT-FAP-2-69

VMT-FAP-2-70

VMT-FAP-2-72

VMT-FAP-2-74

VMT-FAP-2-75

VMT-FAP-2-76

VMT-FAP-2-77

VMT-FAP-2-78

VMT-FAP-82

VMT-FAP-2-83

GCI binding assay of VMT-FAP-2-59 in hPREP

Recombinant Human Prolyl Oligopeptidase/PREP Protein, CF

GCI binding assay of VMT-FAP-2-59 in hDPPIV

Human DPPIV / CD26 Protein, Fc Tag (active enzyme)

FIBROBLAST ACTIVATION PROTEIN TARGETING PEPTIDES

CROSS-REFERENCE TO RELATED APPLICATIONS

The present application is a continuation application of co-pending U.S. Non-Provisional patent application Ser. No. 18/767,232, filed on Jul. 9, 2024, which is a continuation application of U.S. Non-Provisional patent application Ser. No. 18/537,730, filed on Dec. 12, 2023, the contents of which applications are hereby incorporated by reference in their entireties.

BACKGROUND OF THE INVENTION

Fibroblast activation protein (FAP), also known as prolyl endopeptidase, is an enzyme that in humans is encoded by the FAP gene. FAP is a cell-surface serine protease that acts on various hormones and extracellular matrix components. FAP is highly upregulated in a wide variety of cancers, and is often used as a marker for pro-tumorigenic stroma. It has also been proposed as a molecular target of cancer therapies, and, especially in recent years, a great deal of research has gone into design and testing of diverse FAP-targeted treatments.

FAP is a 760 amino acid long type II transmembrane glycoprotein. It contains a very short cytoplasmic N terminal part (6 amino acids), a transmembrane region (amino acids 7-26), and a large extracellular part with an alpha/beta-hydrolase domain and an eight-bladed beta-propeller domain. FAP is a non-classical serine protease, and the active site is localized in the extracellular part of the protein which contains a catalytic triad composed of $Ser^{624}$ $Asp^{702}$ $His^{734}$ in humans and mice.

FAP expression is typically low to undetectable in most normal adult tissues, but is highly upregulated in a multitude of cancers, including almost all carcinoma and sarcoma. FAP in cancer cells or in cancer-associated fibroblasts of stroma tissue, including mesenchymal stem cells (MSCs), CAFs, sarcoma, and melanoma cells. FAP expression in also upregulated in non-cancer diseases and tissue remodeling, including stromal and mesenchymal stem cells during embryogenesis, wound healing, fibrotic reactions, arthritis, atherosclerotic plaques, and ischemic heart tissue after myocardial infarction.

The high expression of FAP in cancer microenvironment compared with adjacent normal tissue makes FAP an potential therapeutic target for drug delivery. Within this context, radiopharmaceutical targeting FAP is of particular potential. Radiopharmaceuticals are radiolabeled drugs that are used for imaging and therapy of disease. These drugs are designed of the form C-L-T, where C is a chelator that stably complexes (i.e., binds tightly) a radionuclide (e.g., Pb-212, Ac-225, Lu-177, Cu-64, Cu-67, Ga-68, Pb-203) that decays by various forms of radioactive decay modes (e.g., beta-particle emission, alpha-particle emission, positron emission, gamma-ray emission, auger electron emission); T is a targeting molecular structure (e.g., peptide, antibody, small molecule, aptamer) that is designed to bind to diseased cells, often by binding to a cell surface receptor (e.g., g-protein coupled receptor, type II glycoprotein, or other antigen, potentially expressed inside the cell); and L is a molecular linker that connects the chelator C to the binding moiety T.

The use of certain radionuclides that emit gamma rays enables imaging that is used often for diagnosing and monitoring of disease. Other radionuclides that emit particles, such as beta and alpha particles, are used for treating diseases, such as cancers. In some cases, the radionuclides intended for the treatment of cancer or other diseases, decay further to a series of radionuclide progeny (often referred to as daughter radionuclides or "daughters") that may or may not be complexed by the chelator. The preparation of radiopharmaceuticals involves a reaction of the C-L-T precursor with the radionuclide. Examples of radionuclides used for this purpose that have a series of daughter radionuclide progeny in their series includes Pb-212 and Ac-225.

There is a need in the industry for an effective means of treating cancer. The present inventors have discovered a means of treating cancer by targeting FAP through the use of unique radiolabeled compounds.

DETAILED DESCRIPTION OF THE DRAWINGS

FIG. 1 is a graph showing the % ID/g of VMT-FAP-2-26 in accordance with Example 1.
FIG. 2 is a graph showing the % ID/g of VMT-FAP-2-30 in accordance with Example 1.
FIG. 3 is a graph showing the % ID/g of VMT-FAP-2-42 in accordance with Example 1.
FIG. 4 is a graph showing the % ID/g of VMT-FAP-2-43 in accordance with Example 1.
FIG. 5 is a graph showing the % ID/g of VMT-FAP-2-33 in accordance with Example 1.
FIG. 6 is a graph showing the % ID/g of VMT-FAP-2-36 in accordance with Example 1.
FIG. 7 is a graph showing the % ID/g of VMT-FAP-2-39 in accordance with Example 1.
FIG. 8 is a graph showing the % ID/g of VMT-FAP-2-48 in accordance with Example 1.
FIG. 9 is a graph showing the % ID/g of VMT-FAP-2-51 in accordance with Example 1.
FIG. 10 is a graph showing the % ID/g of VMT-FAP-2-53 in accordance with Example 1.
FIG. 11 is a graph showing the % ID/g of VMT-FAP-2-55 in accordance with Example 1.
FIG. 12 is a graph showing the % ID/g of VMT-FAP-2-57 in accordance with Example 1.
FIG. 13 is a graph showing the % ID/g of VMT-FAP-2-59 in accordance with Example 1.
FIG. 14 is a graph showing the % ID/g of VMT-FAP-2-60 in accordance with Example 1.
FIG. 15 is a graph showing the % ID/g of VMT-FAP-2-61 in accordance with Example 1.
FIG. 16 is a graph showing the % ID/g of VMT-FAP-2-62 in accordance with Example 1.
FIG. 17 is a graph showing the % ID/g of VMT-FAP-2-67 in accordance with Example 1.
FIG. 18 is a graph showing the % ID/g of VMT-FAP-2-68 in accordance with Example 1.
FIG. 19 is a graph showing the % ID/g of VMT-FAP-2-69 in accordance with Example 1.
FIG. 20 is a graph showing the % ID/g of VMT-FAP-2-70 in accordance with Example 1.
FIG. 21 is a graph showing the % ID/g of VMT-FAP-2-72 in accordance with Example 1.
FIG. 22 is a graph showing the % ID/g of VMT-FAP-2-74 in accordance with Example 1.
FIG. 23 is a graph showing the % ID/g of VMT-FAP-2-75 in accordance with Example 1.
FIG. 24 is a graph showing the % ID/g of VMT-FAP-2-76 in accordance with Example 1.
FIG. 25 is a structural example of the sequence of VMT-FAP-2-26.

DETAILED DESCRIPTION OF THE INVENTION

Figure 1:
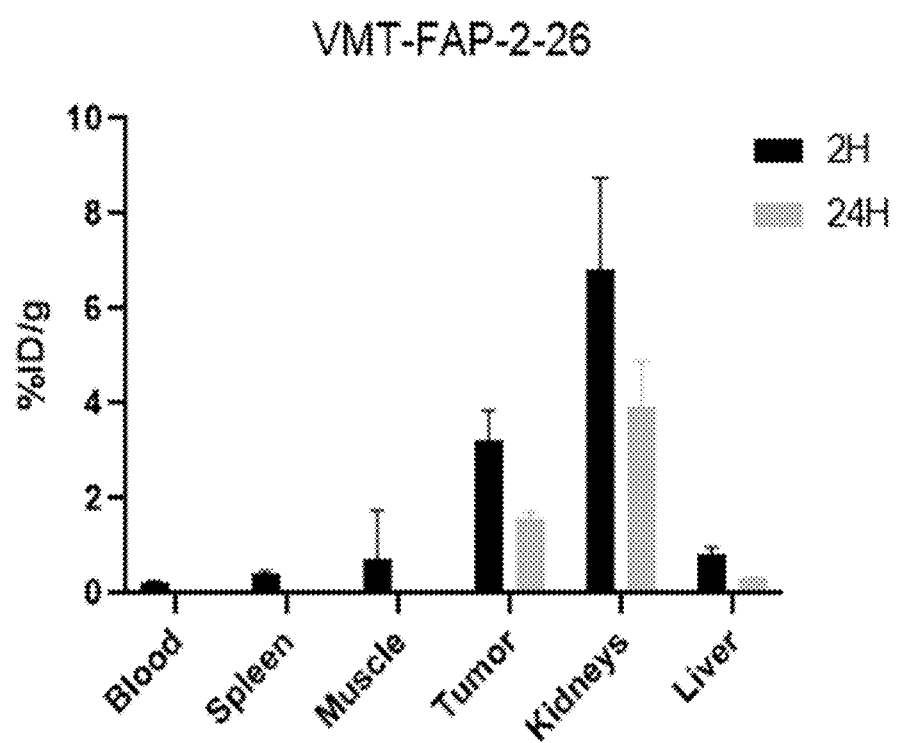
Figure 2:
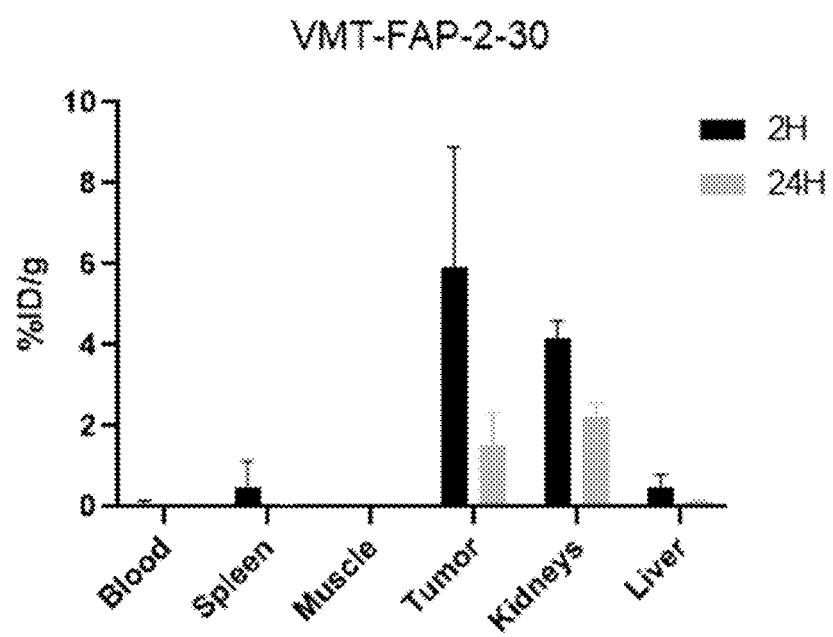
Figure 3:
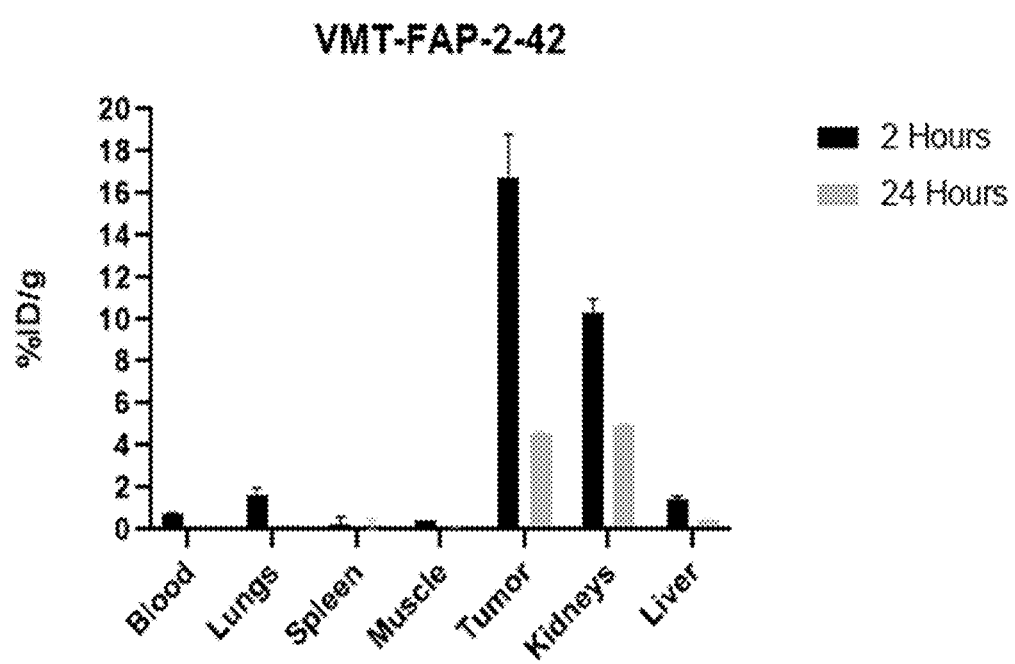
Figure 4:
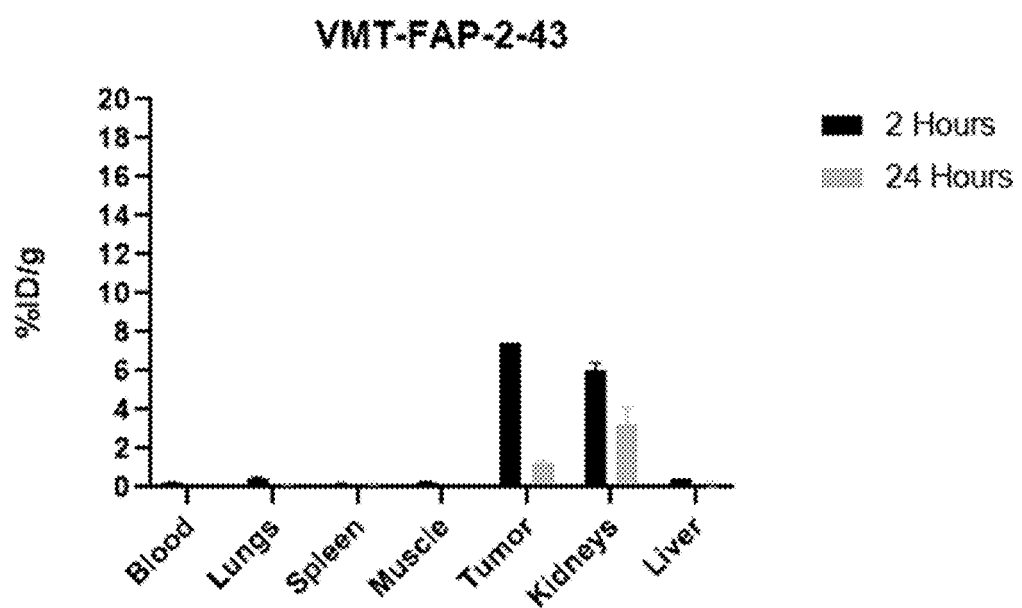
Figure 5:
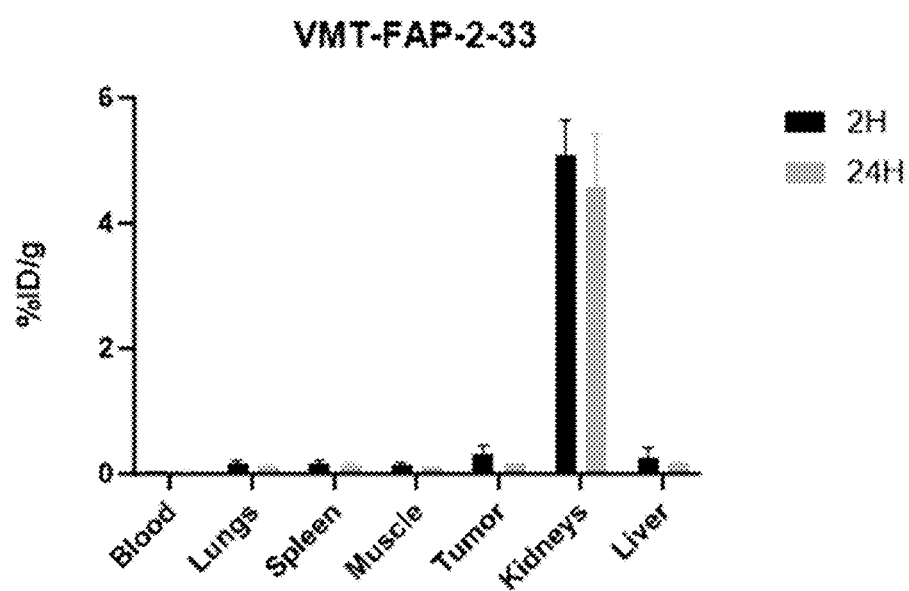
Figure 6:
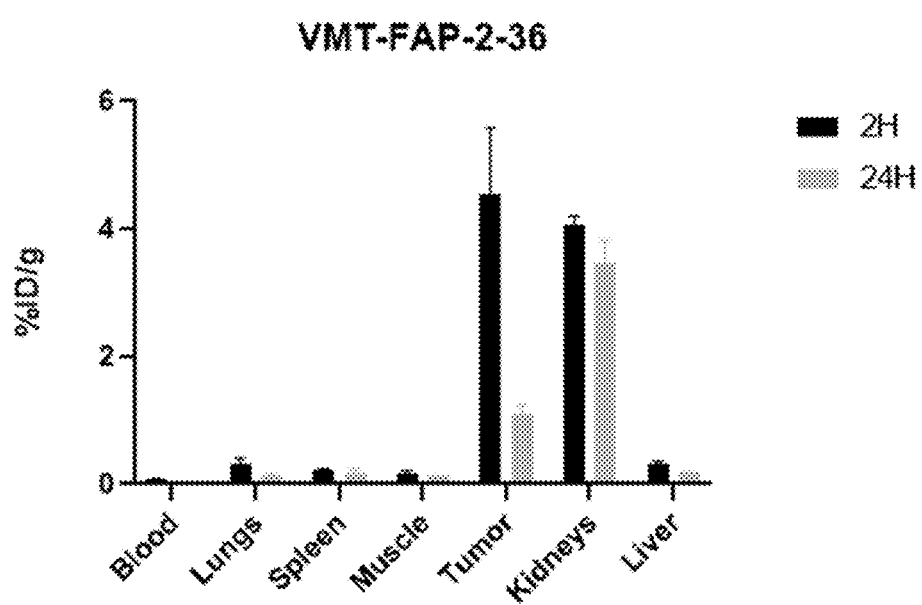
Figure 7:
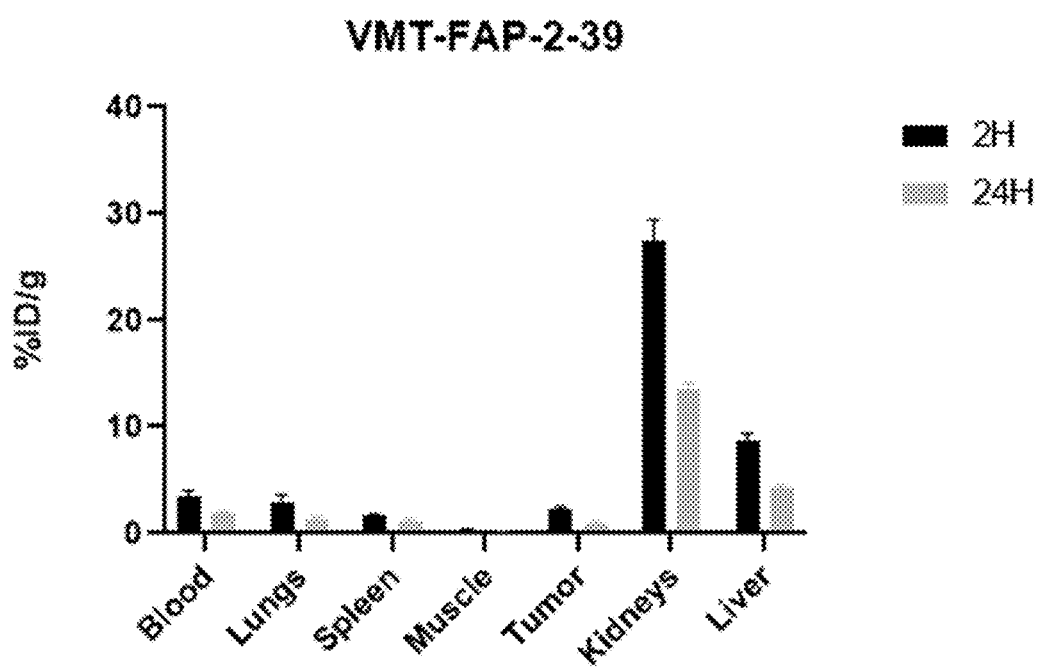
Figure 8:
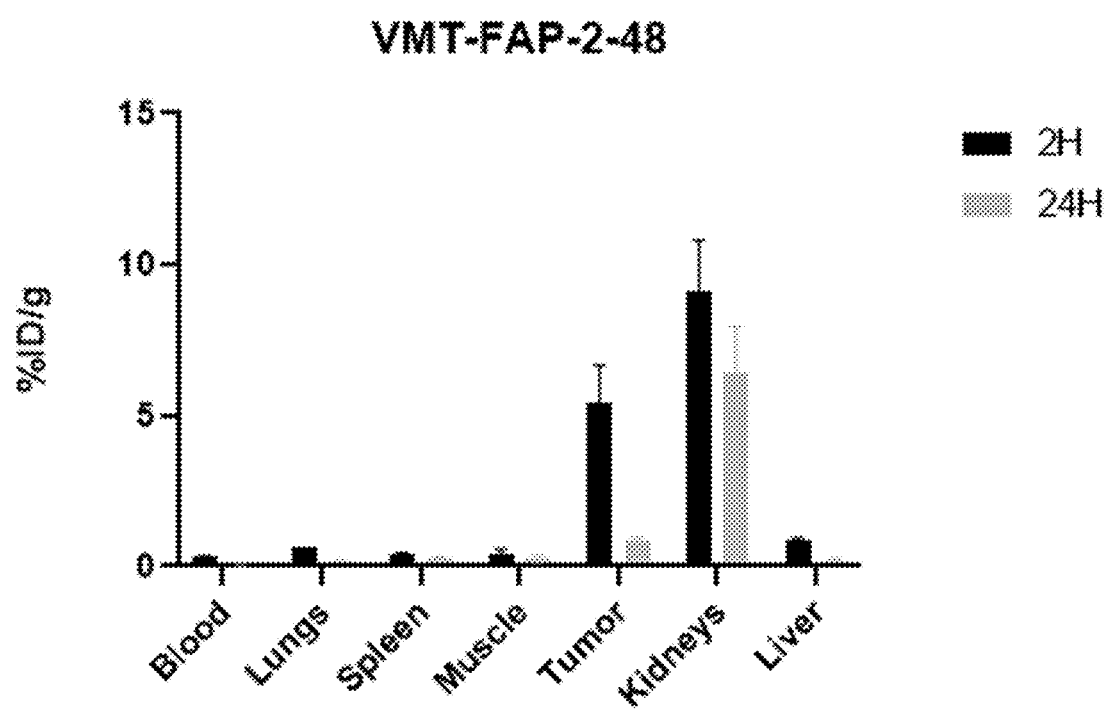
Figure 9:
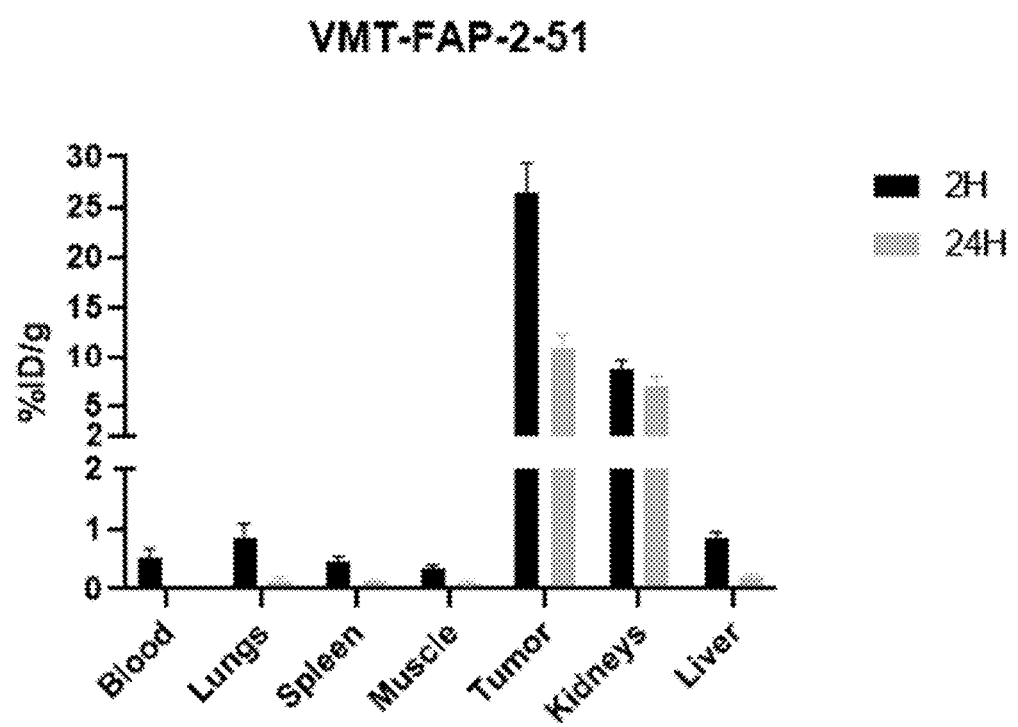
Figure 10:
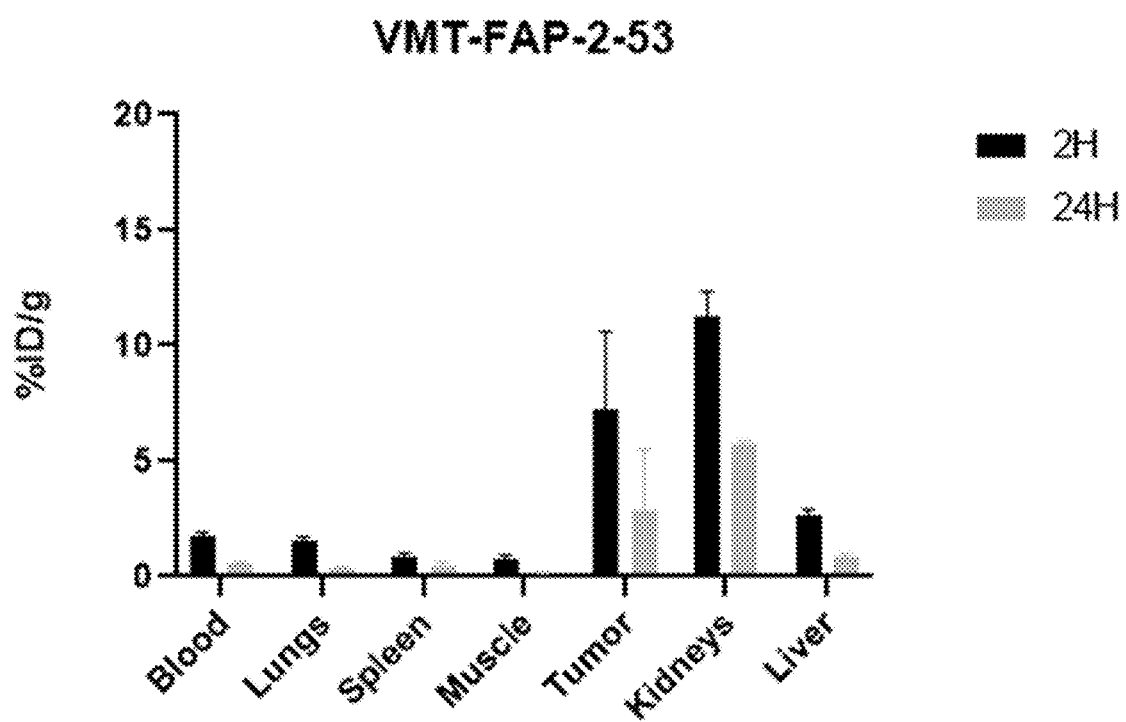
Figure 11:
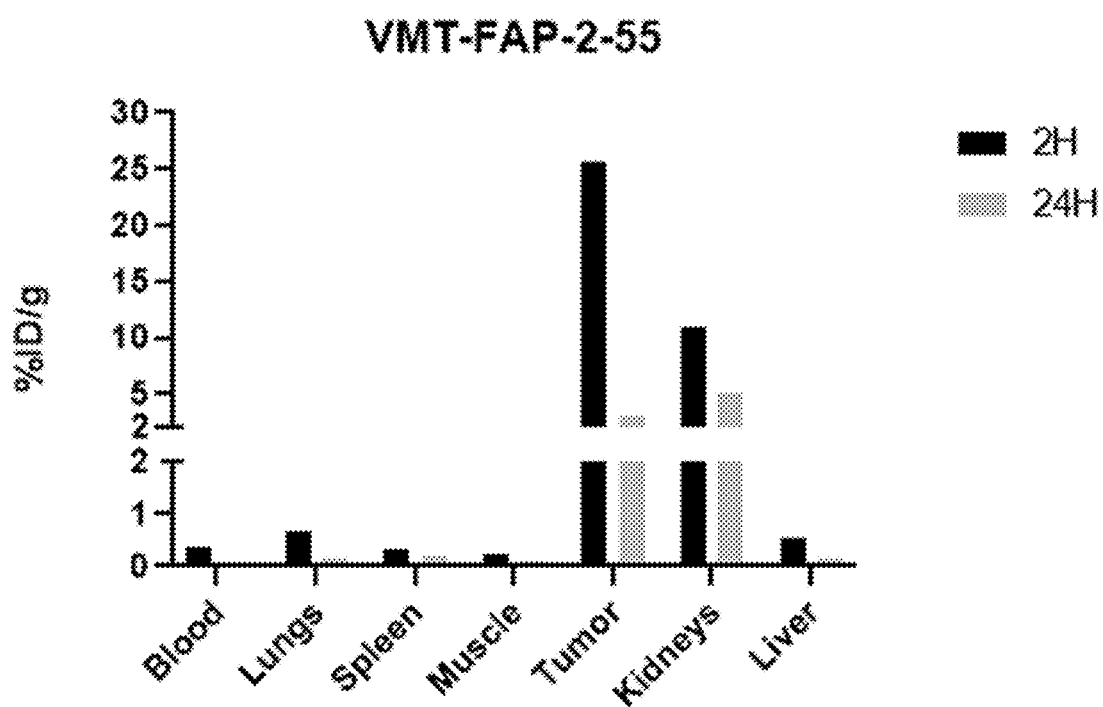
Figure 12:
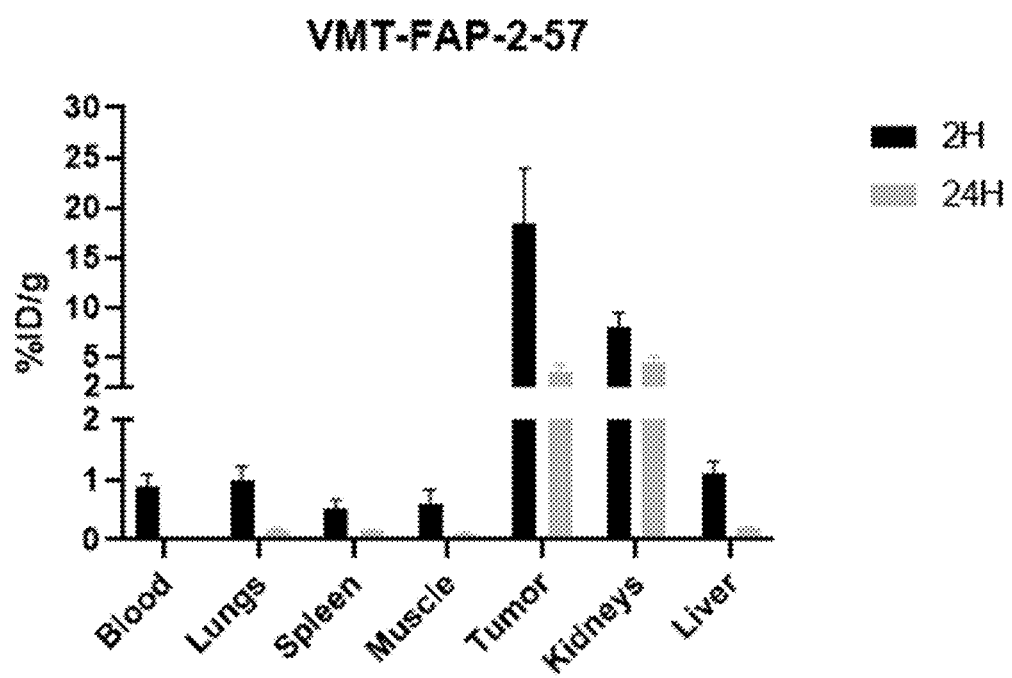
Figure 13:
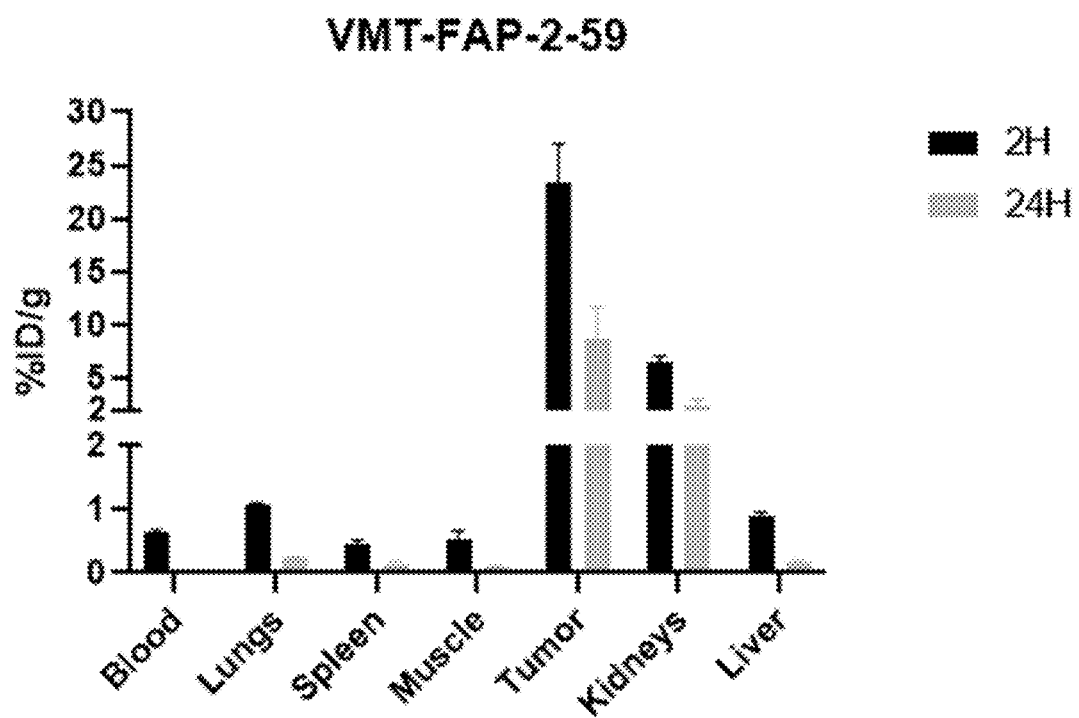
Figure 14:
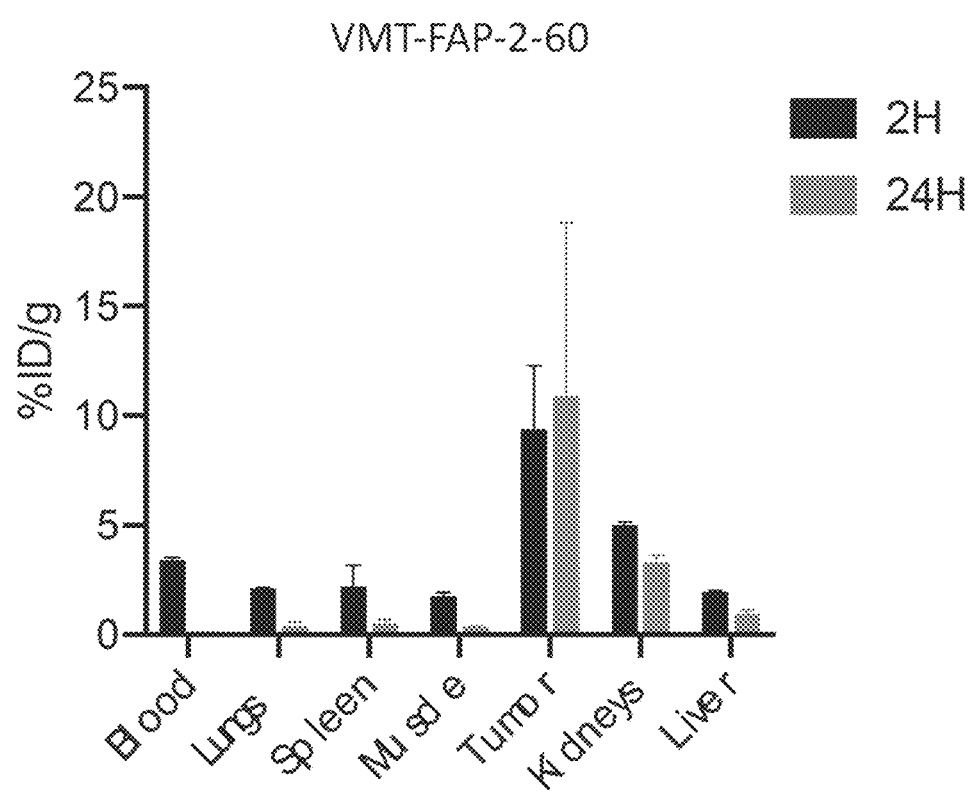
Figure 15:
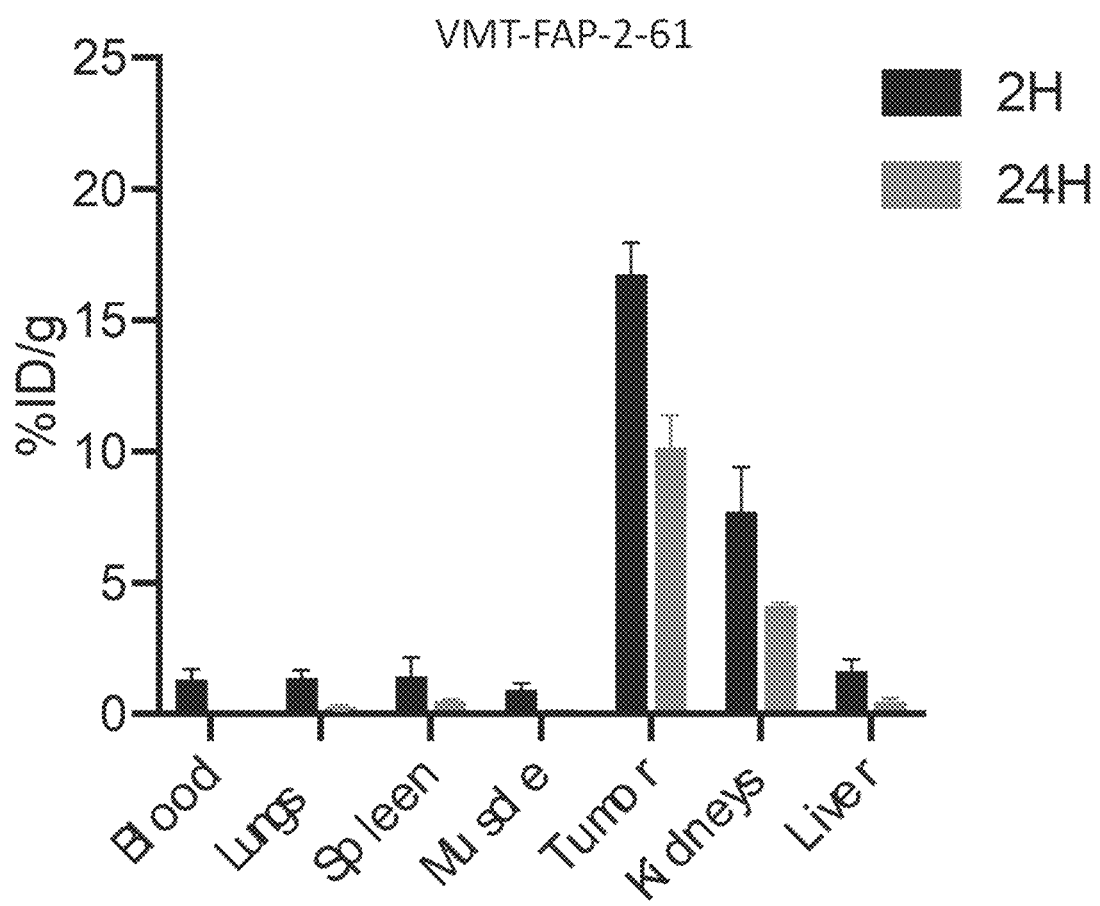
Figure 16:
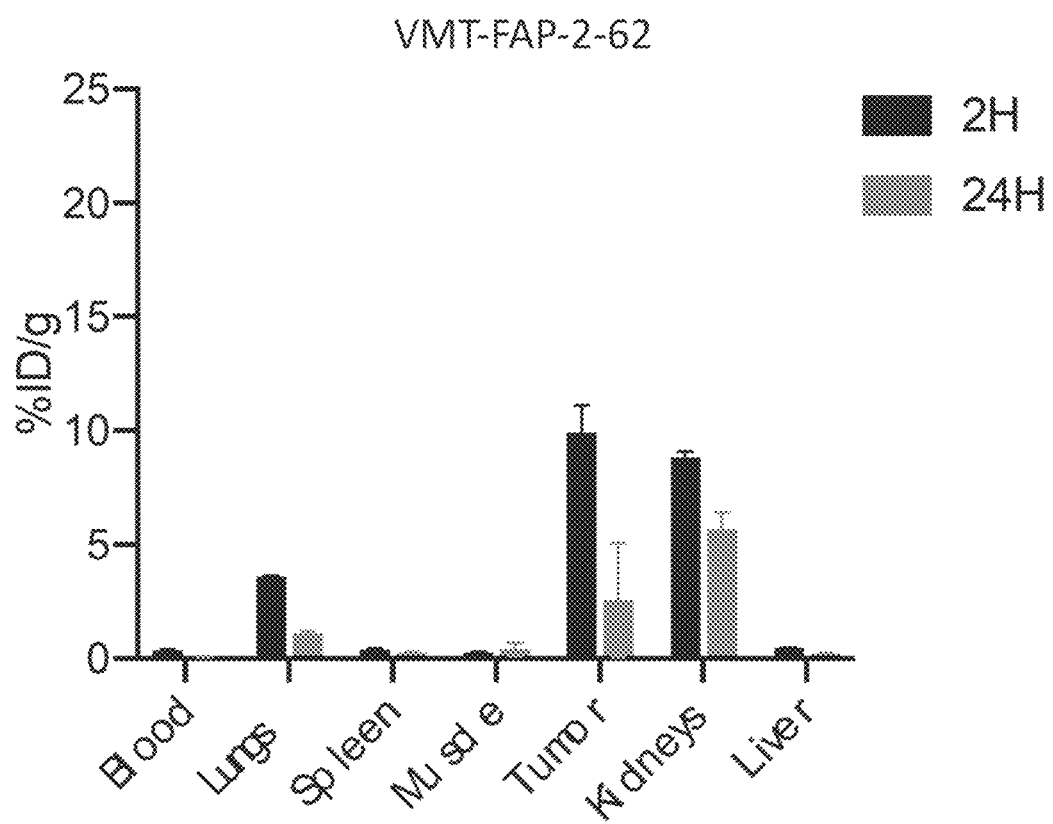
Figure 17:
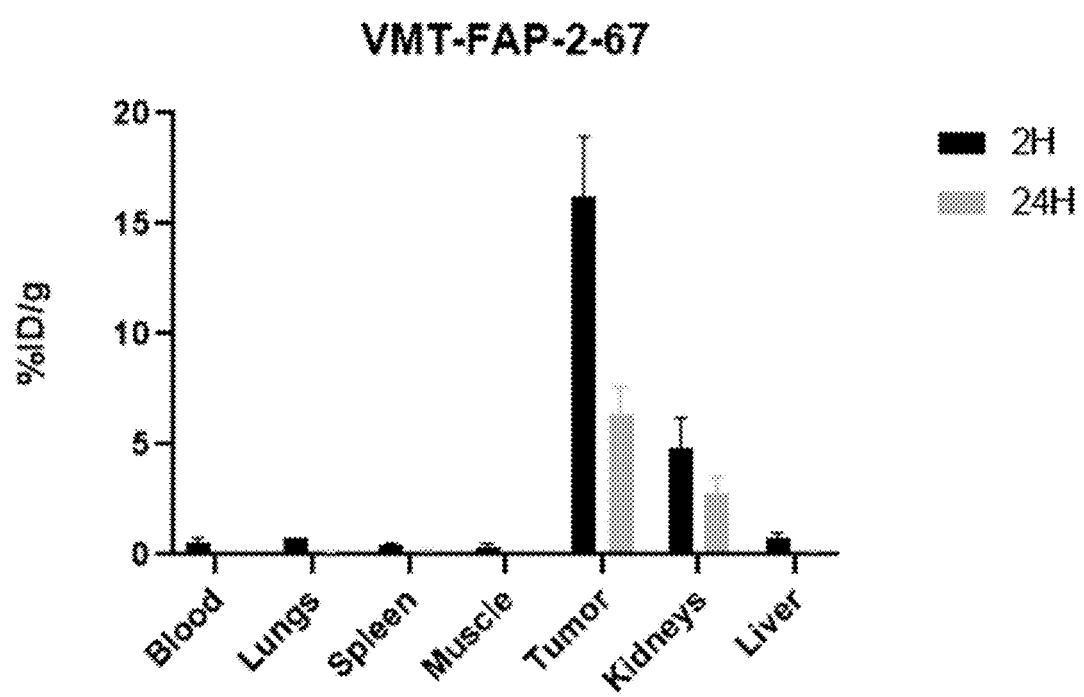
Figure 18:
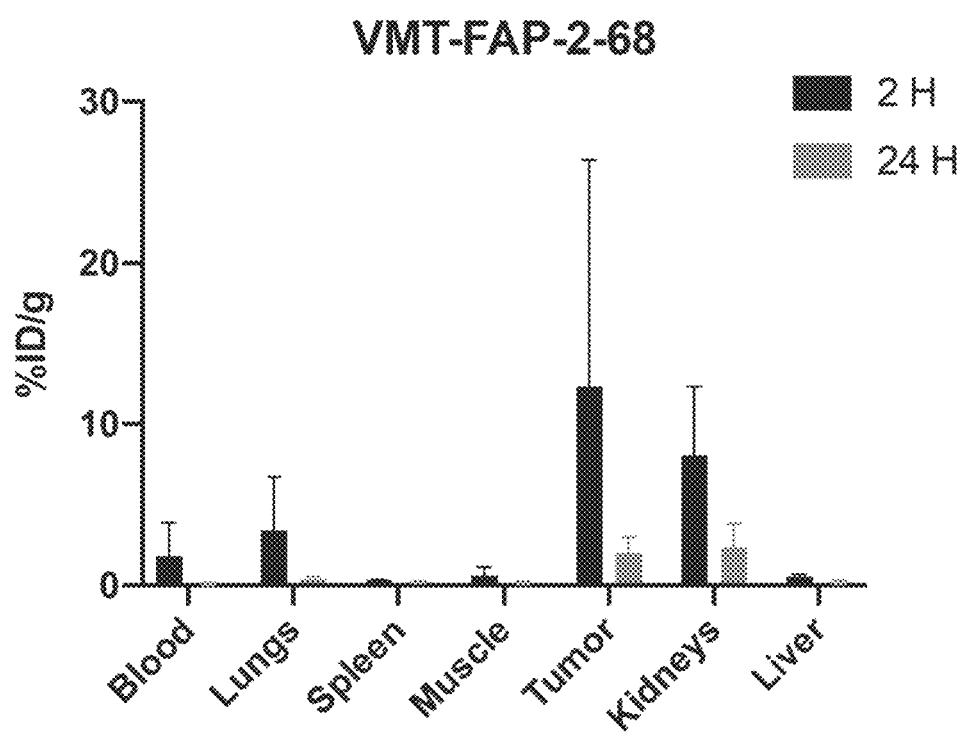
Figure 19:
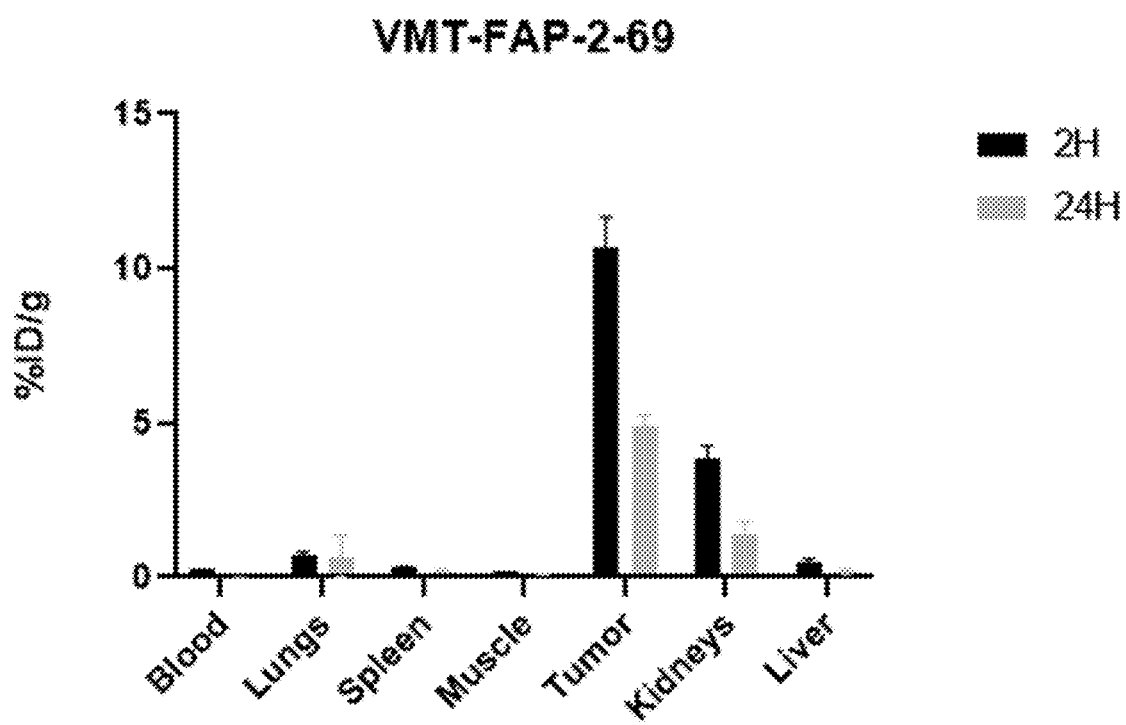
Figure 20:
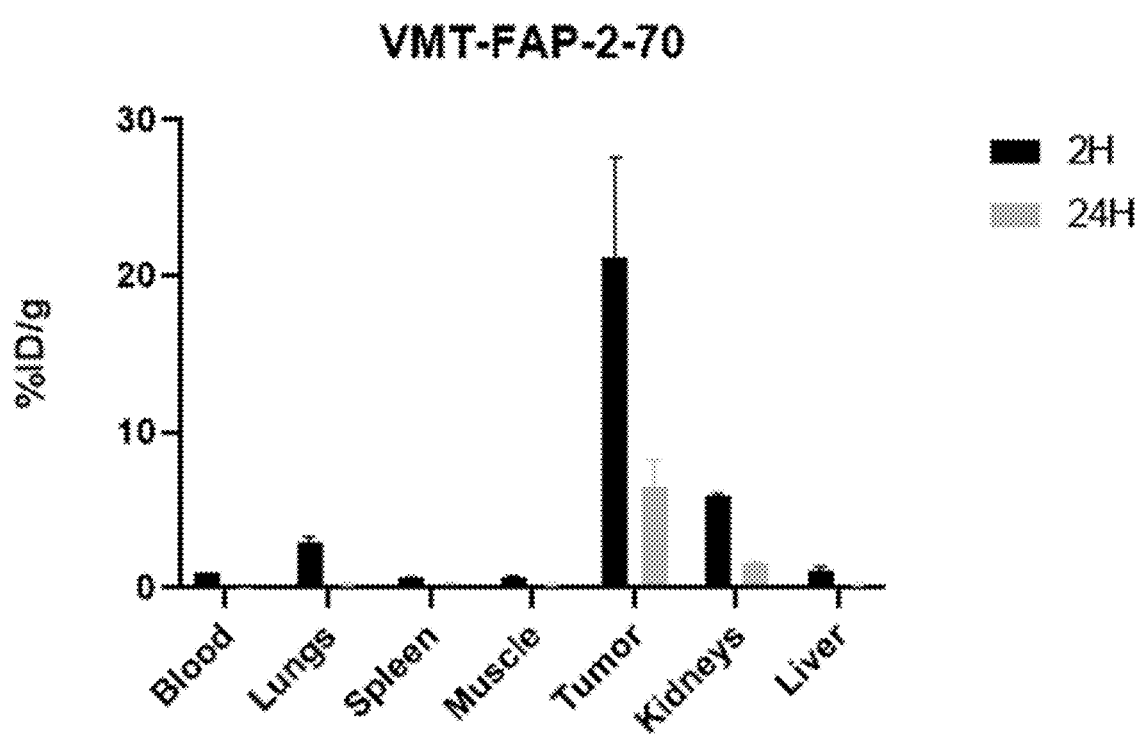
Figure 21:
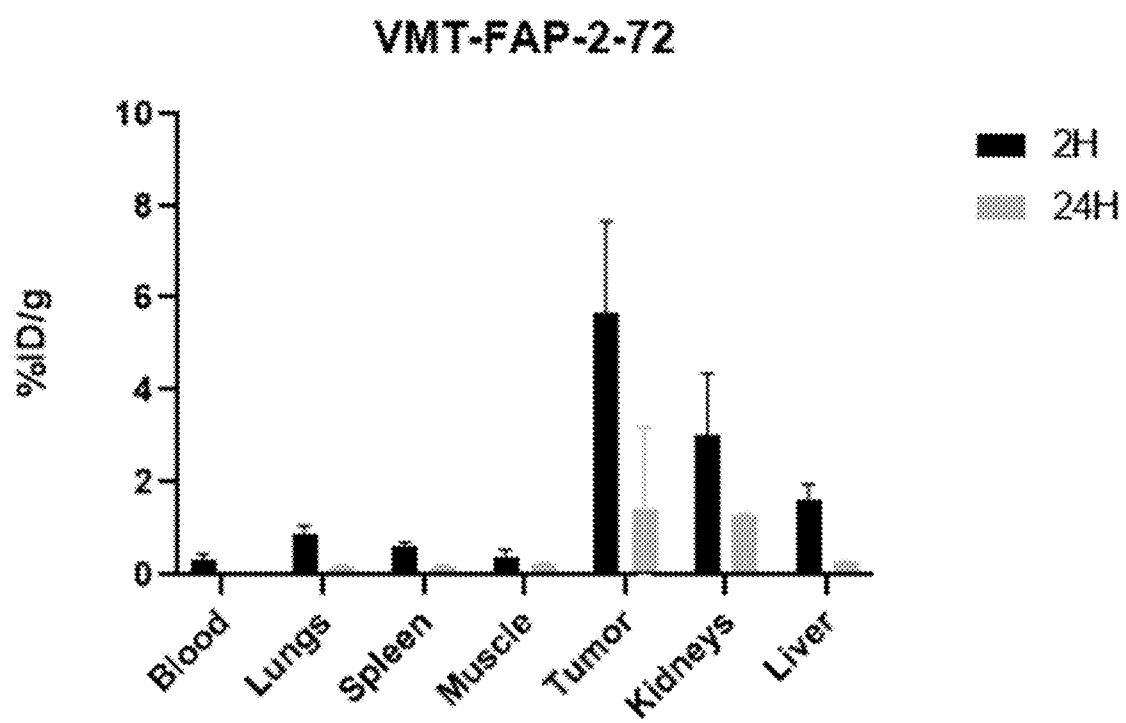
Figure 22:
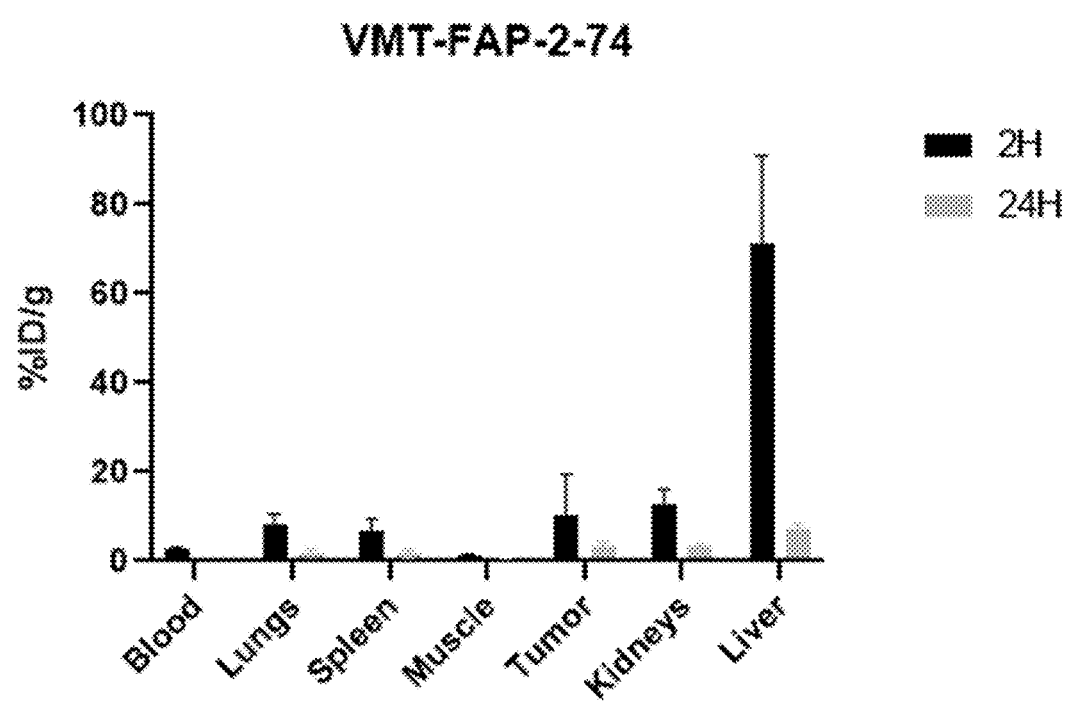
Figure 23:
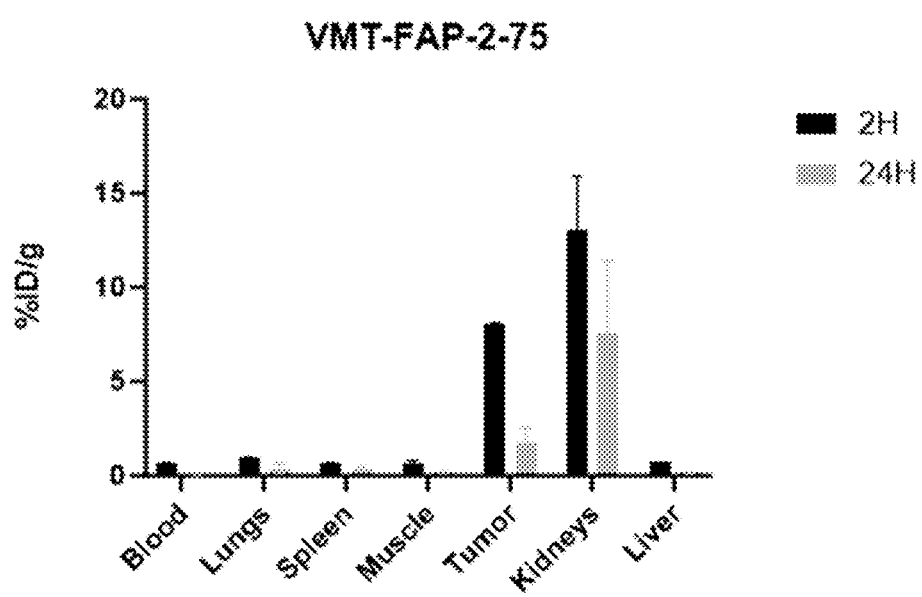
Figure 24:
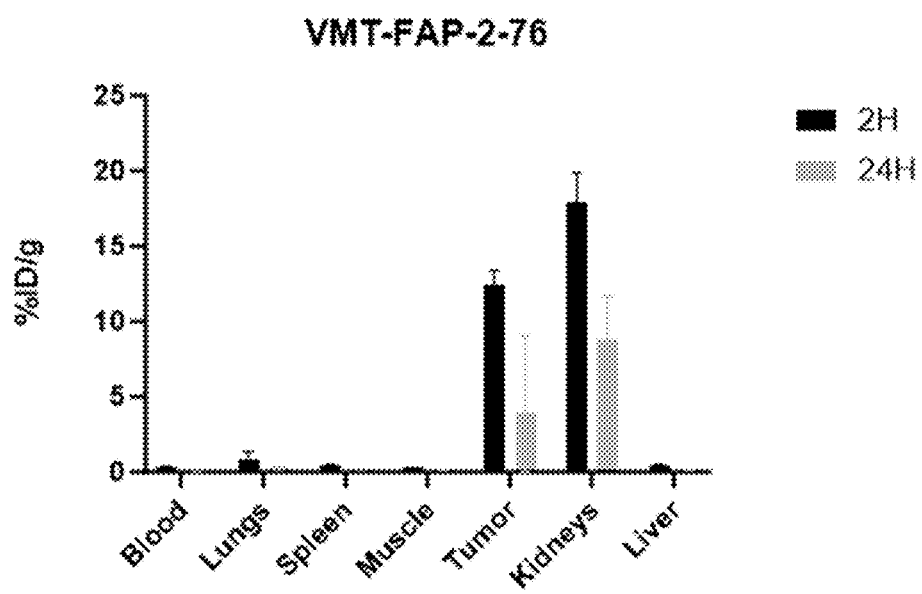
Figure 25:
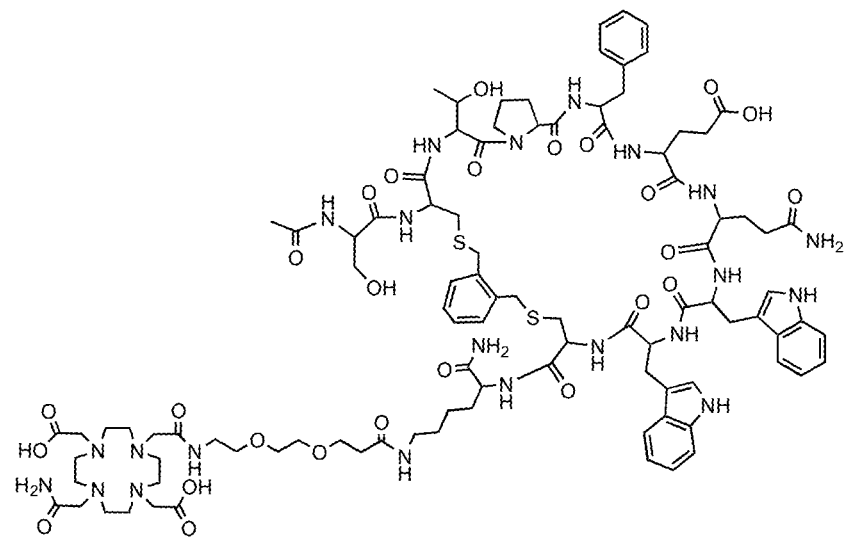
Figure 26:
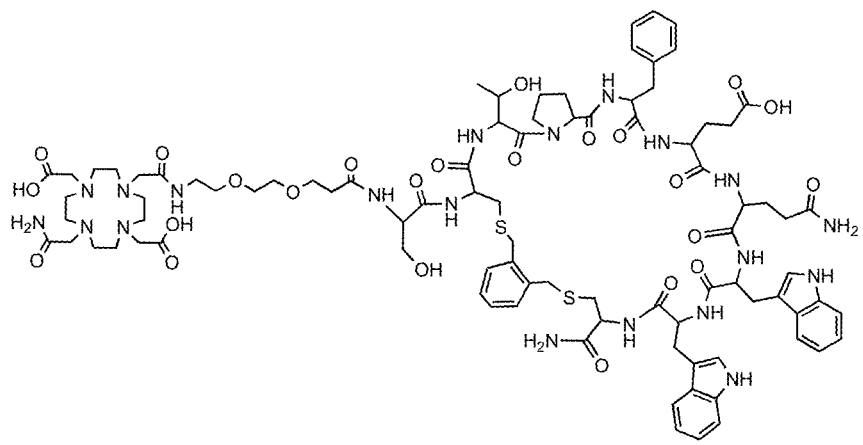
FIG. 26 is a structural example of the sequence of VMT-FAP-2-30.
Figure 27:
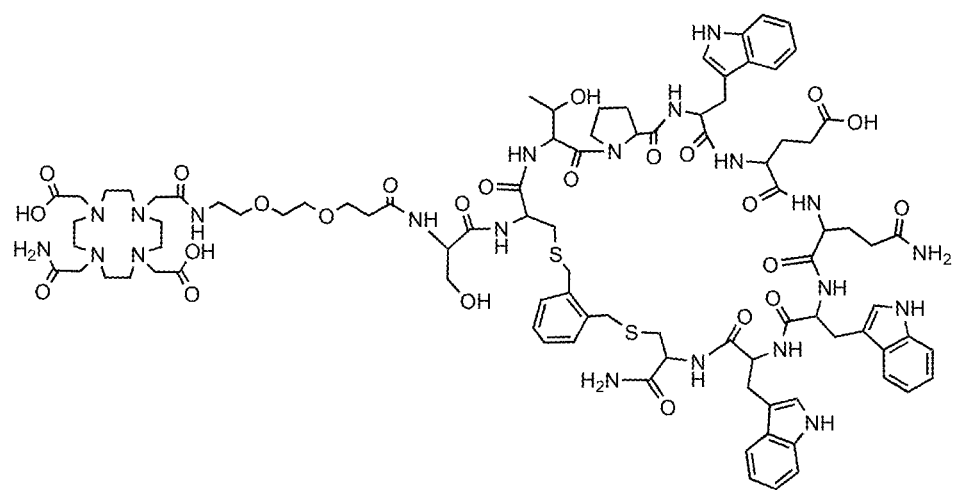
FIG. 27 is a structural example of the sequence of VMT-FAP-2-42.
Figure 28:
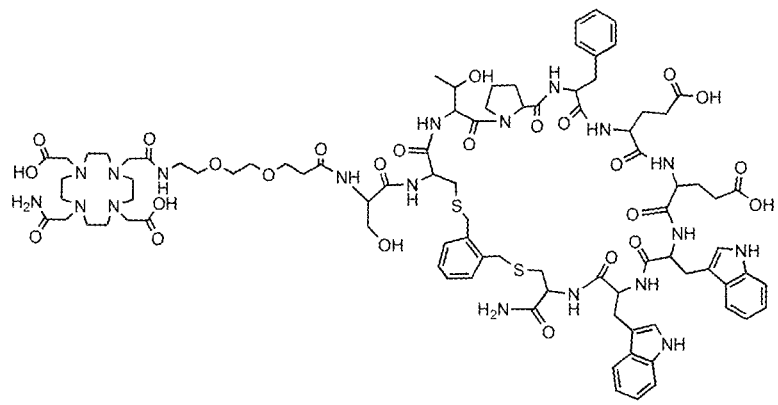
FIG. 28 is a structural example of the sequence of VMT-FAP-2-43.
Figure 29:
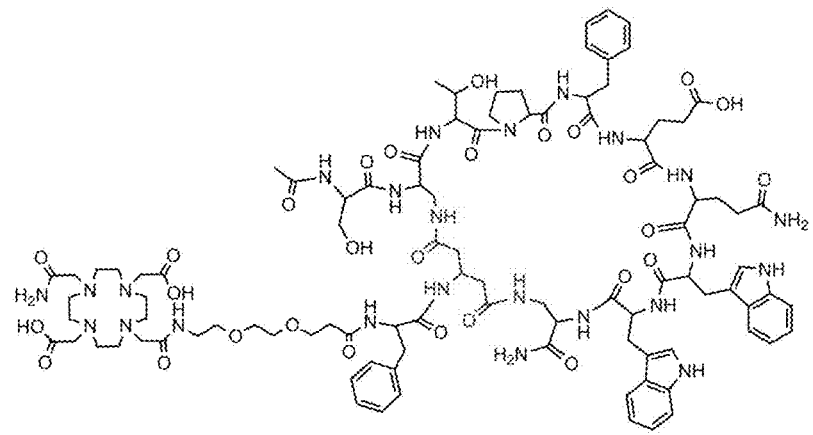
FIG. 29 is a structural example of the sequence of VMT-FAP-2-33.
Figure 30:
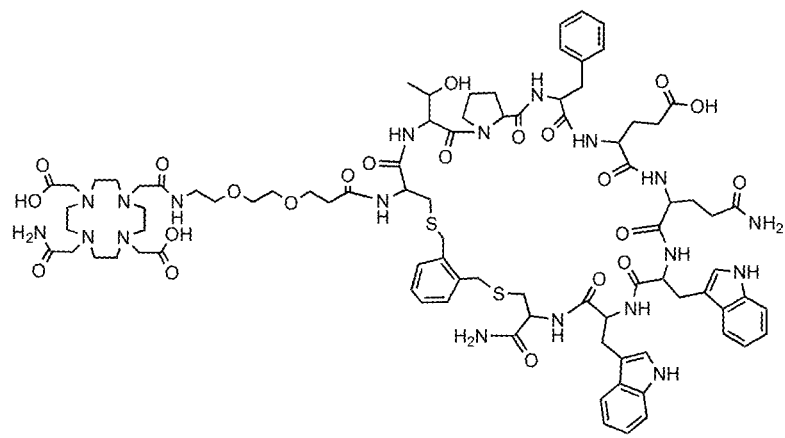
FIG. 30 is a structural example of the sequence of VMT-FAP-2-36.
Figure 31:
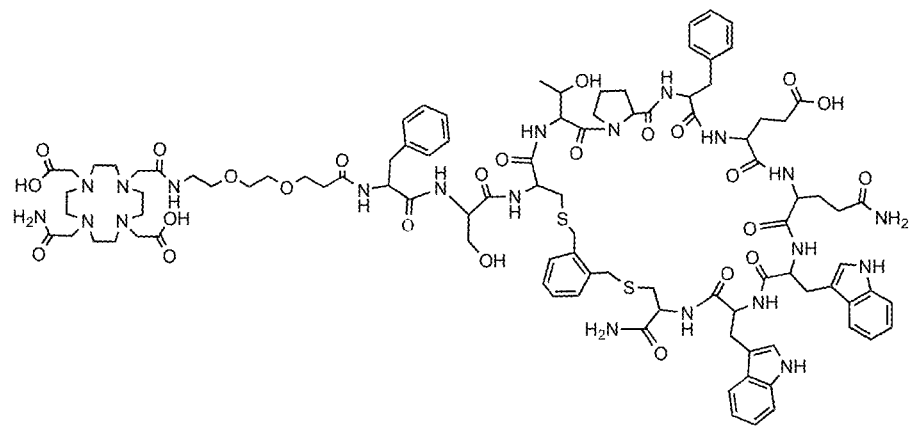
FIG. 31 is a structural example of the sequence of VMT-FAP-2-39.
Figure 32:
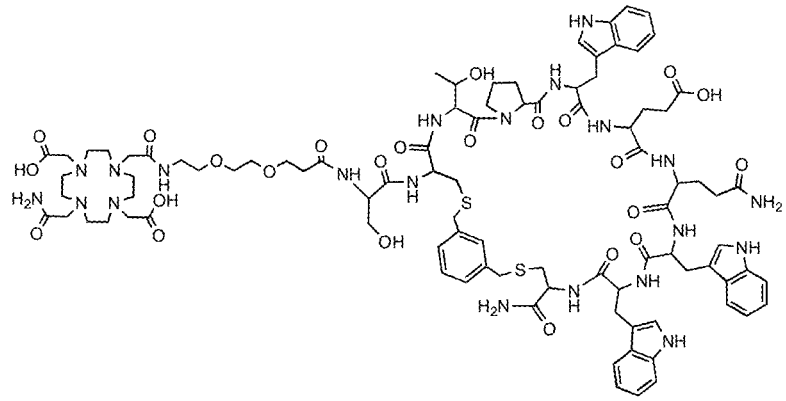
FIG. 32 is a structural example of the sequence of VMT-FAP-2-48.
Figure 33:
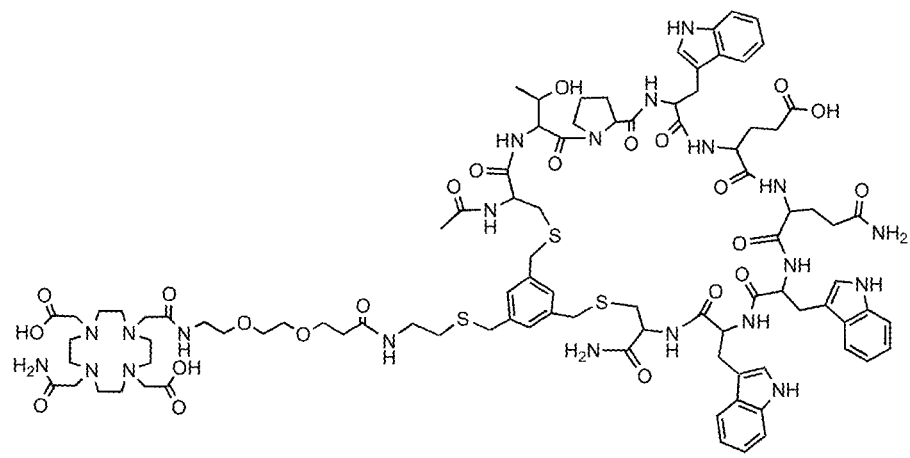
FIG. 33 is a structural example of the sequence of VMT-FAP-2-51.
Figure 34:
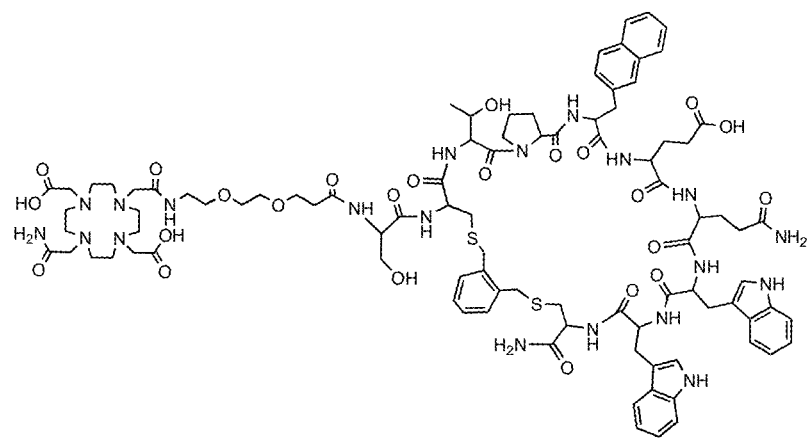
FIG. 34 is a structural example of the sequence of VMT-FAP-2-53.
Figure 35:
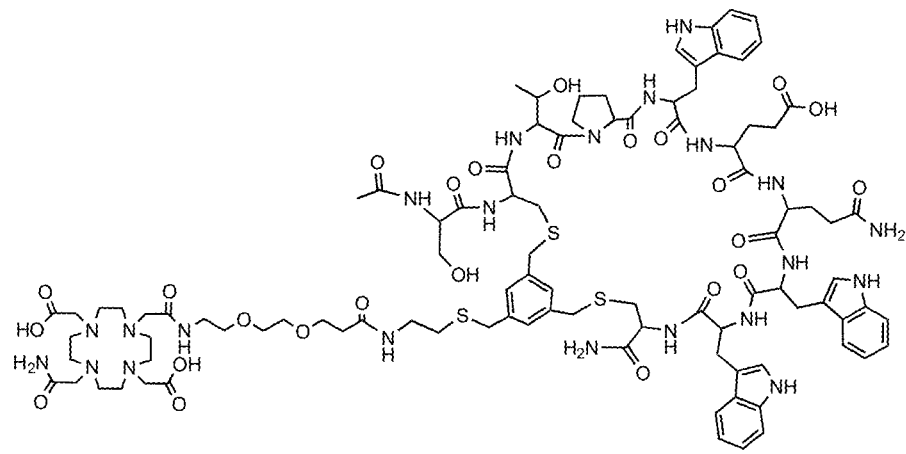
FIG. 35 is a structural example of the sequence of VMT-FAP-2-55.
Figure 36:
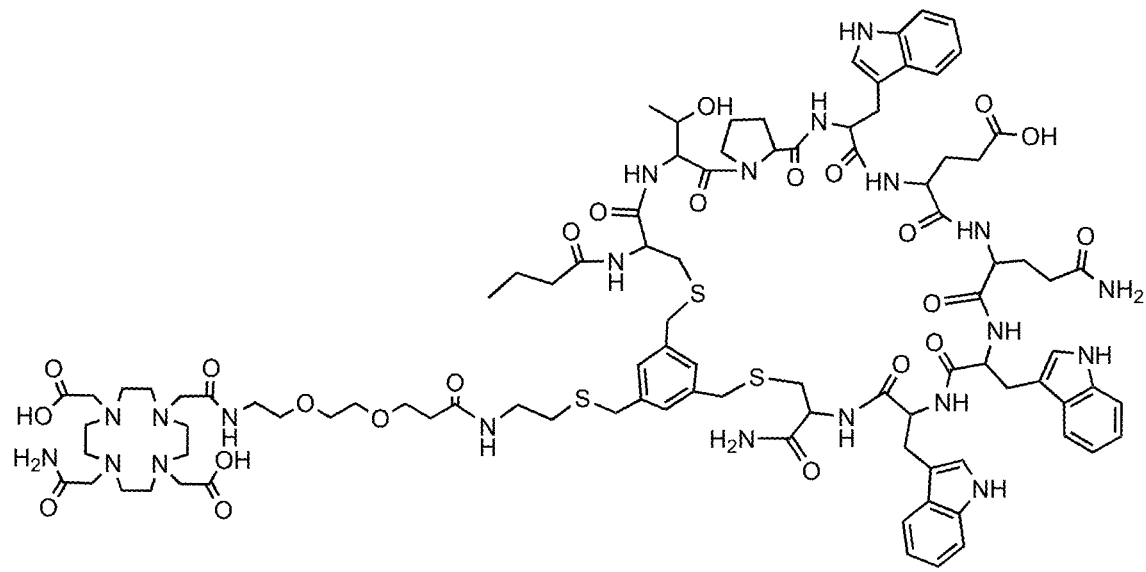
FIG. 36 is a structural example of the sequence of VMT-FAP-2-57.
Figure 37:
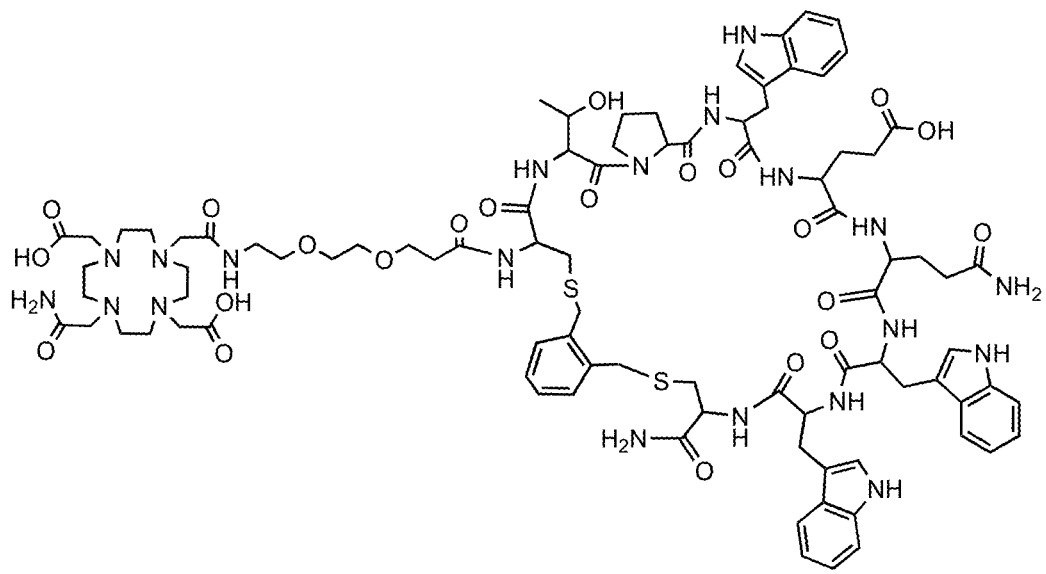
FIG. 37 is a structural example of the sequence of VMT-FAP-2-59.
Figure 38:
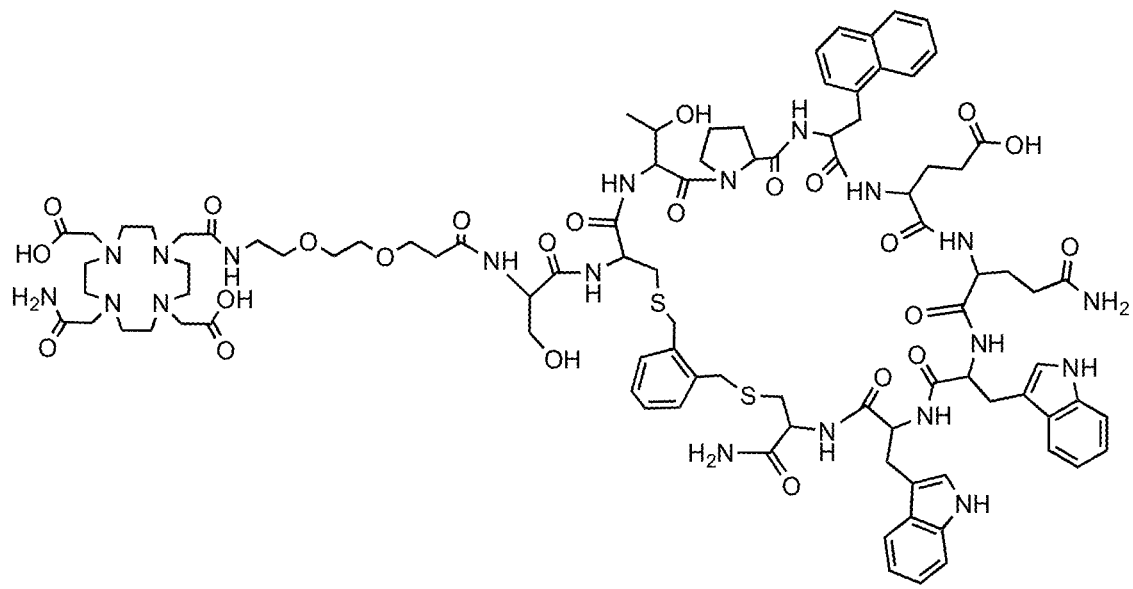
FIG. 38 is a structural example of the sequence of VMT-FAP-2-60.
Figure 39:
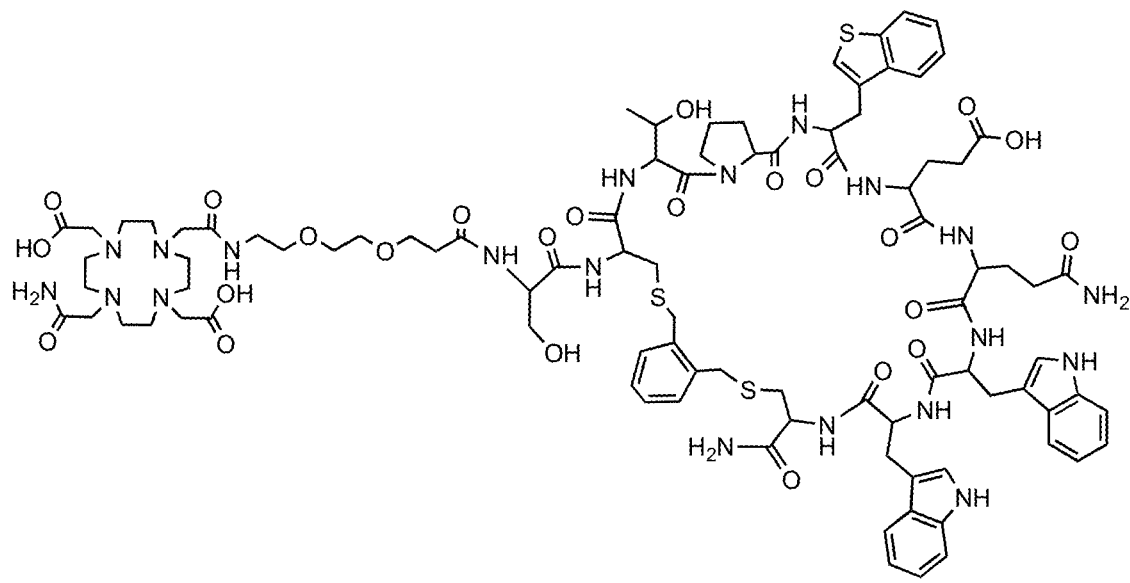
FIG. 39 is a structural example of the sequence of VMT-FAP-2-61.
Figure 40:
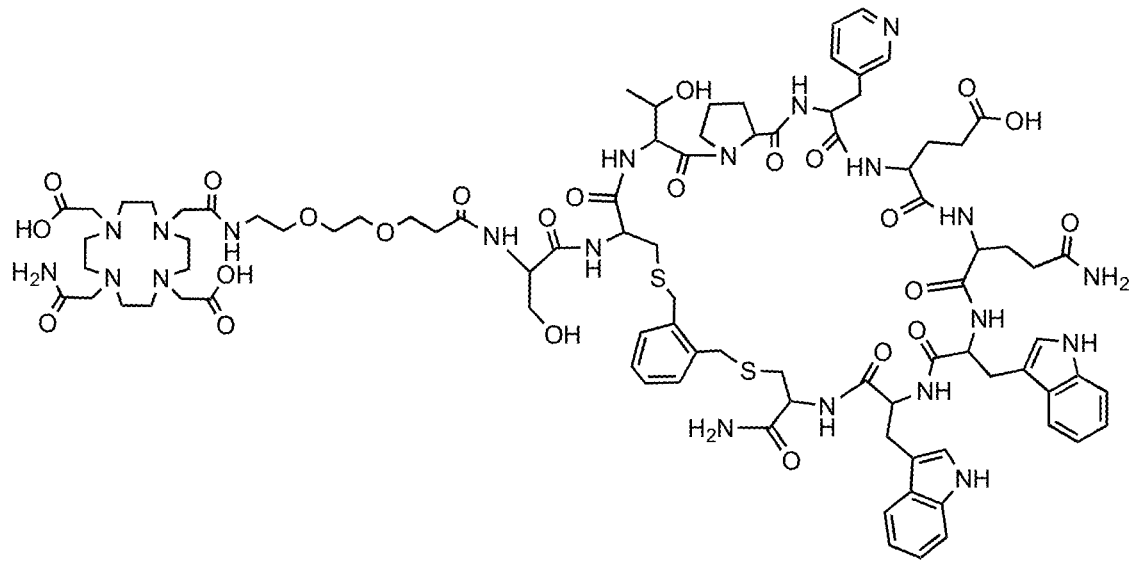
FIG. 40 is a structural example of the sequence of VMT-FAP-2-62.
Figure 41:
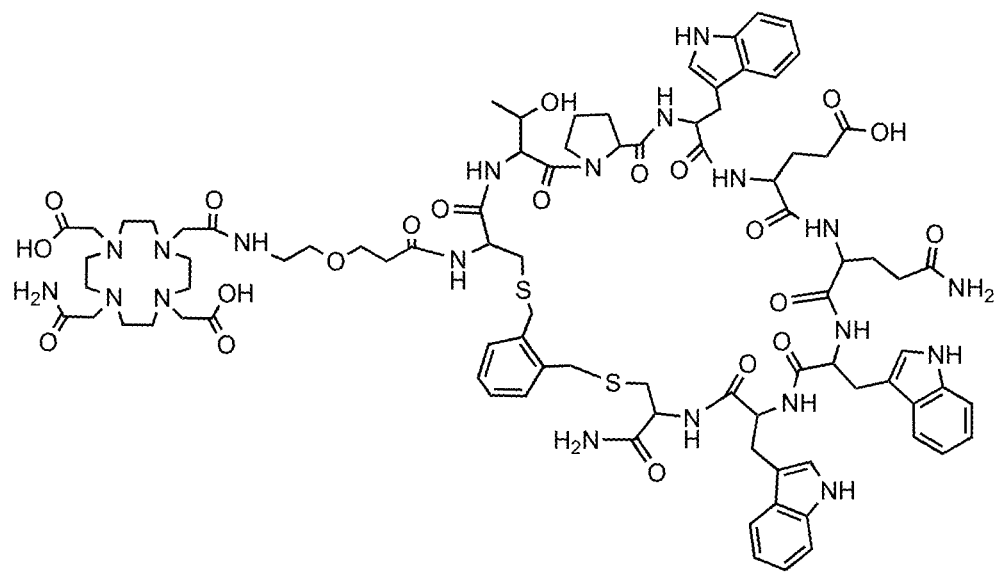
FIG. 41 is a structural example of the sequence of VMT-FAP-2-67.
Figure 42:
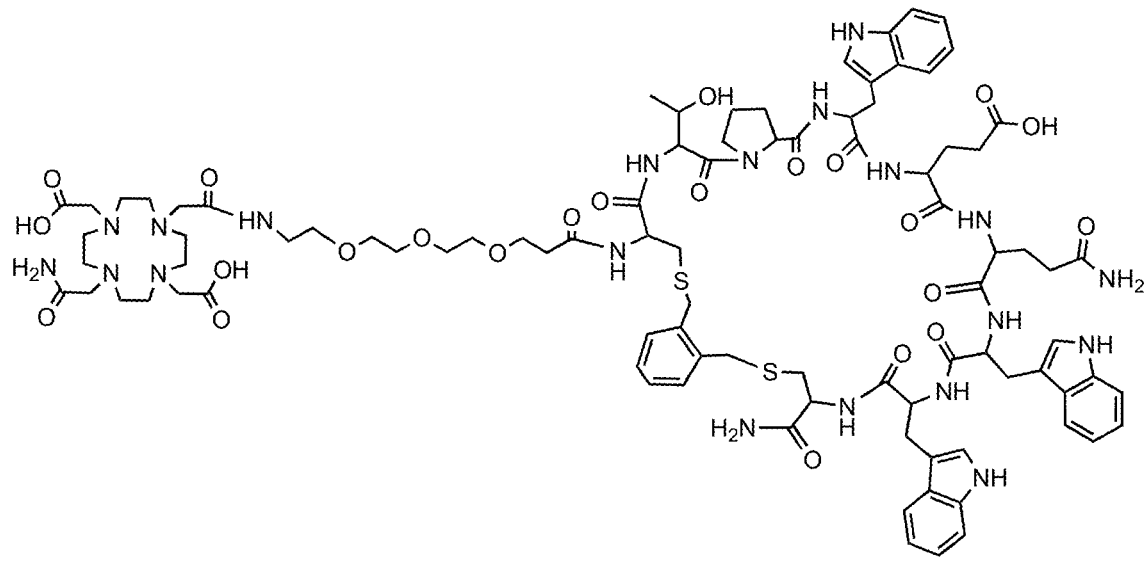
FIG. 42 is a structural example of the sequence of VMT-FAP-2-68.
Figure 43:
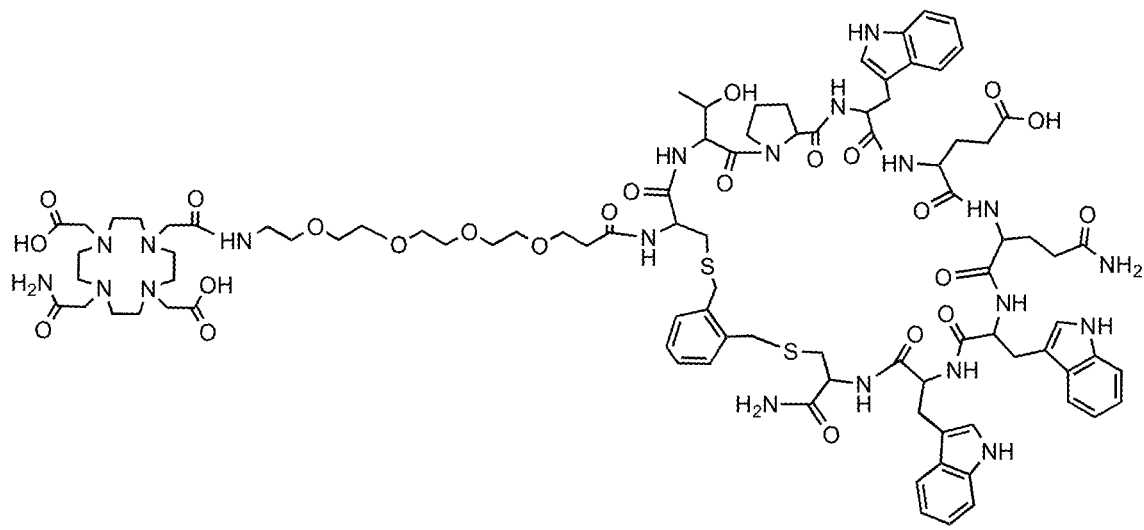
FIG. 43 is a structural example of the sequence of VMT-FAP-2-69.
Figure 44:
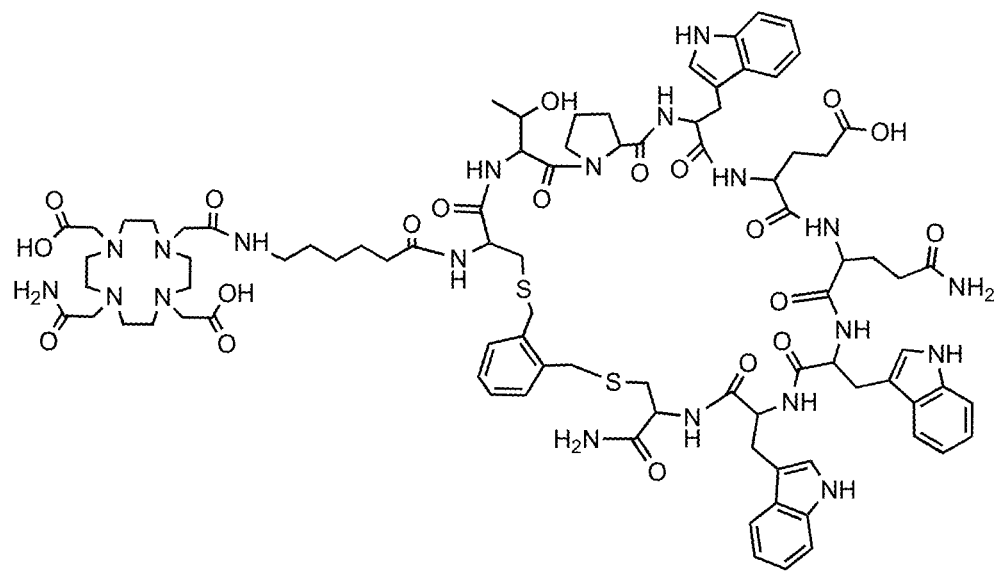
FIG. 44 is a structural example of the sequence of VMT-FAP-2-70.
Figure 45:
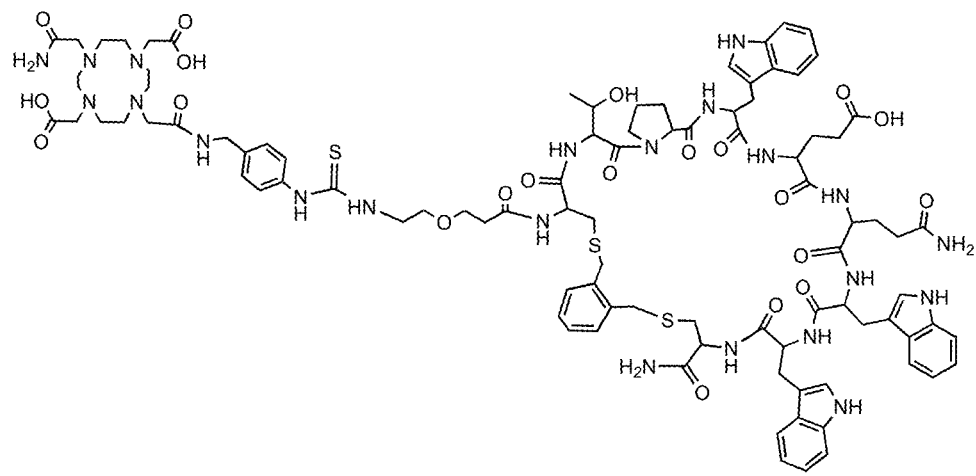
FIG. 45 is a structural example of the sequence of VMT-FAP-2-72.
Figure 46:
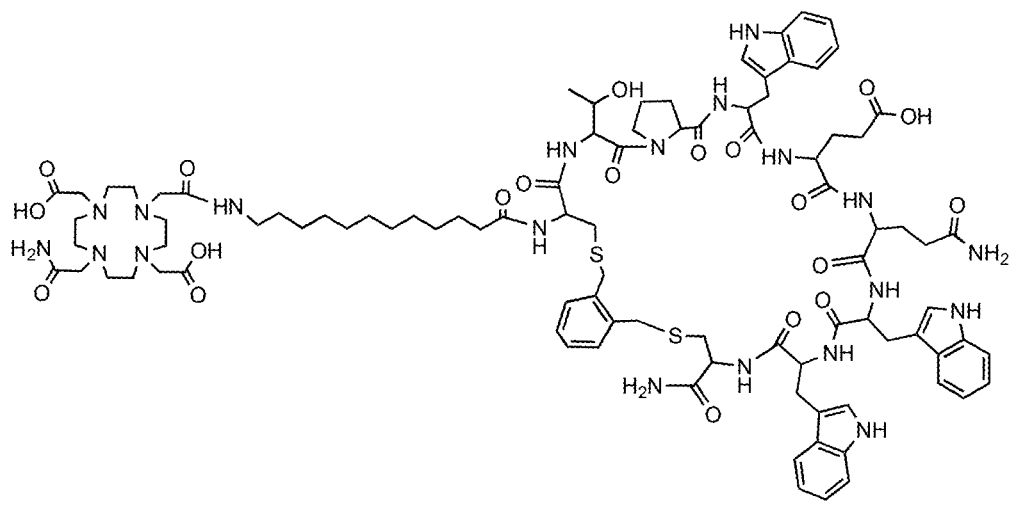
FIG. 46 is a structural example of the sequence of VMT-FAP-2-74.
Figure 47:
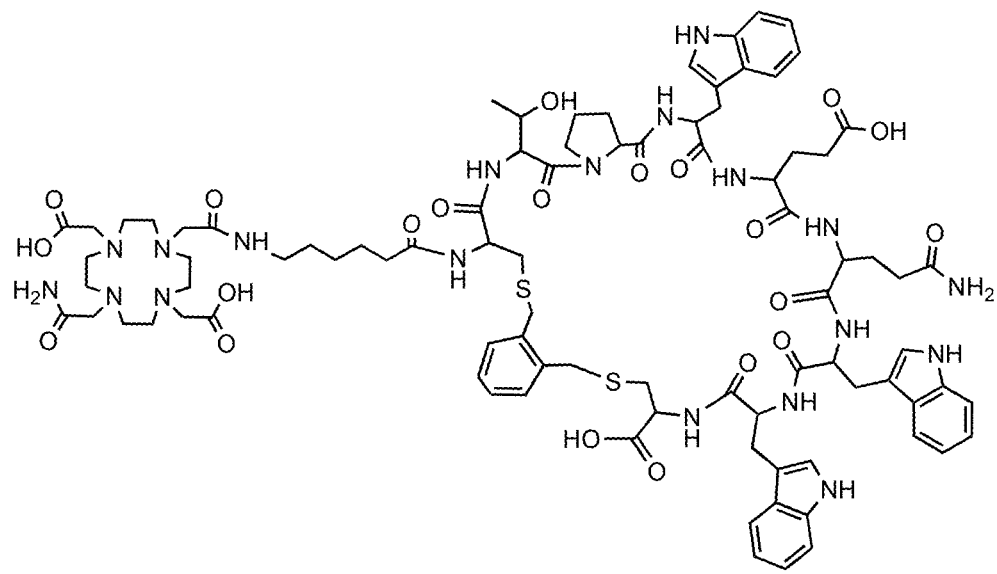
FIG. 47 is a structural example of the sequence of VMT-FAP-2-75.
Figure 48:
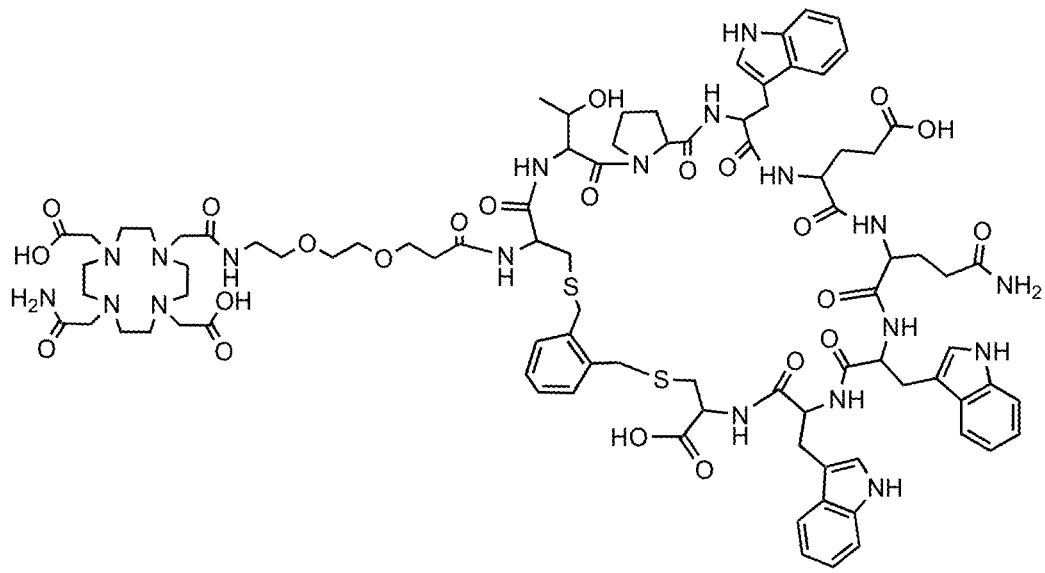
FIG. 48 is a structural example of the sequence of VMT-FAP-2-76.
Figure 49:
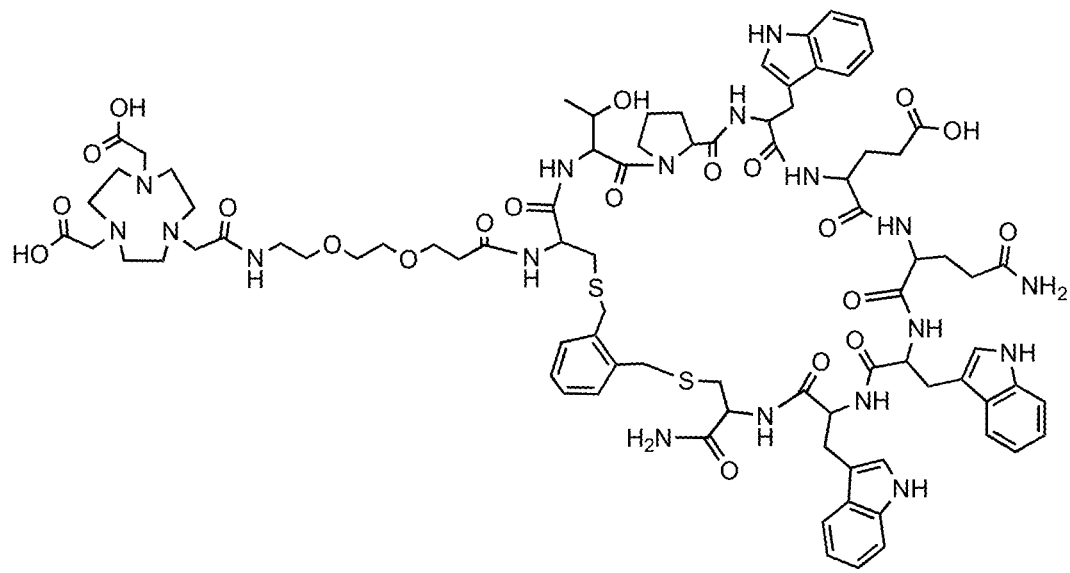
FIG. 49 is a structural example of the sequence of VMT-FAP-2-77.
Figure 50:
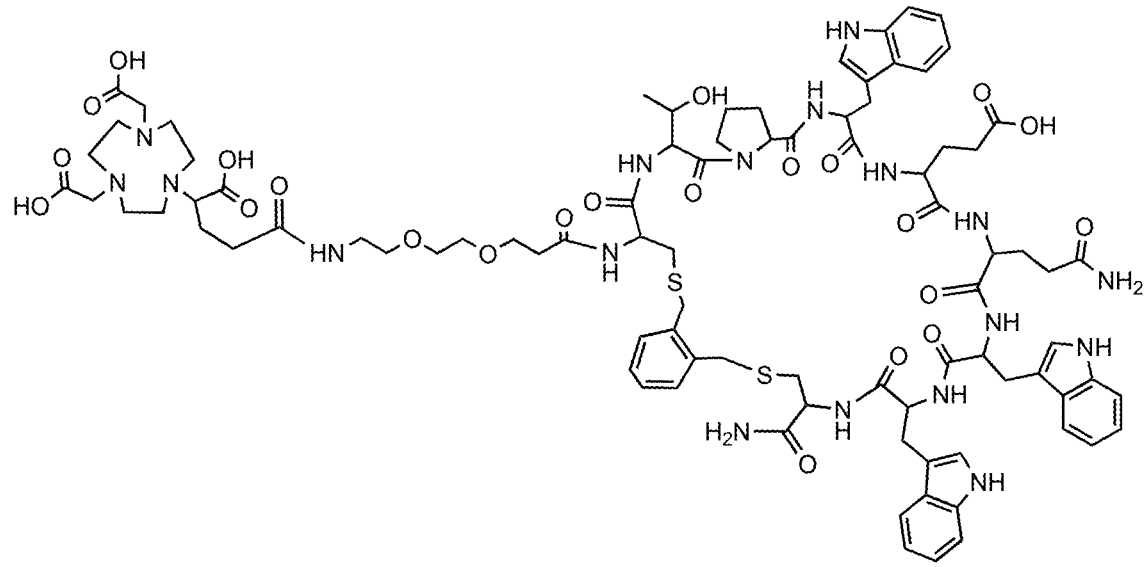
FIG. 50 is a structural example of the sequence of VMT-FAP-2-78.
Figure 51:
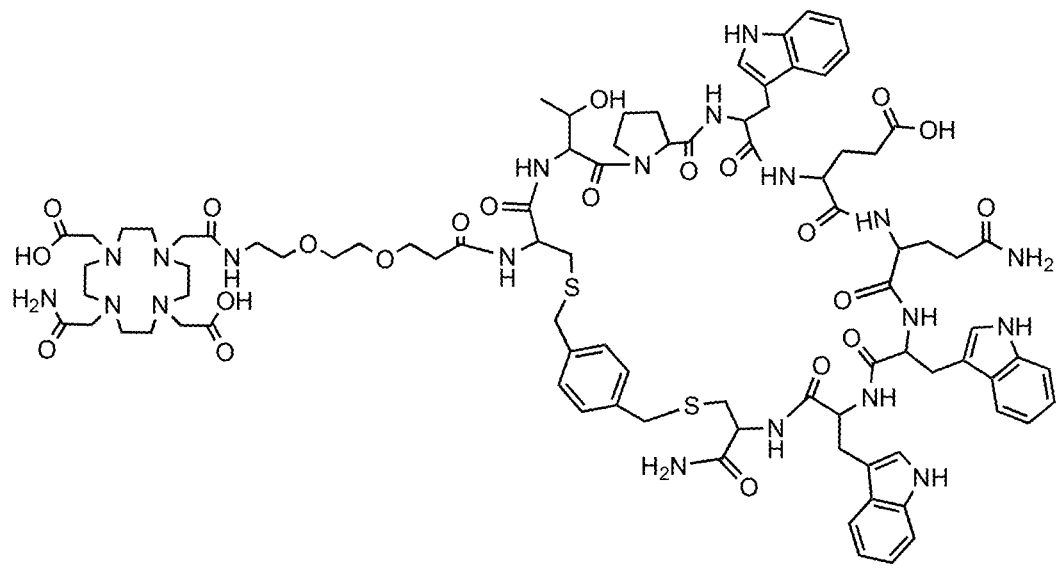
FIG. 51 is a structural example of the sequence of VMT-FAP-2-82.
Figure 52:
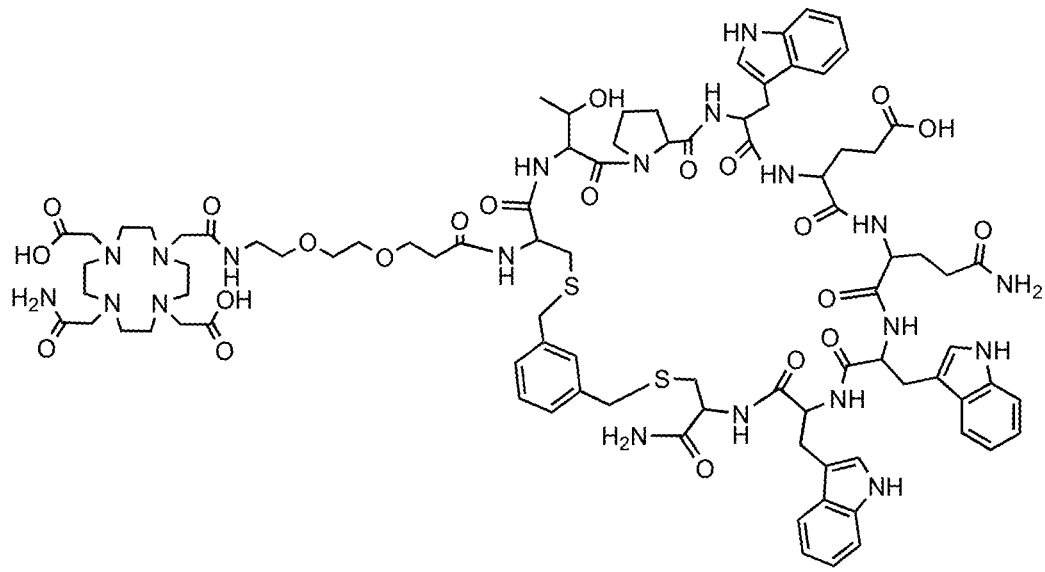
FIG. 52 is a structural example of the sequence of VMT-FAP-2-83.
Figure 53:
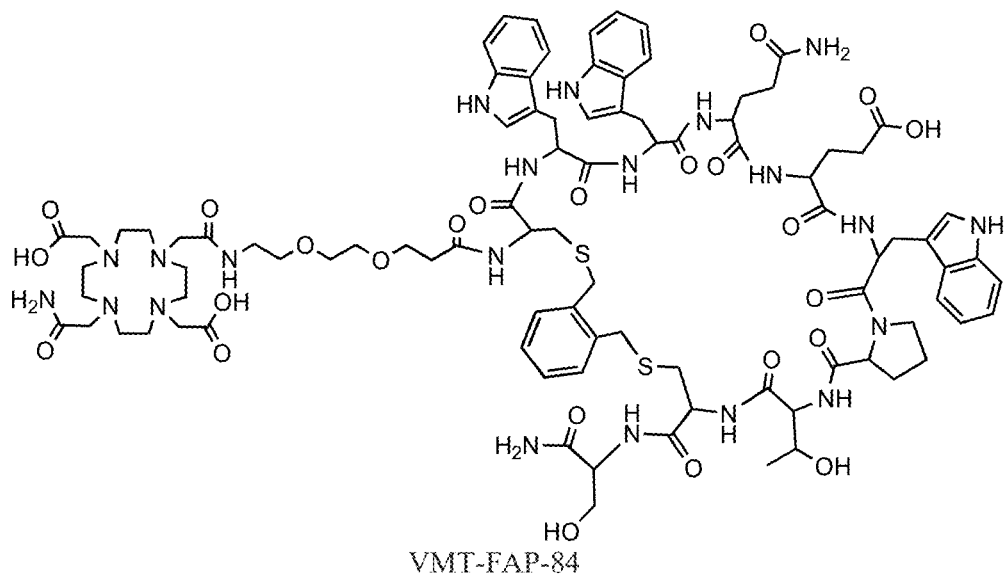
FIG. 53 is a structural example of the sequence of VMT-FAP-2-84.

This summary is provided to introduce a selection of concepts that are further described below in the detailed description. This summary is not intended to identify key or essential features of the claimed subject matter, nor is it intended to be used as an aid in limiting the scope of the claimed subject matter.

The present invention provides in certain embodiments a conjugate which binds to both human and mouse fibroblast activation protein alpha (FAP), thereby releasing radiation or cytotoxic drugs to targeted cancer cells and other cells (e.g., tumor stromal cells) in the tumor microenvironment. In accordance with the invention, a chelator or cytotoxic drug is attached to a molecule that contains a cyclic peptide. The conjugate formed can thereby bind to FAP and release radiation or cytotoxic drug at the tumor site.

In one embodiment of the invention, the conjugates comprise Formula I:

Y-L-X, wherein:

Y is a chelator or cytotoxic drug
L is a linker, and
X are molecules that contain a cyclic peptide A-[Z-AA$^1$-AA$^2$-AA$^3$-AA$^4$-AA$^5$-AA$^6$-AA$^7$-Z]-B, wherein:

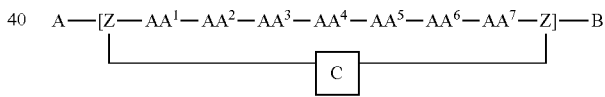

A is a N-terminal modification
B is a C-terminal modification
Z is an amino acid residue wherein X is cyclized
C is a cyclization moiety wherein Z is conjugated
Y and L are conjugated to X on A, B, Z or C.
AA$^1$ is L-, D- or beta-homo amino acid of Thr or Ser.
AA$^2$ is L- or D-amino acid of Pro; Additionally, AA$^2$ can be L-, D-, or beta-homo amino acid of any of the following amino acids: 1, 2, 3, 4-tetrahydroisoquinolin-3-carboxylic acid (Tic), pyroglutamic acid (Pyr), Homo-Pro, 4-aminopiperidine-4-carboxylic acid, 2-aminobenzoic acid (2-Abz), 3-aminocyclopentanecarboxylic acid, trans-3-hydroxyproline (Hyp), cis-3-hydroxyproline, trans-4-hydroxyproline, cis-4-hydroxyproline, alpha-methyl-proline, alpha-benzyl-proline, 3,4-dehydro-proline, 4-oxa-proline, 3-thia-proline, and 4-thia-proline.

AA$^3$ is L-, D-, or beta-homo amino acid of Trp, Phe, Tyr, or His; Additionally, AA$^3$ can be beta-Phe or beta-Tyr. Additionally, AA$^3$ can be L-, D-, or beta-homo amino acid of any of the following amino acids: 1-napthylalanine (1-Nal), 2-napthylalanine (2-Nal), 3-(4-biphenyl-alanine (Bip), 2-pyridyl-alanine (2-Pal), 3-pyridyl-alanine (3-Pal), 4-pyridyl-alanine (4-Pal), 3-benzothienyl-alanine (Bta), 2-cyano-phenylalanine, 3-cyano-phenylalanine, 4-cyano-phenylalanine, 3-borono-phenylalanine, 4-borono-phenylalanine, 4-trifluoromethyl-phenylalanine, 2-chloro-phenylalanine, 3-chloro-phenylalanine, 4-chloro-phenylalanine, 2-fluoro-phenylalanine, 3-fluoro-phenylalanine, 4-fluoro-phenylalanine, 2-iodo-phenylalanine, 3-iodo-phenylalanine, 4-iodo-phenylalanine, 2-methyl-phenylalanine, 3-methyl-phenylalanine, 4-methyl-phenylalanine, 2-nitro-phenylalanine, 3-nitro-phenylalanine, 4-nitro-phenylalanine, 4-pentafluoro-phenylalanine, phenylglycine (Phg), 4-amino-phenylalanine, 4-methoxy-phenylalanine, 5-hydroxytryptophan, 3, 5-diiodo-tyrosine, 4-benzoyl-phenylalanine, 5-hydroxy-tryptophan, 3, 5-diiodo-tyrosine, 4-benzoyl-phenylalanine (Bpa), cyclohexylglycine (Chg), or 2-thienyl-alanine (Thi).

$AA^4$ is L-, D-, or beta-homo amino acids of Glu, Asp, Gln, or Apn; Additionally, $AA^4$ can be beta-Glu, or beta-Gln.

$AA^5$ is L-, D-, or beta-homo amino acid of Gln, Ala, Ile, Val, Trp, Tyr, Phe, His, Lys, Arg, Asp, Glu, Ser, Thr, Asn, or Gly; Additionally, $AA^5$ can be beta-Glu, beta-Gln, beta-Phe, beta-Tyr, or beta-Lys. Additionally, $AA^5$ can be L-, D-, or beta-homo amino acid of any of the following amino acids: norleucine (Nle), citrulline (Cit), and norvaline. Additionally, $AA^5$ can be L-, D-, or beta-homo amino acids of 1-napthylalanine (1-Nal), 2-napthylalanine (2-Nal), 3-(4-biphenyl-alanine (Bip), 2-pyridyl-alanine (2-Pal), 3-pyridyl-alanine (3-Pal), 4-pyridyl-alanine (4-Pal), 3-benzothienyl-alanine (Bta), 2-cyano-phenylalanine, 3-cyano-phenylalanine, 4-cyano-phenylalanine, 3-Borono-phenylalanine, 4-Borono-phenylalanine, 4-trifluoromethyl-phenylalanine, 2-chloro-phenylalanine, 3-chloro-phenylalanine, 4-chloro-phenylalanine, 2-fluoro-phenylalanine, 3-fluoro-phenylalanine, 4-fluoro-phenylalanine, 2-Iodo-phenylalanine, 3-Iodo-phenylalanine, 4-Iodo-phenylalanine, 2-methyl-phenylalanine, 3-methyl-phenylalanine, 4-methyl-phenylalanine, 2-Nitro-phenylalanine, 3-Nitro-phenylalanine, 4-Nitro-phenylalanine, 4-pentafluoro-phenylalanine, phenylglycine (Phg), 4-amino-phenylalanine, 4-methoxy-phenylalanine, 5-hydroxytryptophan, 3, 5-diiodo-tyrosine, 4-benzoyl-phenylalanine, 5-hydroxy-tryptophan, 3, 5-diiodo-tyrosine, 4-benzoyl-phenylalanine (Bpa), cyclohexylglycine (Chg), or 2-thienyl-alanine (Thi).

$AA^6$ is L-, D-, or beta-homo amino acid of Trp, Phe, Tyr, Ser, or Thr. Additionally, $AA^6$ can be beta-Phe, or beta-Tyr. Additionally, $AA^6$ can be L-, D-, or beta-homo amino acid of any of the following amino acids: 1-napthylalanine (1-Nal), 2-napthylalanine (2-Nal), 3-(4-biphenyl-alanine (Bip), 2-pyridyl-alanine (2-Pal), 3-pyridyl-alanine (3-Pal), 4-pyridyl-alanine (4-Pal), 3-benzothienyl-alanine (Bta), 2-cyano-phenylalanine, 3-cyano-phenylalanine, 4-cyano-phenylalanine, 3-Borono-phenylalanine, 4-Borono-phenylalanine, 4-trifluoromethyl-phenylalanine, 2-chloro-phenylalanine, 3-chloro-phenylalanine, 4-chloro-phenylalanine, 2-fluoro-phenylalanine, 3-fluoro-phenylalanine, 4-fluoro-phenylalanine, 2-Iodo-phenylalanine, 3-Iodo-phenylalanine, 4-Iodo-phenylalanine, 2-methyl-phenylalanine, 3-methyl-phenylalanine, 4-methyl-phenylalanine, 2-Nitro-phenylalanine, 3-Nitro-phenylalanine, 4-Nitro-phenylalanine, 4-pentafluoro-phenylalanine, phenylglycine (Phg), 4-amino-phenylalanine, 4-methoxy-phenylalanine, 5-hydroxytryptophan, 3, 5-diiodo-tyrosine, 4-benzoyl-phenylalanine, 5-hydroxy-tryptophan, 3, 5-diiodo-tyrosine, 4-benzoyl-phenylalanine (Bpa), cyclohexylglycine (Chg), or 2-thienyl-alanine (Thi).

$AA^7$ is L-, D-, or beta-homo amino acids of Trp, Met, Phe, or Tyr. Additionally, $AA^7$ can be beta-Phe, or beta-Tyr. Additionally, $AA^7$ can be L-, D-, or beta-homo amino acid of any of the following amino acids: 1-napthylalanine (1-Nal), 2-napthylalanine (2-Nal), 3-(4-biphenyl-alanine (Bip), 2-pyridyl-alanine (2-Pal), 3-pyridyl-alanine (3-Pal), 4-pyridyl-alanine (4-Pal), 3-benzothienyl-alanine (Bta), 2-cyano-phenylalanine, 3-cyano-phenylalanine, 4-cyano-phenylalanine, 3-Borono-phenylalanine, 4-Borono-phenylalanine, 4-trifluoromethyl-phenylalanine, 2-chloro-phenylalanine, 3-chloro-phenylalanine, 4-chloro-phenylalanine, 2-fluoro-phenylalanine, 3-fluoro-phenylalanine, 4-fluoro-phenylalanine, 2-Iodo-phenylalanine, 3-Iodo-phenylalanine, 4-Iodo-phenylalanine, 2-methyl-phenylalanine, 3-methyl-phenylalanine, 4-methyl-phenylalanine, 2-Nitro-phenylalanine, 3-Nitro-phenylalanine, 4-Nitro-phenylalanine, 4-pentafluoro-phenylalanine, phenylglycine (Phg), 4-amino-phenylalanine, 4-methoxy-phenylalanine, 5-hydroxytryptophan, 3, 5-diiodo-tyrosine, 4-benzoyl-phenylalanine, 5-hydroxy-tryptophan, 3, 5-diiodo-tyrosine, 4-benzoyl-phenylalanine (Bpa), cyclohexylglycine (Chg), or 2-thienyl-alanine (Thi).

A is the N-terminal structure of X, and comprises the following formula,

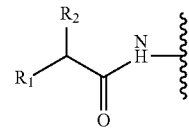

wherein $R_1$ is $-(CH_2)_n-$, $n=0-6$; $R_2$ is any side chain residue of Gly, Ala, Ser, Met, Lys, Arg, Asp, Glu, or Asn.

B is the C-terminal structure in X, and can be selected from: $-CO-NH_2$, $-COOH$, $-OH$, or $-CO-NH-(CH_2)_n-CH_3$, wherein $n=0-6$

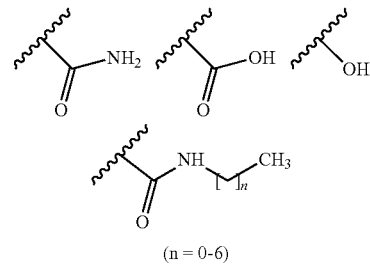

(n = 0-6)

In certain embodiments, the C-terminal structure B is selected from L-, D-, or beta-homo amino acid of any of the following amino acids: lysine, ornithine, 2, 4-diaminobutyric acid (Dab), 2,3-diaminopropionic acid (Dap), or 2,2-diaminoacetic acid, wherein the side chain residue is used for conjugation to a linker and chelator.

In certain embodiments, the X contains reverse sequence $A-[Z-AA^7-AA^6-AA^5-AA^4-AA^3-AA^2-AA^1-Z]-B$ that are cyclized at position Z via cyclization moiety C:

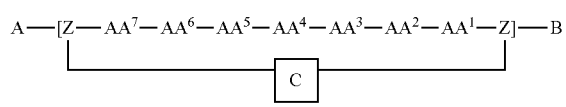

X is cyclized on the side chain residue of amino acids Z which comprises the following formula, wherein $n=0-4$:

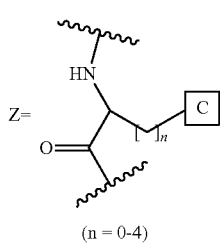
(n = 0-4)
The cyclization moiety C is selected from the following structures, wherein n=0-6.
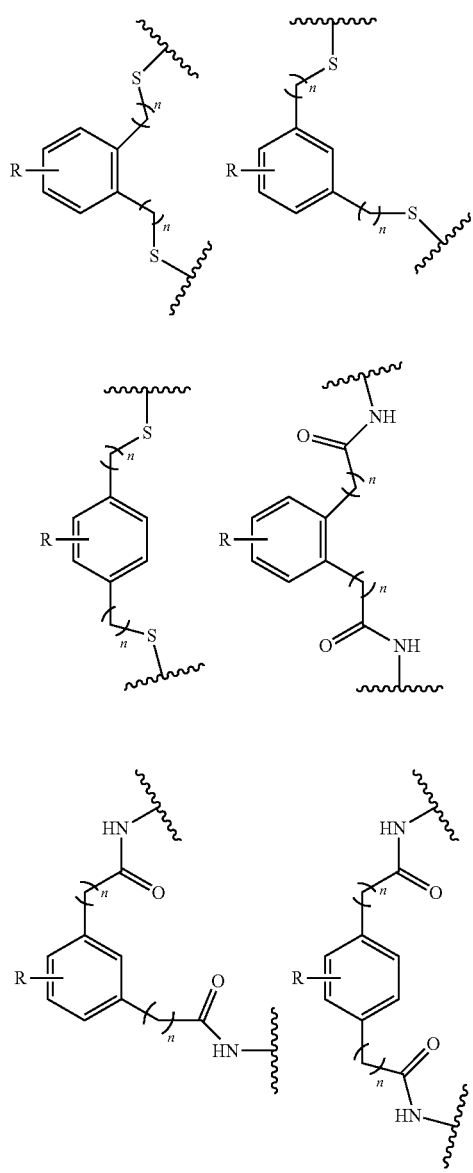
The R in these structures selected from —H, —OH, —Br, —Cl, —I, —(CH$_2$)$_n$—CH$_3$, or —(CH$_2$)$_n$—SH—, wherein n=0-6.
In certain embodiments, cyclization moiety C can also be selected from the following structures:
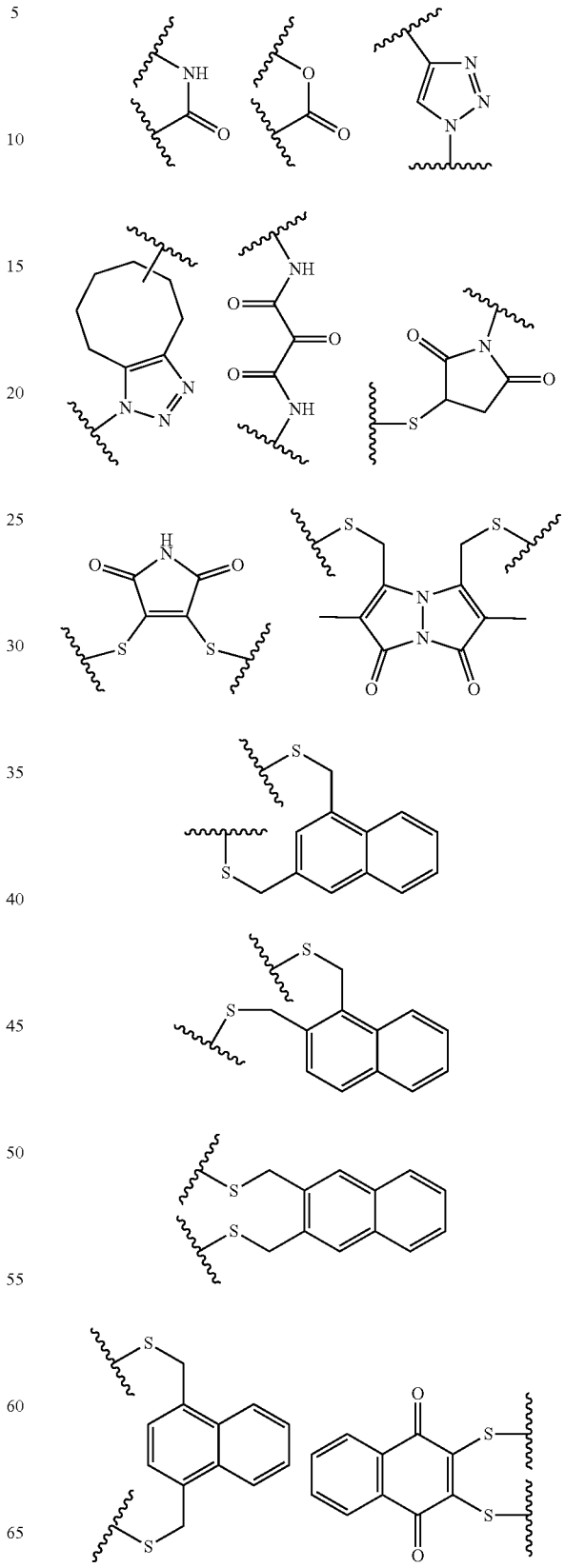

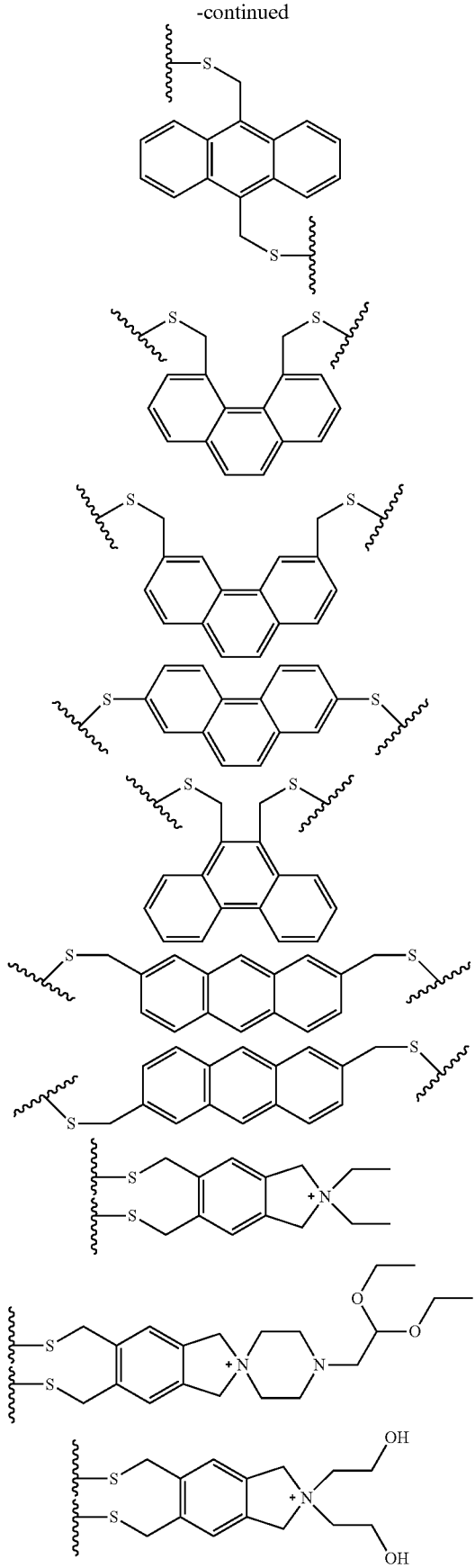
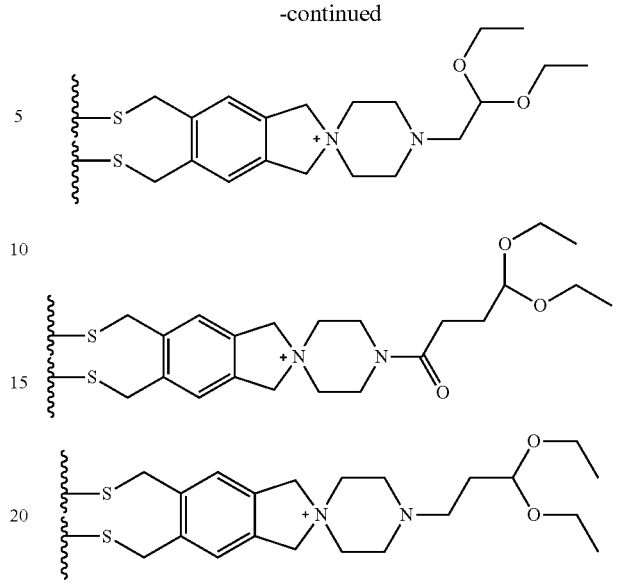
In certain embodiments, Y and L are conjugated to X via A or B, as the following formula:
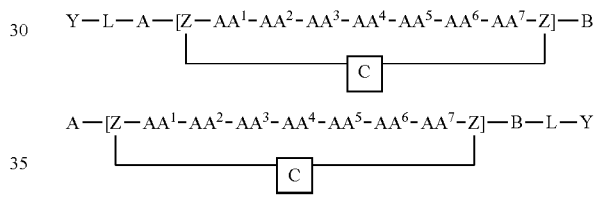
In certain embodiments, Y and L are conjugated to X via cyclization moiety C as following formula:
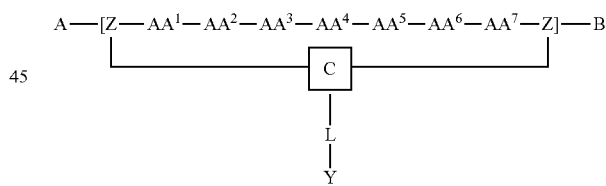
wherein, cyclization moiety C is selected from the following structures, wherein the n=0-6:
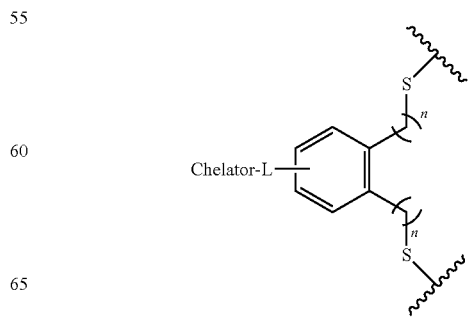

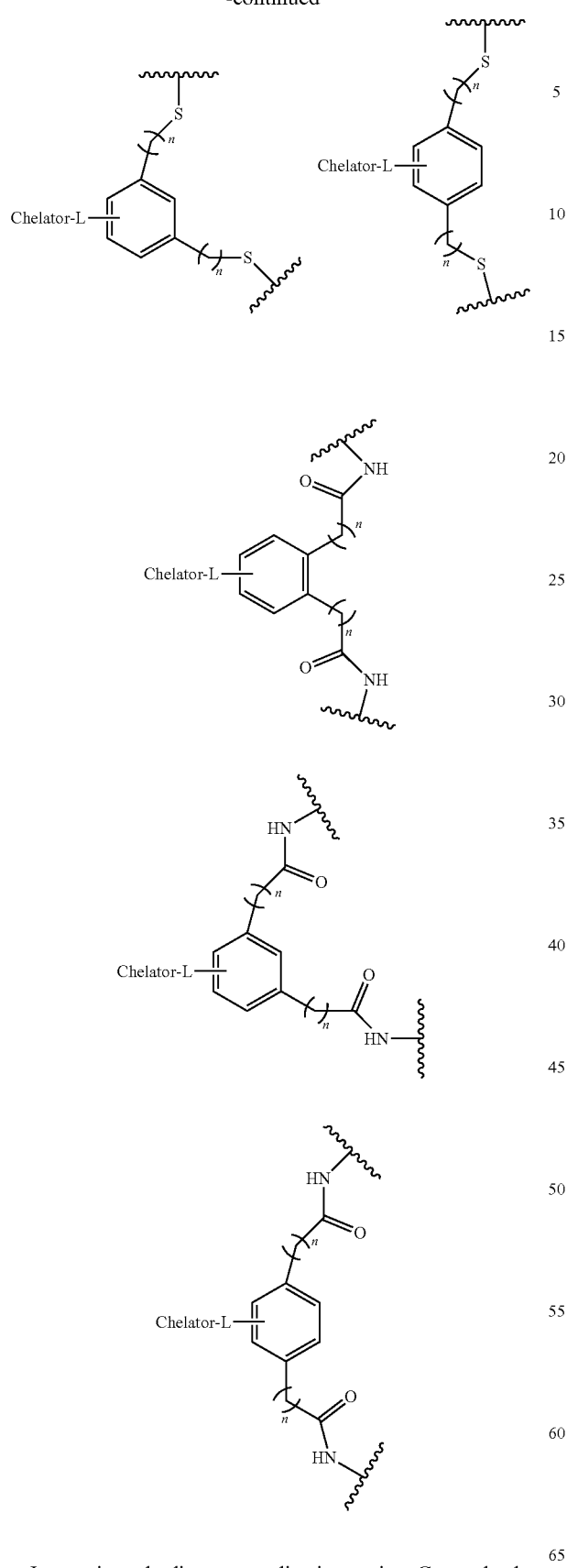
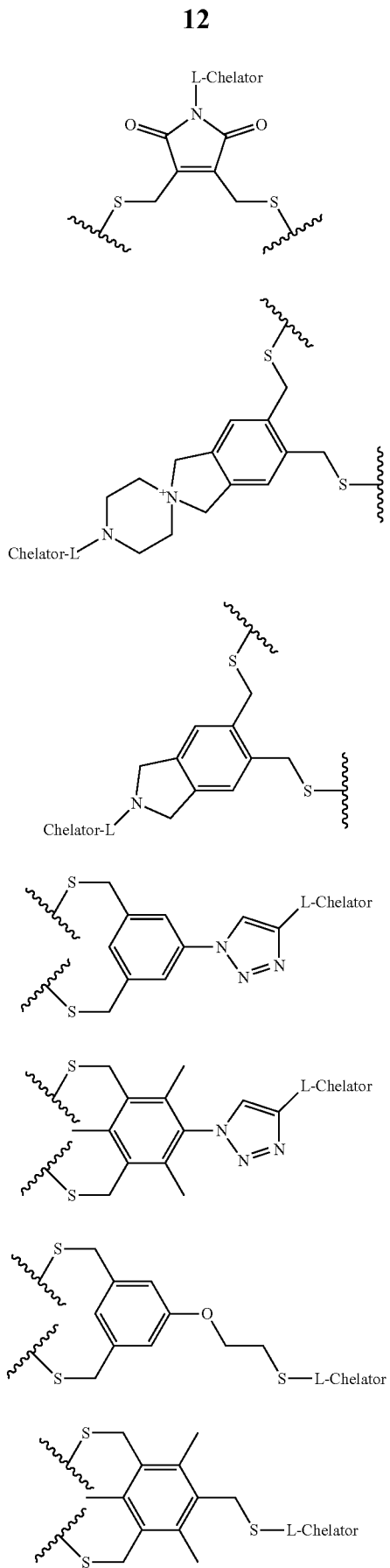
In certain embodiments, cyclization moiety C can also be selected from the following structures:

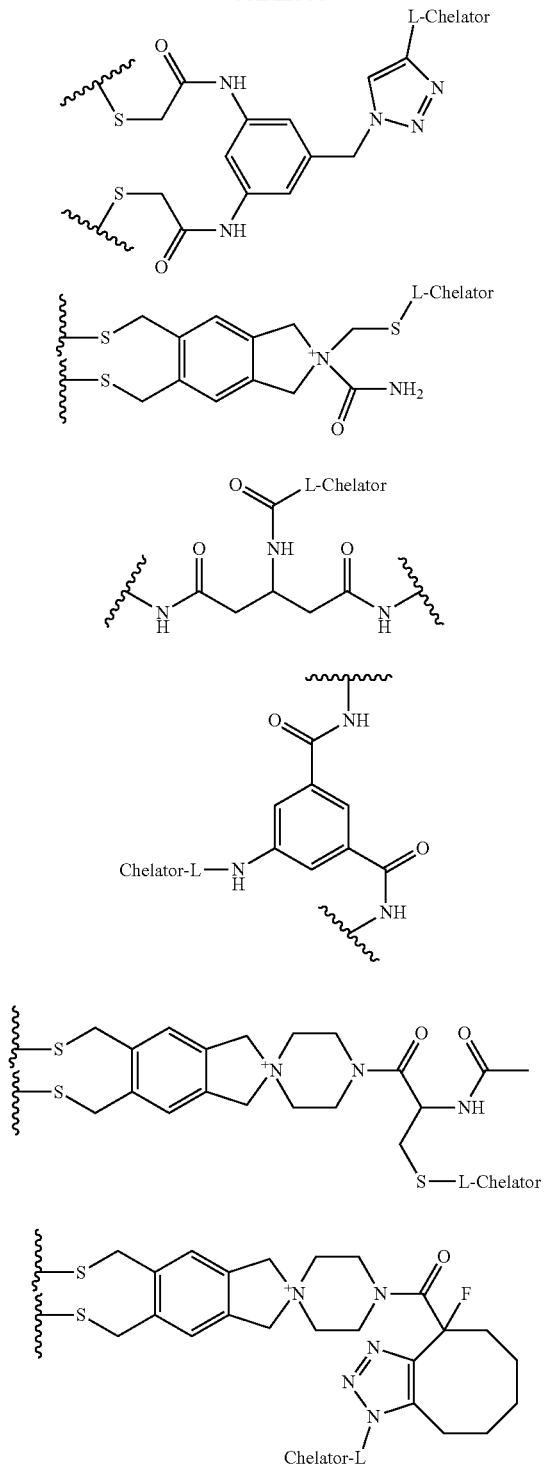

In certain embodiments, X is cyclized via Technetium (Tc) or Rhenium (Re) metals.

In certain embodiments, X is a homo-dimer or a hetero-dimer that contains $AA^1$-$AA^2$-$AA^3$-$AA^4$-$AA^5$-$AA^6$-$AA^7$ sequence in at least one loop.

In certain embodiments, the dimer X is cyclized via cyclization moiety $C^2$, wherein $C^2$ can be selected from the following structures:

L: Linkers

In certain embodiments, L is a chemical linker that is inserted into a position between the peptide backbone that recognizes FAP and the chelator that is used to radiolabel the composition using radionuclides for diagnostic imaging and/or therapy; and the linker improves the internalization of the composition into cells and improves the retention of the composition in tumors for more precise delivery of radiation to the cancerous tissue.

In certain embodiments, L is a hydrophobic linker consisting of an aliphatic carbon chain that connects the chelator to the peptide backbone.

In certain embodiments, L is a hydrophilic linker that includes heteroatom substitutions in the aliphatic chain that connects the chelator to the peptide backbone.

In certain embodiments, L is a mixture of hydrophilic and hydrophobic entities including piperidine insertions of amino acid insertions to lengthen the chain and modulate the pharmacodynamics properties of the composition.

In certain embodiments, L is polyethylene glycol linker PEGn, wherein n=1-10, such as 1, 2, 3, 4, 5, 6, 7, 8, 9, or 10.

In certain embodiments, n is 2, 4 or 8 PEG subunits.

In certain embodiments, L is an aliphatic (ALP) linker of 2 or 4 carbons.

In certain embodiments, L is a piperidine (PIP) based linker with mixed characteristics.

In certain embodiments, L is a mixture of hydrophilic and hydrophobic entities including piperazine and insertions of amino acid insertions to lengthen the chain and modulate the pharmacodynamics properties of the composition.

In certain embodiments, L is a mixture of hydrophilic and hydrophobic entities including benzine and insertions of amino acid insertions to lengthen the chain and modulate the pharmacodynamics properties of the composition.

In certain embodiments, L is a "cleavable" linker that contains mixture of natural amino acids Phe, Met, Ile that are cleaved in kidney brush boarder membrane to facilitate the clearance through kidneys.

In certain embodiments, L can be coupled to the epsilon amine of lysine inserted on the C-terminus of the peptide preceding Cys where n can equal 0 to 4.

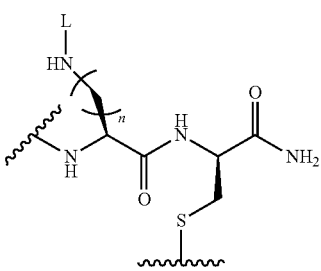

In certain embodiments, L can be coupled to the N-terminus of A or L can be coupled to C moiety.

In certain embodiments, in the presence of B, the C-terminus can be a carboxylic acid or an amide. In the absence of B, Cys can be a carboxylic acid or an amide.

In certain embodiments, the N-terminus can be modified with an acetic acid, propionic acid, butyric acid, and incremental addition of methyl groups in the presence or absence of A to add hydrophobicity if the chelator and L are located on a A or if the chelator and L are located on C.

In certain embodiments, peptide X is conjugated with multiple chelators in formula [Chelator-L]n-X, wherein the chelator-peptide ratio n=2-4.

Other linkers are known in the art. See, e.g., Bandari R P, Jiang Z, Reynolds T S, Bernskoetter N E, Szczodroski A F, Bassuner K J, Kirkpatrick D L, Rold T L, Sieckman G L, Hoffman T J, Connors J P, Smith C J. Synthesis and biological evaluation of copper-64 radiolabeled [DUPA-6-Ahx-(NODAGA)-5-Ava-BBN(7-14)NH2], a novel bivalent targeting vector having affinity for two distinct biomarkers (GRPr/PSMA) of prostate cancer. Nucl Med Biol. 2014; 41 (4): 355-363. Doi: 10.1016/j.nucmedbio.2014.01.001. PubMed PMID: 24508213; PMCID: PMC4041584; Dumont R A, Tamma M, Braun F, Borkowski S, Reubi J C, Maecke H, Weber W A, Mansi R. Targeted radiotherapy of prostate cancer with a gastrin-releasing peptide receptor antagonist is effective as monotherapy and in combination with rapamycin. J Nucl Med. 2013; 54(5):762-769. Doi: 10.2967/jnumed.112.112169. PubMed PMID: 23492884; Gourni E, Mansi R, Jamous M, Waser B, Smerling C, Burian A, Buchegger F, Reubi J C, Maecke H R. N-terminal modifications improve the receptor affinity and pharmacokinetics of radiolabeled peptidic gastrin-releasing peptide receptor antagonists: examples of 68Ga- and 64Cu-labeled peptides for PET imaging. J Nucl Med. 2014; 55(10):1719-1725. Doi: 10.2967/jnumed.114.141242. PubMed PMID: 25146125; Jamous M, Tamma M L, Gourni E, Waser B, Reubi J C, Maecke H R, Mansi R. PEG spacers of different length influence the biological profile of bombesin-based radiolabeled antagonists. Nucl Med Biol. 2014; 41(6):464-470. Doi: 10.1016/j.nucmedbio.2014.03.014. PubMed PMID: 24780298; Mansi R, Abiraj K, Wang X, Tamma M L, Gourni E, Cescato R, Berndt S, Reubi J C, Maecke H R. Evaluation of three different families of bombesin receptor radioantagonists for targeted imaging and therapy of gastrin releasing peptide receptor (GRPR) positive tumors. J Med Chem. 2015; 58(2):682-691. Doi: 10.1021/jm5012066. PubMed PMID: 25474596; Pan D, Xu Y P, Yang R H, Wang L, Chen F, Luo S, Yang M, Yan Y. A new (68)Ga-labeled BBN peptide with a hydrophilic linker for GRPR-targeted tumor imaging. Amino Acids. 2014; 46(6):1481-1489. Doi: 10.1007/s00726-014-1718-y. PubMed PMID: 24633452; Stott Reynolds T J, Schehr R, Liu D, Xu J, Miao Y, Hoffman T J, Rold T L, Lewis M R, Smith C J. Characterization and evaluation of DOTA-conjugated Bombesin/RGD-antagonists for prostate cancer tumor imaging and therapy. Nucl Med Biol. 2015; 42(2):99-108. Doi: 10.1016/j.nucmedbio.2014.10.002. PubMed PMID: 25459113.

Y: Chelators, Radionuclides and Cytotoxic Drug Payloads

In certain embodiments, Y is a chelating agent (also called a "chelator"). The chelator of the invention is used to radiolabel the composition with radioisotopes for the potential of both imaging diagnostics and therapeutic treatment.

In certain embodiments, Y is radiolabeled with a radionuclide that is used for medical imaging and/or therapy of the cancerous tumors.

In certain embodiments, the chelator is radiometallated or radiolabeled with a radionuclide that is suitable for the therapeutic treatment and radiologic (or non-radiologic) imaging of FAP positive malignancies.

In certain embodiments, the peptide is radiolabeled with a radionuclide that is used for medical imaging and/or therapy of the cancerous tumors.

In certain embodiments, the radionuclide is selected from the group consisting of diagnostic radionuclides Sc-43, Sc-44, Mn-51, Cu-64, Ga-67, Ga-68, Y-86, Zr-89, $^{99m}$Tc, F-18, Br-76, Br-77, In-111, I-123, I-124, I-125, Tb-152, Pb-203.

In certain embodiments, the radionuclide is selected from the group consisting of therapeutic radionuclides Sc-47, Cu-67, Sr-89, Y-90, I-131, Sm-153, Tb-149, Tb-161, Lu-177, Re-186, Re-188, At-211, Pb-212, Bi-212, Bi-212, Ra-223, Ra-224, Ac-225, Th-226, Th-227.

In certain embodiments, the radionuclide is In-111, Pb-203; Cu-64, Ga-68, Zr-89, or other medical radionuclide used for imaging.

In certain embodiments, the radionuclide is Y-90, Pb-212, Bi-212, Bi-213, At-211, Ac-225, Lu-177 or other medical radionuclide used to treat the cancerous tumors.

In certain embodiments, the chelator Y is DOTA or other chelator that is used to bind the radionuclide for diagnostic imaging or therapy for cancer or other disease.

In certain embodiments, the chelator Y is based on S-2-(4-Nitrobenzyl)-1,4,7,10-tetraazacyclododecane or other variation on this cyclododecane.

In certain embodiments, the chelator Y is based on 1,4,7,10-Tetraazacyclododecane-1,4,7-tri(carbamoylmethyl)-10-acetic acid.

In certain embodiments, the chelator Y is based on S-2-(4-Nitrobenzyl)-1,4,7,10-tetraazacyclododecane tetraacetic acid.

In certain embodiments, the chelator Y is based on S-2-(4-Aminobenzyl)-1,4,7,10-tetraazacyclododecane tetraacetic acid.

In certain embodiments, the chelator Y is based on S-2-(4-Aminobenzyl)-1,4,7,10-tetraazacyclododecane tetra-tert-butylacetate.

In certain embodiments, the chelator is based on S-2-(4-Isothiocyanatobenzyl)-1,4,7,10-tetraazacyclododecane tetraacetic acid.

In certain embodiments, the chelator Y is based on 1,4,7,10-Tetraazacyclododecane-1,4,7-tris-tert-butyl acetate-10-acetic acid.

In certain embodiments, the chelator Y is based on 1,4,7,10-Tetraazacyclododecane-1,4,7-tris-tert-butyl acetate-10-succinimidyl acetate.

In certain embodiments, the chelator Y is based on 1,4,7,10-Tetraazacyclododecane-1,4,7-tris-tert-butyl acetate-10-maleimidoethylacetamide.

In certain embodiments, the chelator Y is based on 1,4,7,10-Tetraazacyclododecane-1,4,7-tris-acetic acid-10-maleimidoethylacetamide.

In certain embodiments, the chelator Y is based on 1,4,7,10-Tetraazacyclododecane-1,4,7-tris-tert-butyl acetate-10-(N-a-Fmoc-N-e-acetamido-L-lysine).

In certain embodiments, the chelator Y is based on 1,4,7,10-Tetraazacyclododecane-1,4,7-tris(t-butyl acetate)-10-(3-butynylacetamide).

In certain embodiments, the chelator Y is based on 1,4,7,10-Tetraazacyclododecane-1,4,7-tris(t-butyl-acetate)-10-(aminoethylacetamide).

In certain embodiments, the chelator Y is based on 1,4,7,10-Tetraazacyclododecane-1,4,7-tris-tert-butyl acetate-10-(azidopropyl ethylacetamide).

In certain embodiments, the chelator Y is based on 1,4,7,10-Tetraazacyclododecane-1,4,7-tris(t-butyl acetate)-10-(4-aminobutyl)acetamide.

In certain embodiments, the chelator Y is based on 1,4,7,10-Tetraazacyclododecane-1,4,7,10-tetraacetic acid mono-N-hydroxysuccinimide ester.

In certain embodiments, the chelator Y is based on 1,4,7,10-Tetraazacyclododecane-1,4,7-tris(acetic acid)-10-(2-thioethyl)acetamide or other variation of DOTA.

In certain embodiments, the chelator Y is based on S-2-(4-Aminobenzyl)-diethylenetriamine pentaacetic acid or other variation of DTPA.

In certain embodiments, the chelator Y is based on 3,6,9,15-Tetraazabicyclo[9.3.1]pentadeca-1 (15), 11,13-triene-4-S-(4-aminobenzyl)-3,6,9-triacetic acid or other variation on this pentadeca macrocycle.

In certain embodiments, the chelator Y is based on 1-Oxa-4,7,10-tetraazacyclododecane-5-S-(4-aminobenzyl)-4,7,10-triacetic acid or other variation on oxo-substituted macrocycle.

In certain embodiments, the chelator Y is based on 2-S-(4-Isothiocyanatobenzyl)-1,4,7-triazacyclononane-1,4,7-triacetic acid or other variation on this cyclononane.

In certain embodiments, the chelator Y is based on 1-(4-isothiocyanatophenyl)-3-[6,17-dihydroxy-7,10,18,21-tetraoxo-27-(N-acetylhydroxylamino)-6,11,17,22-tetraaza-heptaeicosine] thiourea or other variation on deferoxamine.

In certain embodiments, the chelator Y of the invention is selected from the group consisting of PSC, DOTAM, DOTA, DO3A, DOTAGA, NOTA, NODAGA, NODA-MPAA, HBED, TETA, CB-TE2A, DTPA, DFO, Macropa, HOPO, TRAP, THP, DATA, NOTP, sarcophagine, FSC, NETA, H4octapa, Pycup, NxS4-x (N4, N2S2, N3S), mTc (CO)3-Chelators, DMSA, HIDA, PYP, HYNIC, and MDP. In certain embodiments, the chelator is selected from the group consisting of PSC, DOTA, DOTAM, DO3A and Macropa.

In certain embodiments, F-18, I-123, I-124, I-125, I-131, At-211 are directly 5 conjugated to X without a chelator, such as:

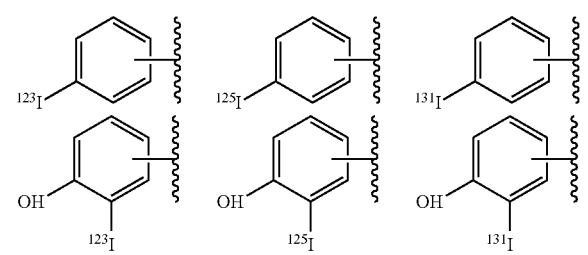

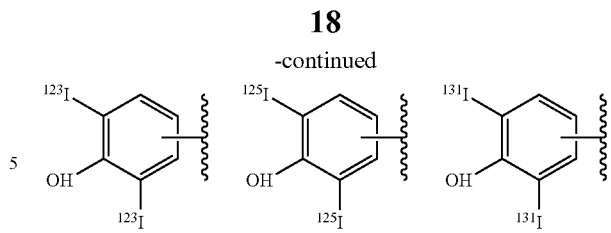

In certain embodiments, I-123, I-124, I-125, I-131 are conjugated to X as mono-iodine or di-iodine via aryl-iodine bond.

In certain embodiments, At-211 is conjugated to X via aryl-Astatine bond. 10

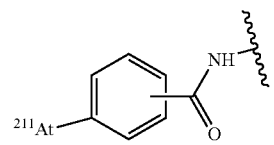

In certain embodiments, At-211 is conjugated to X via boro-Astatine bond.

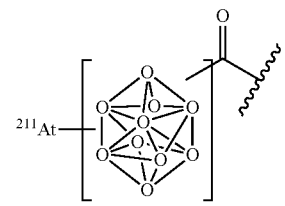

In certain embodiments, F-18, I-123, I-124, I-125, I-131, At-211 are conjugated to X with a linker.

In certain embodiments, F-18, I-123, I-124, I-125, I-131, At-211 are conjugated to X without a linker.

In certain embodiments, Y is a cytotoxic drug payload is conjugated to X via A, B, or C as peptide drug conjugate.

In certain embodiments, the peptide drug conjugate delivers cytotoxic drug payload as prodrug.

In certain embodiments, a cytotoxic drug payload is conjugated to X through a cleavable linker.

In certain embodiments, a cleavable linker can be ester, amide, carbamate, dipeptide, tripeptide, hydrazone, or disulfide as following structures:

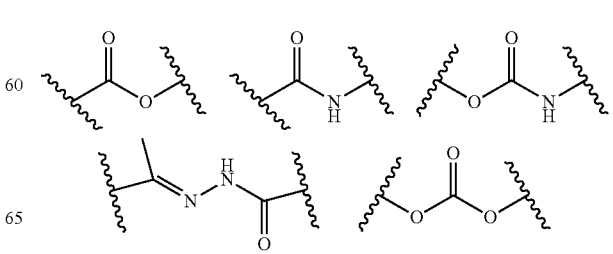

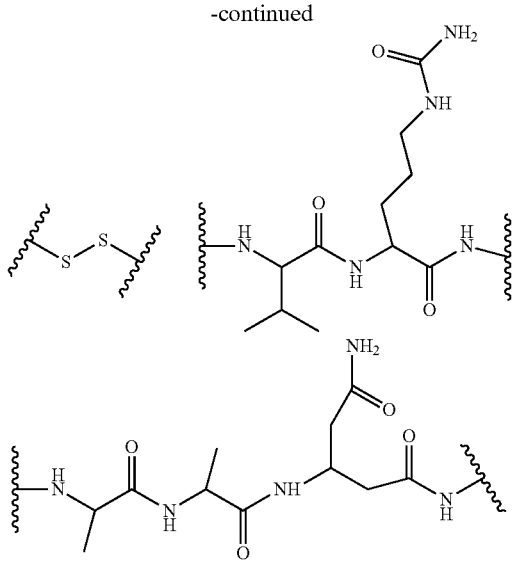

In certain embodiments, a cytotoxic drug payload is released as free drug upon cleavage of the linker.

In certain embodiments, a cytotoxic drug payload is conjugated to X via a non-cleavable linker.

In certain embodiments, the cytotoxic drug payload can be paclitaxel, govitecan, auristatins, epothilone, maytansinoids, taxoids, tubulysins, vinorelbine, mertansine (DM1), monomethyl auristatin E (MMAE), docetaxel, doxorubicin, thapsigargin, melphalan, 5-fluorouracil, calicheamicins, duocarmycin analogs, pyrrolobenzodiazepine, topotecan, bleomycin A2, dactinomycin, and/or mitomycin C.

In certain embodiments, an albumin-binding moiety is conjugated to X via A, B, or C to extend the biological half-life in circulation and to enhance the accumulation in tumor.

In certain embodiments, an albumin-binding moiety can be naphthalene-2-sulfonamide derivatives, Evans Blue derivatives, 4-(p-Iodophenyl)butyric acid derivatives, palmitic acid derivatives, and maleimide derivatives.

Drug Application, Administration, Combinational Use with Other Anti-Cancer Drugs The present invention provides in certain embodiments a method of treating cancer in a patient in need thereof, comprising administering the conjugate described above. In certain embodiments, the cancer is FAP positive cancer or malignancy. In certain embodiments, the cancer is a solid tumor including, but not limited to, sarcoma, salivary gland cancer, esophageal cancer, cholangiocarcinoma, breast cancer, lung cancer, prostate cancer, pancreatic cancer, thymus cancer, head and neck cancer, ovarian cancer, desmoid tumor, chordoma, colorectal cancer, anal cancer, neuroendocrine tumor, small intestine cancer, medullary thyroid cancer, cervical cancer, endometrial cancer, hepatocellular cancer, gastric cancer, adenoid cystic cancer, pheochromocytoma, differentiated thyroid cancer, insulinoma, kidney cancer, skin cancer.

In certain embodiments, the method further comprises administering an anti-cancer composition.

In certain embodiments, the anti-cancer composition comprises, but is not limited to, phenyl butyric acid (PBA) or a pharmaceutically acceptable salt thereof, chloroquine, hydroxychloroquine (laquenil, Axemal (in India), Dolquine and Quensyl, or a pharmaceutical drug that is an antimalarial or inhibits interactions between lysosomes and autophagasomes that overcome resistance that is linked to autophagy; derivative of triphenylphosphonium (TPP), PBA, a histone deacetylation inhibitor, a MAPK pathway inhibitor, such as a MEK inhibitor, a RAS inhibitor, and/or RAF inhibitor.

In certain embodiments, the present invention further comprises administering an immunotherapy targeting regulator protein of the immune system. In certain embodiments, the immunotherapy includes an anti-CTLA-4 monoclonal antibody, Toll-like receptor (TLR) agonist, CD40 agonist, and/or anti-ganglioside monoclonal antibody. In certain embodiments, the immunotherapy includes CTLA-4 and PD1 inhibitors.

In certain embodiments, the present invention further comprises administering a radiosensitizing agent to enhance the tumor-killing efficacy. In certain embodiments, the radiosensitizing agent includes hyperbaric oxygen, carbogen, nicotinamide, metronidazole, mitomycin-C, tirapazamine, procaine, lidocaine, chlorpromazine, 5-fluorouracil, fluorodeoxyuridine, bromodeoxyuridine, iododeoxyuridine, hydroxyurea, gemcitabine, fludarabine, motexafin, gadolinium, N-ethylmaleimide, diamide, diethylmaleate, hyperthermia, paclitaxel, docetaxel, irinotecan)

In certain embodiments, the present invention further comprises administering a DNA damage repair inhibitor to enhance the tumor-killing efficacy. In some embodiments, the DNA damage repair inhibitor includes PARP inhibitor, ATR inhibitor, CHK inhibitor, WEE1 inhibitor; ATM inhibitor, HDAC inhibitor.

In certain embodiments, the conjugate is administered intravenously or parenterally.

In certain embodiments, the method further comprises administering an anti-cancer composition.

In certain embodiments, the conjugate is administered in a single dose.

In certain embodiments, the conjugate is administered in multiple doses.

In certain embodiments, the conjugate is administered sequentially daily for several days.

In certain embodiments, the conjugate is administered once per week for 1 month.

In certain embodiments, the conjugate is administered once per week for up to 6 months.

In certain embodiments, the conjugate is administered in a dose of 1 mCi for medical imaging.

In certain embodiments, the conjugate is administered in a dose of up to 10 mCi for medical imaging.

In certain embodiments, the conjugate is administered in a dose of up to 50 mCi for medical imaging.

In certain embodiments, the conjugate is administered in a dose of 0.1 mCi for medical treatment of the cancerous tumors.

In certain embodiments, the conjugate is administered in a dose of up to 5 mCi for medical treatment of the cancerous tumors.

In certain embodiments, the conjugate is administered in a dose of up to 10 mCi for medical treatment of the cancerous tumors.

In certain embodiments, the conjugate is administered in a dose of up to 100 mCi for medical treatment of the cancerous tumors.

In certain embodiments, the conjugate is administered in a dose of up to 200 mCi for medical treatment of the cancerous tumors.

In certain embodiments, the conjugate is administered for more than a month.

In certain embodiments, the conjugate is administered for more than a year.

In certain embodiments, the conjugate is administered at a dosage of at least 1500 mg/day.

The present invention provides in certain embodiments a kit comprising the conjugate described above, a container, and a package insert or label indicating the administration of the conjugate for treating FAP positive cancer.

The present invention provides in certain embodiments a product comprising the conjugate described above for use in the treatment of FAP positive cancer.

The present invention provides in certain embodiments a use of the conjugate described above; and one or more anti-cancer agents for the therapeutic treatment of melanoma.

The present invention provides in certain embodiments a use of the conjugate described above wherein:
a) the conjugate is administered simultaneously with the one or more anti-cancer agents; or
b) the conjugate and the one or more anti-cancer agents are administered sequentially; or
c) administration of the one or more anti-cancer agents begins about 1 to about 10 days before administration of the conjugate; or
d) administration of the conjugate thereof begins about 1 to about 10 days before administration of the one or more anti-cancer agents; or
e) administration of conjugate and administration of the one or more anti-cancer agents begins on the same day.

The present invention provides in certain embodiments, a method of treating a cell that has upregulated FAP expression as compared to a comparable wildtype cell comprising contacting the cell with a peptide or with the conjugate described above.

In certain embodiments, the upregulation is a result of cancer.

In certain embodiments, the upregulation is a result of a carcinoma.

In certain embodiments, the upregulation is a result of a sarcoma, salivary gland cancer, esophageal cancer, cholangiocarcinoma, breast cancer, lung cancer, prostate cancer, pancreatic cancer, thymus cancer, head and neck cancer, ovarian cancer, desmoid tumor, chordoma, colorectal cancer, anal cancer, neuroendocrine tumor, small intestine cancer, medullary thyroid cancer, cervical cancer, endometrial cancer, hepatocellular cancer, gastric cancer, adenoid cystic cancer, pheochromocytoma, differentiated thyroid cancer, insulinoma, kidney cancer, skin cancer.

In certain embodiments, the molecule is a peptide that is radiolabeled.

The present invention provides in certain embodiments, a method of treating hyperproliferative disorder in a patient in need thereof, comprising (a) administering an agent that increases binds to FAP.

In certain embodiments, the hyperproliferative disorder is a sarcoma, salivary gland cancer, esophageal cancer, cholangiocarcinoma, breast cancer, lung cancer, prostate cancer, pancreatic cancer, thymus cancer, head and neck cancer, ovarian cancer, desmoid tumor, chordoma, colorectal cancer, anal cancer, neuroendocrine tumor, small intestine cancer, medullary thyroid cancer, cervical cancer, endometrial cancer, hepatocellular cancer, gastric cancer, adenoid cystic cancer, pheochromocytoma, differentiated thyroid cancer, insulinoma, kidney cancer, skin cancer.

In certain embodiments, the molecule is a peptide that is radiolabeled.

Treatment with the composite of the invention binds to FAP to effectively detect and/or destroy cancer cells. In certain embodiments, the cancer is drug-resistant. As used herein, the term "drug-resistant" is reduction in effectiveness of a drug in killing malignant cells; reducing cancerous tumor size and rate of growth; and ameliorating the symptoms a disease or condition. In certain embodiments, the drug's effectiveness is reduced by at least about 10%, 20%, 30%, 40%, 50%, 60%, 70%, 80%, 90%, or even 100%, as compared to its effects when first administered to the mammal.

In certain embodiments, the present invention provides a method of treating a cell that has upregulated FAP expression as compared to a comparable wildtype cell comprising contacting the cell with peptide and/or the conjugate described above.

In certain embodiments, the radiolabeled conjugate is administered once per week for 1 month.

In certain embodiments, the radiolabeled conjugate is administered once per week for up to 6 months.

In certain embodiments, the radiolabeled conjugate is administered in a dose of 1 mCi for medical imaging.

In certain embodiments, the radiolabeled conjugate is administered in a dose of up to 10 mCi for medical imaging.

In certain embodiments, the radiolabeled conjugate is administered in a dose of up to 50 mCi for medical imaging.

In certain embodiments, the radiolabeled conjugate is administered in a dose of 0.1 mCi for medical treatment of the cancerous tumors.

In certain embodiments, the radiolabeled conjugate is administered in a dose of up to 1 mCi for medical treatment of the cancerous tumors.

In certain embodiments, the radiolabeled conjugate is administered in a dose of up to 10 mCi for medical treatment of the cancerous tumors.

In certain embodiments, the radiolabeled conjugate is administered in a dose of up to 100 mCi for medical treatment of the cancerous tumors.

In certain embodiments, the conjugate is administered for more than a month.

In certain embodiments, the conjugate is administered for more than a year.

In certain embodiments, the radiolabeled conjugate is administered at a dosage of at least 1500 mg/day.

As used here, "amino acid" or "amino acid sequence" include an oligopeptide, peptide, polypeptide, or protein sequence, or to a fragment, portion, or subunit of any of these, and to naturally occurring or synthetic molecules. The terms "polypeptide" and "protein" include amino acids joined to each other by peptide bonds or modified peptide bonds, i.e., peptide isosteres, and may contain modified amino acids other than the 20 gene-encoded amino acids. The term "polypeptide" also includes peptides and polypeptide fragments, motifs and the like. Capitalized, single-letter abbreviations of the amino acids refer to the natural L-isomer. Lower case, single-letter abbreviations of the amino acids denotes the D-isomer.

The terms "polypeptide," "peptide," and "protein" are used interchangeably to refer to polymers of amino acids of any length. Peptides and polypeptides can be either entirely composed of synthetic, non-natural analogues of amino acids, or, is a chimeric molecule of partly natural peptide amino acids and partly non-natural analogs of amino acids. In one aspect, a polypeptide is used in a composition, cell system or process of the invention (e.g., a host cell having a plasmid expressing at least one enzyme of the invention). In addition, polypeptide can refer to compounds comprised of polymers of amino acids covalently attached to another functional group (e.g., solubilizing group, a targeting group, PEG, non-amino acid group, or other therapeutic agent).

Amino acids and non-natural amino acids may be abbreviated using the following designation in parentheses: Proline (Pro)(P), Valine (Val)(V), Lysine (Lys)(K), Ornithine (Or)(O), Norleucine (Nle), Glycine (Gly)(G), Tryptophan (Trp)(W), Alanine (Ala)(A), Phenylalanine (Phe)(F), Arginine (Arg)(R), Histidine (His)(H), Glutamic acid (Glu)(E), Aspartic acid (Asp)(D), Serine (Ser)(S), Methionine (Met) (M), Isoleucine (Ile)(I), Tyrosine (Tyr)(Y), Cyclohexylalanine (Cha), 4-fluoro-D-phenylglycine (4-fluoro-D-Phg), 2-thienyl-D-alanine (D-Thi), Cysteine (Cys) (C), Threonine (Thr) (T), Asparagine (Asn) (N), Glutamine (Gln) (Q).

Polypeptide compositions of the invention can contain any combination of non-natural structural components. Individual peptide residues can be joined by Fmoc-based solid phase synthesis. Linking groups that can be an alternative to the traditional amide bond ("peptide bond") linkages include, e.g., ketomethylene (e.g., —C(=O)—CH$_2$— for —C(=O)—NH—), aminomethylene (CH2-NH), ethylene, olefin (CH=CH), ether (CH2-O), thioether (CH2-S), tetrazole, thiazole, retroamide, thioamide, or ester (see, e.g., Spatola (1983) in Chemistry and Biochemistry of Amino Acids, Peptides and Proteins, Vol. 7, pp. 267-357, "Peptide Backbone Modifications," Marcel Dekker, N.Y., incorporated herein by reference).

Polypeptides used to practice the method of the invention can be modified by either natural processes, such as post-translational processing (e.g., phosphorylation, acylation, etc), or by chemical modification techniques, and the resulting modified polypeptides. Modifications can occur anywhere in the polypeptide, including the peptide backbone, the amino acid side-chains and the amino or carboxyl terminus. It will be appreciated that the same type of modification may be present in the same or varying degrees at several sites in a given polypeptide. Also a given polypeptide may have many types of modifications. Modifications include N-methylation, acetylation, acylation, ADP-ribosylation, amidation, covalent attachment of flavin, covalent attachment of a heme moiety, covalent attachment of a nucleotide or nucleotide derivative, covalent attachment of a lipid or lipid derivative, covalent attachment of a phosphatidylinositol, cross-linking cyclization, disulfide bond formation, demethylation, formation of covalent cross-links, formation of cysteine, formation of pyroglutamate, formylation, gamma-carboxylation, glycosylation, GPI anchor formation, hydroxylation, iodination, methylation, myristoylation, oxidation, PEGylation, proteolytic processing, phosphorylation, prenylation, selenoylation, sulfation, and transfer-RNA mediated addition of amino acids to protein such as arginylation. See, e.g., Creighton, T. E., Proteins—Structure and Molecular Properties 2nd Ed., W. H. Freeman and Company, New York (1993); Posttranslational Covalent Modification of Proteins, B. C. Johnson, Ed., Academic Press, New York, pp. 1-12 (1983), incorporated herein by reference. "Biologically active" moieties include a molecule or compound that elicits or modulates a physiological response.

By "modulate" and "modulation" is meant that the activity of one or more proteins or protein subunits is up regulated or down regulated, such that expression, level, or activity is greater than or less than that observed in the absence of the modulator. For example, the term "modulate" can mean "inhibit" or "stimulate".

"N-terminal sequence" includes reference to the start of the amino acid chain terminated typically, but not necessarily, by a free amine (—NH2) group. The convention for writing peptide sequences is to put the N-terminal end on the left and write the sequence from N- to C-terminus. The N-terminal sequence may comprise 1 to 100 amino acids, preferably 2 to 15 amino acids, and even more preferably 3 to 10 amino acids. The N-terminal sequence may terminate with an amine group or the terminus may be modified by well-known methods in the art to comprise a functional member (e.g. targeting group, retention signal, lipid, and anchor).

"C-terminal sequence" includes reference to the end of the amino acid chain terminated typically, but not necessarily, by a carboxyl group. The convention for writing peptide sequences is to put the C-terminal end on the right and write the sequence from N- to C-terminus. The C-terminal sequence may comprise 1 to 100 amino acids, preferably 2 to 15 amino acids, and even more preferably 3 to 10 amino acids. The C-terminal sequence may terminate with a carboxyl group or the terminus may be modified by well-known methods in the art to comprise a functional member (e.g. targeting group, retention signal, lipid, and anchor).

Anti-Cancer/Cytotoxic Agents

As used herein, the terms "anti-cancer agent" or "cytotoxic agent" includes therapeutic agents that kill cancer cells; slow tumor growth and cancer cell proliferation; and ameliorate or prevent one or more of the symptoms of cancer. An anti-cancer agent includes pharmaceutically acceptable salts. The term "pharmaceutically acceptable salts" refers to salts that retain the desired biological activity of the above-identified compounds, and include pharmaceutically acceptable acid addition salts and base addition salts. Suitable pharmaceutically acceptable acid addition salts may be prepared from an inorganic acid or from an organic acid. Examples of such inorganic acids are hydrochloric, sulfuric, and phosphoric acid. Appropriate organic acids may be selected from aliphatic, cycloaliphatic, aromatic, heterocyclic carboxylic and sulfonic classes of organic acids, examples of which are formic, acetic, propionic, succinic, glycolic, gluconic, lactic, malic, tartaric, citric, fumaric, maleic, alkyl sulfonic, arylsulfonic. Additional information on pharmaceutically acceptable salts can be found in Remington's Pharmaceutical Sciences, 19th Edition, Mack Publishing Co., Easton, Pa. 1995. In the case of agents that are solids, it is understood by those skilled in the art that the inventive compounds, agents and salts may exist in different crystalline or polymorphic forms, all of which are intended to be within the scope of the present invention and specified formulae.

In certain embodiments, the anti-cancer/cytotoxic agent is a MAPK pathway inhibitor, including but not limited to cobimetinib, dabrafenib, and/or trametinib.

In certain embodiments, a cytotoxic agent is conjugated to X via A, B, or C as a peptide drug conjugate.

In certain embodiments, the cytotoxic agent can be one or more of paclitaxel, govitecan, auristatins, epothilone, maytansinoids, taxoids, tubulysins, vinorelbine, mertansine (DM1), monomethyl auristatin E (MMAE), docetaxel, doxorubicin, thapsigargin, melphalan, 5-fluorouracil, calicheamicins, duocarmycin analogs, pyrrolobenzodiazepine, topotecan, bleomycin A2, dactinomycin, or mitomycin C.

In certain embodiments, an albumin-binding moiety is conjugated to X via A, B, or C to extend the biological half-life in circulation and to enhance the accumulation in tumor.

In certain embodiments, an albumin-binding moiety can be one or more of naphthalene-2-sulfonamide derivatives, Evans Blue derivatives, 4-(p-Iodophenyl)butyric acid derivatives, palmitic acid derivatives, or maleimide derivatives.

Compositions and Methods of Administration

The present invention provides a method for increasing the anticancer effects of a conventional cancer therapy (i.e., radio- and/or chemo-therapy) on cancerous cells in a mammal, comprising contacting the cancerous cell with an effective amount of a conjugate as already described.

In certain embodiments, the conjugate is administered along with an additional conventional cancer therapy modality. In certain embodiments, the additional cancer therapy is chemotherapy and/or radiation. In certain embodiments, the conjugate of the invention and anti-cancer agent are administered sequentially to a mammal rather than in a single composition. In certain embodiments, the mammal is a human.

The present invention provides a method for increasing the anticancer effects of a conventional cancer therapy (i.e., radio- and/or chemo-therapy) on cancerous cells in a mammal, comprising contacting the cancerous cell with an effective amount of an agent that increases expression of FAP.

The term "therapeutically effective amount" or "effective amount" is an amount sufficient to effect beneficial or desired clinical results. An effective amount can be administered in one or more administrations. An effective amount is typically sufficient to palliate, ameliorate, stabilize, reverse, slow or delay the progression of the disease state. The present invention provides a "substantially pure compound". The term "substantially pure compound" is used herein to describe a molecule, such as a polypeptide that is substantially free of other proteins, lipids, carbohydrates, nucleic acids, and other biological materials with which it is naturally associated. For example, a substantially pure molecule, such as a polypeptide, can be at least 60%, by dry weight, the molecule of interest. The purity of the polypeptides can be determined using standard methods including, e.g., polyacrylamide gel electrophoresis (e.g., SDS-PAGE), column chromatography (e.g., high performance liquid chromatography (HPLC)), and amino-terminal amino acid sequence analysis.

"Treatment", "treating", "treat" or "therapy" as used herein refers to administering, to a mammal, agents that are capable of eliciting a prophylactic, curative or other beneficial effect in the individual. Treatment may additionally result in attenuating or ameliorating a disease or symptoms of a disease in a subject.

In certain embodiments, the conjugate is administered along with an additional conventional cancer therapy modality. In certain embodiments, the additional cancer therapy is chemotherapy and/or radiation. In certain embodiments, the conjugate and anticancer agent are administered sequentially to a mammal rather than in a single composition. In certain embodiments, the mammal is a human.

In certain embodiments of the methods described above, the tumor is reduced in volume by at least 10%. In certain embodiments, the tumor is reduced by any amount between 1-100%. In certain embodiments, the tumor uptake of molecular imaging agents, such as fluorine-18 deoxyglucose, fluorine-18 thymidine or other suitable molecular imaging agent, is reduced by any amount between 1-100%. In certain embodiments the imaging agent is fluorine-18 deoxyglucose, fluorine-18 thymidine or other suitable molecular imaging agent. In certain embodiments, the mammal's symptoms (such as flushing, nausea, fever, or other maladies associated with cancerous disease) are alleviated.

Administration of a compound as a pharmaceutically acceptable acid or base salt may be appropriate. Examples of pharmaceutically acceptable salts are organic acid addition salts formed with acids which form a physiological acceptable anion, for example, tosylate, methanesulfonate, acetate, citrate, malonate, tartrate, succinate, benzoate, ascorbate, a-ketoglutarate, and a-glycerophosphate. Suitable inorganic salts may also be formed, including hydrochloride, sulfate, nitrate, bicarbonate, and carbonate salts.

Pharmaceutically acceptable salts may be obtained using standard procedures well known in the art, for example by reacting a sufficiently basic compound such as an amine with a suitable acid affording a physiologically acceptable anion. Alkali metal (for example, sodium, potassium or lithium) or alkaline earth metal (for example calcium) salts of carboxylic acids can also be made.

The conjugates of the invention can be formulated as pharmaceutical compositions and administered to a mammalian host, such as a human patient in a variety of forms adapted to the chosen route of administration by intravenous, intramuscular, topical or subcutaneous routes.

The active compound may also be administered intravenously or intraperitoneally by infusion or injection. Solutions of the active compound or its salts can be prepared in water, isotonic saline, phosphate-buffered saline, optionally mixed with a nontoxic surfactant. Dispersions can also be prepared in glycerol, liquid polyethylene glycols, triacetin, and mixtures thereof and in oils.

In certain embodiments, the final solution contains ethanol from 0 to 20% v/v.

In certain embodiments, the final pH of the solution is 2-9.

In certain embodiments, the radioactive compound is administered with additional amino acids to reduce the uptake of radioactive compound in kidneys. In certain embodiments, the amino acids are lysine and arginine.

Under ordinary conditions of storage and use, these preparations contain a preservative excipient to prevent the growth of microorganisms.

The pharmaceutical dosage forms suitable for injection or infusion can include sterile aqueous solutions or dispersions or sterile powders comprising the active ingredient which are adapted for the extemporaneous preparation of sterile injectable or infusible solutions or dispersions, optionally encapsulated in liposomes. In all cases, the ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars, buffers or sodium chloride. Prolonged absorption of the injectable compositions can be brought about by the use in the compositions of agents delaying absorption, for example, aluminum monostearate and gelatin.

Sterile injectable solutions are prepared by incorporating the active compound in the required amount in the appropriate solvent with various other ingredients enumerated above, as required, followed by filter sterilization. In the case of sterile powders for the preparation of sterile injectable solutions, the preferred methods of preparation are vacuum drying and the freeze drying techniques, which yield a powder of the active ingredient plus any additional desired ingredient present in the previously sterile-filtered solutions.

For topical administration, the present compounds may be applied in pure form, i.e., when they are liquids. However, it may be desirable to administer them to the skin as compositions or formulations, in combination with a dermatologically acceptable carrier, which may be a solid or a liquid.

Useful solid carriers include finely divided solids such as talc, clay, microcrystalline cellulose, silica, alumina and the like. Useful liquid carriers include water, alcohols or glycols or water-alcohol/glycol blends, in which the present compounds can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using pump-type or aerosol sprayers.

Thickeners such as synthetic polymers, fatty acids, fatty acid salts and esters, fatty alcohols, modified celluloses or modified mineral materials can also be employed with liquid carriers to form spreadable pastes, gels, ointments, soaps, and the like, for application directly to the skin of the user.

Examples of useful dermatological compositions which can be used to deliver the compounds of the present invention to the skin are known to the art; for example, see Jacquet et al. (U.S. Pat. No. 4,608,392), Geria (U.S. Pat. No. 4,992,478), Smith et al. (U.S. Pat. No. 4,559,157) and Wortzman (U.S. Pat. No. 4,820,508).

The dosage of the conjugates of the invention vary depending on age, weight, and condition of the subject. Treatment may be initiated with small dosages containing less than optimal doses, and increased until a desired, or even an optimal effect under the circumstances, is reached. In general, the dosage is about 450-600 mg/kg/day in patients weighing less than 20 kg, or 9.9-13.0 g/m$^2$/day in larger patients. Higher or lower doses, however, are also contemplated and are, therefore, within the confines of this invention. A medical practitioner may prescribe a small dose and observe the effect on the subject's symptoms. Thereafter, they may increase the dose if suitable. In general, the agents of the invention may be administered at a concentration that affords effective results without causing any unduly harmful or deleterious side effects, and may be administered either as a single unit dose, or if desired in convenient subunits administered at suitable times.

A pharmaceutical composition of the invention is formulated to be compatible with its intended route of administration. For example, the therapeutic agent may be introduced directly into the cancer of interest via direct injection. Additionally, examples of routes of administration include oral, parenteral, e.g., intravenous, slow infusion, intradermal, subcutaneous, oral (e.g., ingestion or inhalation), transdermal (topical), transmucosal, and rectal administration. Such compositions typically comprise the pharmaceutical agent and a pharmaceutically acceptable carrier. As used herein, "pharmaceutically acceptable carrier" is intended to include any and all solvents, dispersion media, coatings, antibacterial and antifungal agents, isotonic and absorption delaying agents, and the like, compatible with pharmaceutical administration, and a dietary food-based form. The use of such media and agents for pharmaceutically active substances is well known in the art and food as a vehicle for administration is well known in the art.

Solutions or suspensions can include the following components: a sterile diluent such as water for injection, saline solution (e.g., phosphate buffered saline (PBS)), fixed oils, a polyol (for example, glycerol, propylene glycol, and liquid polyetheylene glycol, and the like), glycerine, or other synthetic solvents; antibacterial and antifungal agents such as parabens, chlorobutanol, phenol, ascorbic acid, thimerosal, and the like; antioxidants such as ascorbic acid, gentisic acid, sodium bisulfite; chelating agents such as EDTA, DTPA, DMSA, DMPS; buffers such as acetates, citrates or phosphates and agents for the adjustment of tonicity such as sodium chloride or dextrose. The proper fluidity can be maintained, for example, by the use of a coating such as lecithin, by the maintenance of the required particle size in the case of dispersion and by the use of surfactants. In many cases, it is preferable to include isotonic agents, for example, sugars, polyalcohols such as mannitol or sorbitol, and sodium chloride in the composition. Prolonged administration of the injectable compositions can be brought about by including an agent that delays absorption. Such agents include, for example, aluminum monostearate and gelatin. The parenteral preparation can be enclosed in ampules, disposable syringes, or multiple dose vials made of glass or plastic.

It may be advantageous to formulate compositions in dosage unit form for ease of administration and uniformity of dosage. Dosage unit form as used herein refers to physically discrete units suited as unitary dosages for an individual to be treated; each unit containing a predetermined quantity of active compound calculated to produce the desired therapeutic effect in association with the required pharmaceutical carrier. The dosage unit forms of the invention are dependent upon the amount of a compound necessary to produce the desired effect(s). The amount of a compound necessary can be formulated in a single dose, or can be formulated in multiple dosage units. Treatment may require a one-time dose, or may require repeated doses.

"Systemic delivery," as used herein, refers to delivery of an agent or composition that leads to a broad biodistribution of an active agent within an organism. Some techniques of administration can lead to the systemic delivery of certain agents, but not others. Systemic delivery means that a useful, preferably therapeutic, amount of an agent is exposed to most parts of the body. To obtain broad biodistribution generally requires a blood lifetime such that the agent is not rapidly degraded or cleared (such as by first pass organs (liver, lung, etc.) or by rapid, nonspecific cell binding) before reaching a disease site distal to the site of administration. Systemic delivery of lipid particles can be by any means known in the art including, for example, intravenous, subcutaneous, and intraperitoneal. In a preferred embodiment, systemic delivery of lipid particles is by intravenous delivery.

"Local delivery," as used herein, refers to delivery of an active agent directly to a target site within an organism. For example, an agent can be locally delivered by direct injection into a disease site, other target site, or a target organ such as the skin.

The term "mammal" refers to any mammalian species such as a human, mouse, rat, dog, cat, hamster, guinea pig, rabbit, livestock, and the like.

The terms "treat" and "treatment" refer to both therapeutic treatment and prophylactic or preventative measures, wherein the object is to prevent or decrease an undesired physiological change or disorder, such as the development or spread of cancer. For purposes of this invention, beneficial or desired clinical results include, but are not limited to, alleviation of symptoms, diminishment of extent of disease, stabilized (i.e., not worsening) state of disease, delay or slowing of disease progression, amelioration or palliation of the disease state, and remission (whether partial or total), whether detectable or undetectable. "Treatment" can also mean prolonging survival as compared to expected survival if not receiving treatment. Those in need of treatment include those already with the condition or disorder as well as those prone to have the condition or disorder or those in which the condition or disorder is to be prevented.

The following examples are intended to further illustrate the invention. They are not intended to limit the invention in any manner.

Example 1

Binding Affinity Against Human Fibroblast Activation Protein (FAP)

An enzyme inhibition assay was performed to determine $IC_{50}$ values and then the Cheng-Prusoff equation used to calculate the $K_i$ given a known $K_m$ of the substrate Z-GP-AMC for FAP. To perform the assay, FAP (5 ng/well) and the test peptide at varying concentrations (i.e. $10^{-6}$ to $10^{-12}$) were incubated in a black 96-well plate for 10 minutes at RT on a shaker plate. Then, the substrate Z-GP-AMC was added to give a final concentration of 50 µM. The total reaction volume per well was 100 µL The reaction was allowed to incubate at RT on a shaker plate for 1 hour protected from light, and then fluorescence read with a BioTek Synergy LX plate reader at an ex/em (360/40 and 460/40). Experiments were performed in at least duplicate, and controls of buffer only, buffer and FAP enzyme, and buffer with substrate and FAP enzyme only were included for comparison. The buffer used for the assay was 50 mM Tris-HCl, 1M NaCl, and 1 mg/mL BSA, pH=7.5. Data was plotted in GraphPad Prism and non-linear regression used to calculate $IC_{50}$ values. The compounds tested and $K_i$ values of each were as follows:

| Compound | Compound sequence | $K_i$ (nM) |
| --- | --- | --- |
| VMT-FAP-2-12 | Ac-S[C(oXdB)TPFEQWWC]-NH2 | 0.55 |
| VMT-FAP-2-19 | A[C(oXdB)TPFEQWWC]-NH2 | 0.45 |
| VMT-FAP-2-23 | S[C(oXdB)TPFEAWWC]-NH2 | 0.29 |
| VMT-FAP-1-1 | Ac-G[C(oXdB)TPFEQWWC]-NH2 | 10.45 |
| VMT-FAP-1-13 | Ac-R[C(oXdB)TPFEQWWC]-NH2 | 2.82 |
| VMT-FAP-1-14 | Ac-D[C(oXdB)TPFEQWWC]-NH2 | 0.36 |
| VMT-FAP-1-17 | Ac-N[C(oXdB)TPFEQWWC]-NH2 | 10.72 |
| VMT-FAP-1-62 | Ac-N[C(oXdB)TPWEQWWC]-NH2 | 0.46 |
| VMT-FAP-1-64 | Ac-N[C(oXdB)TPHEQWWC]-NH2 | 10.72 |
| VMT-FAP-1-94 | Ac-S[C(oXdB)TPFEIWWC]-NH2 | 5.01 |
| VMT-FAP-1-101 | Ac-S[C(oXdB)TPFEHWWC]-NH2 | 11.24 |
| VMT-FAP-1-104 | Ac-S[C(oXdB)TPFEDWWC]-NH2 | 1.83 |
| VMT-FAP-1-105 | Ac-S[C(oXdB)TPFEEWWC]-NH2 | 0.38 |
| VMT-FAP-2-26 | Ac-S-[C(oXdB)TPFEQWWC]-Lys(NH2)-PEG2-PSC | 0.38 |
| VMT-FAP-2-28 | Ac-S[C(oXdB)TPFEQWYC]-NH2 | 2.29 |
| VMT-FAP-2-29 | Ac-S[C(oXdB)TPFEQYWC]-NH2 | 13.55 |
| VMT-FAP-2-30 | PSC-PEG2-S-[C(oXdB)TPFEQWWC]-NH2 | 0.04 |
| VMT-FAP-2-33 | Ac-S-[Dap(bGlu(F-PEG2-PSC))TPFEQWWDap]-NH2 | 1.26 |
| VMT-FAP-2-36 | PSC-PEG2-[C(oXdB)TPFEQWWC]-NH2 | 0.76 |
| VMT-FAP-2-39 | PSC-PEG2-F-S-[C(oXdB)TPFEQWWC]-NH2 | 0.67 |
| VMT-FAP-2-40 | Ac-[C(oXdB)TPFEQWWC]-NH2 | 1.27 |
| VMT-FAP-2-41 | PSC-PEG2-D-[C(oXdB)TPFEQWWC]-NH2 | 0.19 |
| VMT-FAP-2-42 | PSC-PEG2-S-[C(oXdB)TPWEQWWC]-NH2 | 0.29 |
| VMT-FAP-2-43 | PSC-PEG2-S-[C(oXdB)TPFEEWWC]-NH2 | 0.07 |
| VMT-FAP-2-48 | PSC-PEG2-S-[C(mXdB)TPWEQWWC]-NH2 | 0.35 |
| VMT-FAP-2-51 | Ac-[C(mXtB(CA-PEG2-PSC))TPWEQWWC]-NH2 | 0.28 |
| VMT-FAP-2-53 | PSC-PEG2-[SC(oXdB)TP2-NalEQWWC]-NH2 | 0.34 |
| VMT-FAP-2-55 | Ac-S-[C(mXtB(CA-PEG2-PSC))TPWEQWWC]-NH2 | 1.12 |
| VMT-FAP-2-57 | But-[C(mXtB(CA-PEG2-PSC))TPWEQWWC]-NH2 | 0.71 |
| VMT-FAP-2-59 | PSC-PEG2-[C(oXdB)TPWEQWWC]-NH2 | 0.36 |
| VMT-FAP-2-60 | PSC-PEG2-S-[C(oXdB)TP1-NalEQWWC]-NH2 | 0.48 |
| VMT-FAP-2-61 | PCS-PEG2-S-[C(oXdB)TPBtaEQWWC]-NH2 | 0.30 |
| VMT-FAP-2-62 | PCS-PEG2-S-[C(oXdB)TP3-PalEQWWC]-NH2 | 0.61 |
| VMT-FAP-2-67 | PSC-PEG1-[C(oXdB)TPWEQWWC]-NH2 | 0.08 |
| VMT-FAP-2-68 | PSC-PEG3-[C(oXdB)TPWEQWWC]-NH2 | 0.64 |
| VMT-FAP-2-69 | PSC-PEG4-[C(oXdB)TPWEQWWC]-NH2 | 0.01 |
| VMT-FAP-2-70 | PSC-6AHA-[C(oXdB)TPWEQWWC]-NH2 | 0.64 |
| VMT-FAP-2-72 | PSC-Bn-NCS-PEG1-[C(oXdB)TPWEQWWC]-NH2 | 0.79 |
| VMT-FAP-2-73 | PSC-Bn-NCS-PEG2-[C(oXdB)TPWEQWWC]-NH2 | 3.61 |
| VMT-FAP-2-74 | PSC-12-Ado-[C(oXdB)TPWEQWWC]-NH2 | 6.66 |
| VMT-FAP-2-75 | PSC-6AHA-[C(oXdB)TPWEQWWC]-COOH | 1.26 |
| VMT-FAP-2-76 | PSC-PEG2-[C(oXdB)TPWEQWWC]-COOH | 31.37 |
| VMT-FAP-2-77 | NODA-PEG2-[C(oXdB)TPWEQWWC]-NH2 | 4.59 |
| VMT-FAP-2-78 | NOTA-PEG2-[C(oXdB)TPWEQWWC]-NH2 | 0.01 |
| VMT-FAP-2-82 | PSC-PEG2-[C(pXdB)TPWEQWWC]-NH2 | 2.68 |
| VMT-FAP-2-83 | PSC-PEG2-[C(mXdB)TPWEQWWC]-NH2 | 0.54 |
| VMT-FAP-2-84 (reverse sequence) | PSC-PEG2-[C(oXdB)WWQEWPTC]S-NH2 | 115 |

Abbreviations:
oXdB: 1,2-bis(bromomethyl)benzene;
mXdB: 1,3-bis(bromomethyl)benzene;
mXtB: 1,3,5-Tris(bromomethyl) benzene;
6-AHA—6-amino hexanoic acid;
Bn-NCS—Benzyl-isothiocyanate;
12-ado—12-amino-dodecanoic acid;
PEG—amino-polyethylene glycol-acid;
CA: cysteamine;
bGlu—beta-glutamic acid

Example 2

In Vivo Biodistribution of Pb-203-Labeled FAP-Targeted Radiopeptides in Tumor Models To determine the biodistribution of the example conjugates, athymic nude mice were inoculated with hFAP-HT1080 FAP overexpressing cells with 50% Cultrex matrigel, and tumors allowed to grow for 2-3 weeks. The conjugates were then radiolabeled with $^{203}$Pb and 74 kBq was injected through i.v. injection into mice bearing hFAP-HT1080 tumors. The molar activity was between 5-50 MBq/nmol. At 2 hours, and 24 hours, mice were euthanized following the animal protocol and blood, lungs, spleen, muscle, tumor, kidneys, and liver were collected. The samples were then analyzed via a Packard COBRA II automatic gamma counter and compared to reference doses to determine % ID/g (n=2). The results are illustrated in FIGS. 1-24.

Example 3

Binding Specificity of VMT-FAP-2-59

Figure 54:
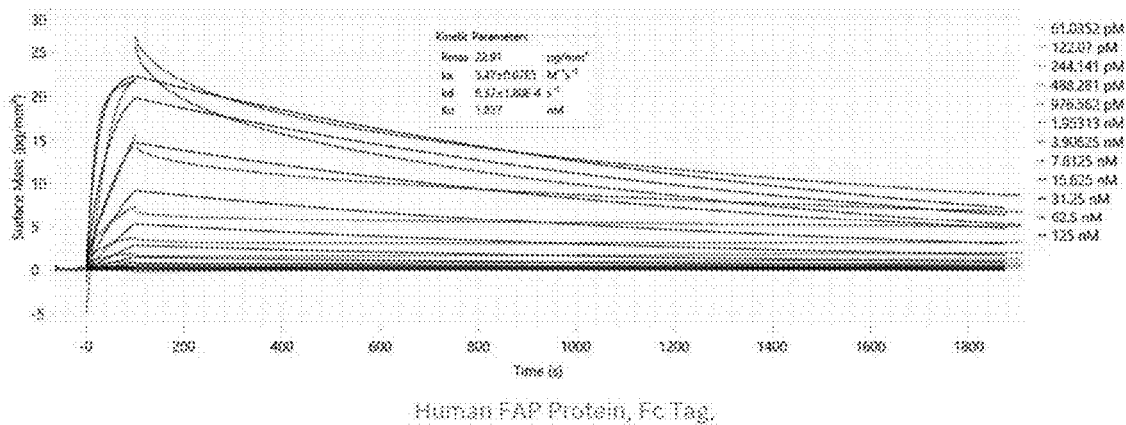
FIG. 54 illustrates the binding affinity of VMT-FAP-2-59 in hFAP in accordance with Example 3.
Figure 55:
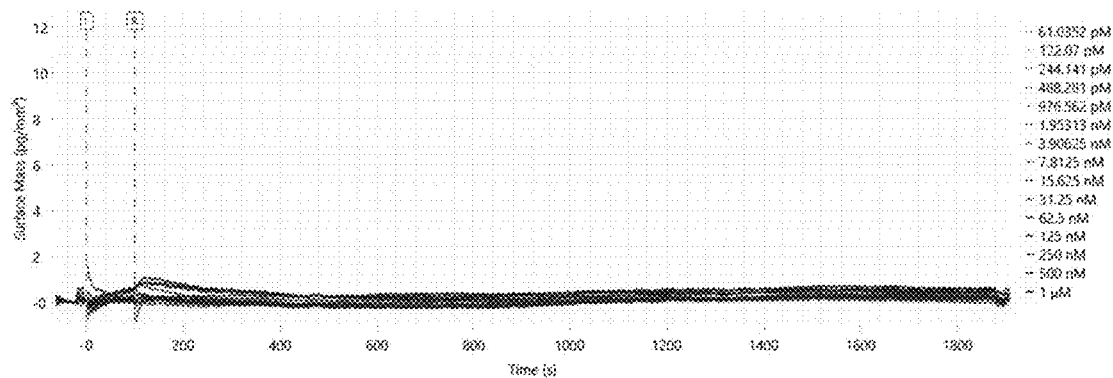
FIG. 55 illustrates a GCI binding assay of VMT-FAP-2-59 in hPREP and VMT-FAP-2-59 in hDPPIV in accordance with Example 3.
Figure 55:
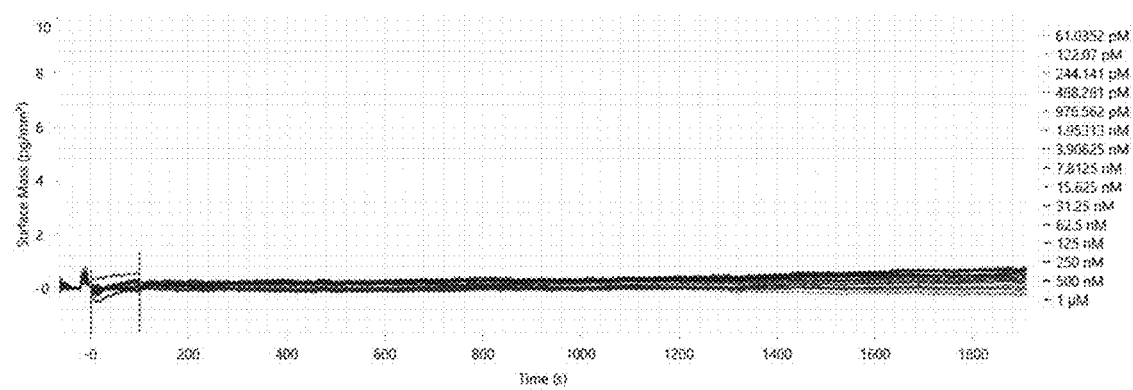

The enzyme inhibition assay was performed to determine inhibitor constant (i.e., Ki) values against human FAP, mouse FAP, human dipeptidyl peptidase 4 (DPPIV) and human prolyl endopeptidase (PREP). Z-GP-AMC was used as substrate for human FAP, mouse FAP and human PREP. GP-AMC was used as substrate for human DPPIV. To perform the assay, VMT-FAP-2-59 at varying concentrations (i.e. $10^{-6}$ to $10^{-12}$) were incubated with 5 ng hFAP, 5 ng mFAP, 2.5 ng DPPIV, or 5 ng PREP in a black 96-well plate for 10 minutes at RT on a shaker plate. The substrate was added to give a final concentration of 50 μM for Z-GP-AMC and GP-AMC. The total reaction volume per well was 100 μL The reaction was allowed to incubate at RT on a shaker plate for 1 hour protected from light, and then fluorescence was read with a BioTek Synergy LX plate reader at an ex/em (360/40 and 460/40). Experiments were performed in at least duplicate. Buffer only, buffer/enzymes, buffer/substrate and enzyme only were included as controls. Data was plotted in GraphPad Prism and non-linear regression used to calculate $IC_{50}$ values. Binding kinetics (Kd) of VMT-FAP-2-59 against human FAP, human DPPIV and human PREP were also determined by grating-coupled interferometry (GCI). hFAP, hDPPIV and hPREP proteins were fixed on PCH (N=3) chips or PCP (N=2). On PCH chips, binding affinity of VMT-FAP-2-29 to hFAP was determined at concentration from 61 pM to 125 nM. binding affinity of VMT-FAP-2-29 to hDPPIV and hPREP was determined at concentration from 61 pM to 1 μM. On PCP chips, binding affinity of VMT-FAP-2-29 to hFAP was determined from 61 pM to 125 nM. Binding affinity of VMT-FAP-2-29 to hDPPIV and hPREP was determined from 61 pM to 1 μM. On PCP chips, binding affinity of VMT-FAP-2-29 to hFAP was determined from 39 pM to 20 nM. Binding affinity to hDPPIV and hPREP was determined at concentration from 39 pM to 50 nM. The results were summarized in the following table. Representative GCI kinetic curves were shown in FIGS. 54-55.

|  | Kd | Ki |
| --- | --- | --- |
| Human FAP | 2 nM | 0.4 nM |
| Mouse FAP | N/A | 4.2 nM |
| Human DPPIV | No binding | No binding |
| Human PREP | No binding | 152 nM |

Example 4

Radiochemical Stability of [$^{203}$Pb]VMT-FAP-2-59 in Human Serum

Figure 56:
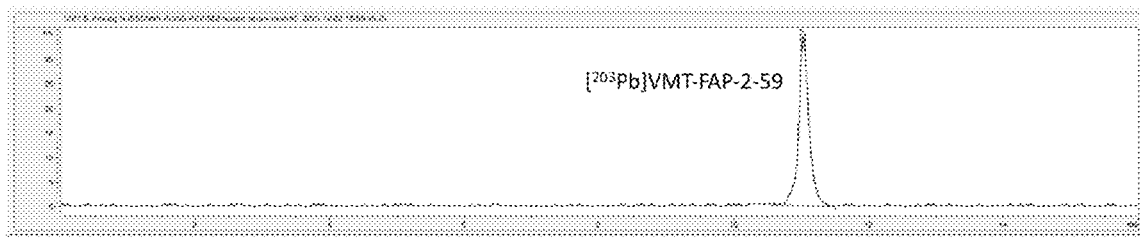
FIG. 56 illustrates the metabolic stability of [$^{203}$Pb]VMT-FAP-2-59 after incubation in human serum for 96 hours with Example 4.

Fresh human serum was collected from blood, obtained from the University of Iowa DeGowin Blood Center. Blood was allowed to clot at room temperature for 1 hour, and then centrifuged at 1500 g for 10 min and the supernatant serum was collected. The human serum was then incubated with 3.3 MBq [$^{203}$Pb]VMT-FAP-2-59 at 37° C. for 96 hours. An aliquot of serum containing radiotracer was obtained after 96 hours and protein was precipitated via methanol. 1.5-fold v/v ice-cold methanol was added and incubated on ice for 15 minutes. Then, the aliquot containing methanol was centrifuged for 10 minutes at 10,000 g to precipitate protein and the supernatant was collected. To determine stability in serum, the supernatant was analyzed via HPLC with a radio-detector. The HPLC gradient used 5% to 60% of 0.1% TFA in acetonitrile over 0.1% TFA in water in 10 min on an Agilent 1200 series. Stable [$^{203}$Pb]VMT-FAP-2-59 in human serum was found after 96-hour incubation in fresh human serum at 37° C., as shown in FIG. 56.

Example 5

Figure 57:
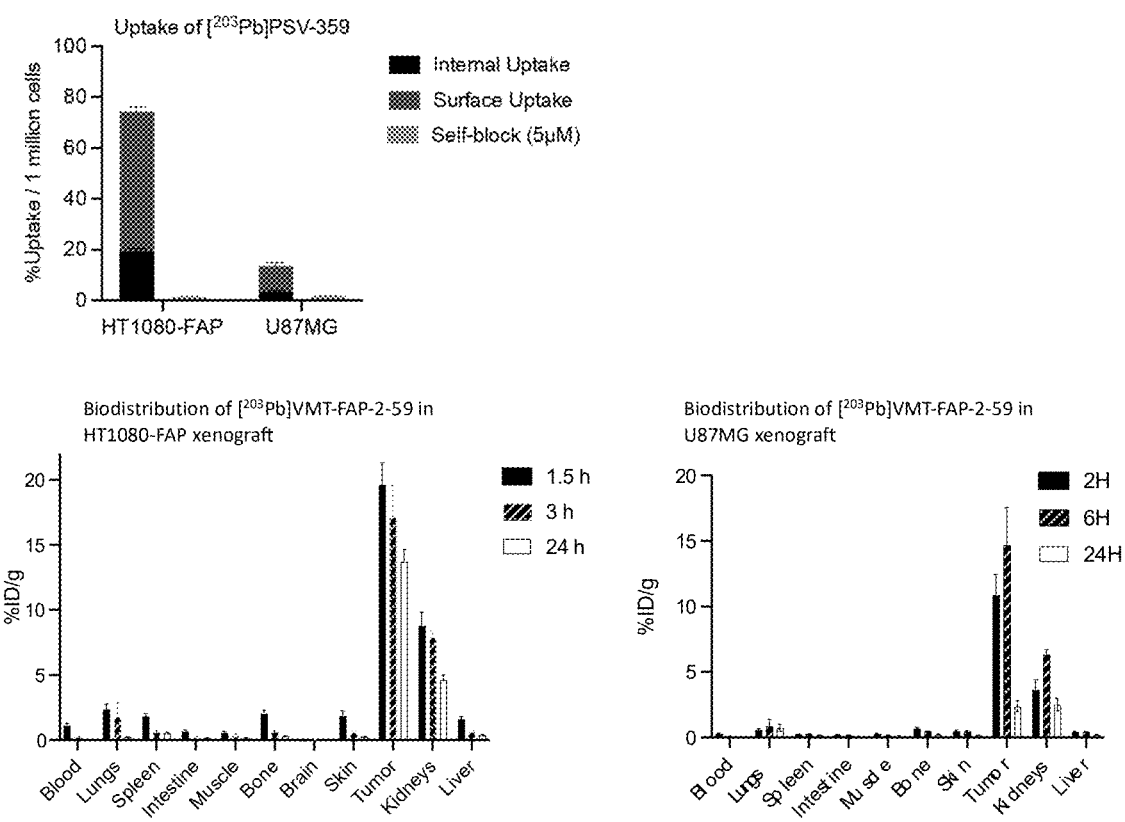
FIG. 57 illustrates the uptake of [$^{203}$Pb]VMT-FAP-2-59 in human cancer cells and human cancer xenograft models in accordance with Example 5.

Biodistribution and Imaging of [$^{203}$Pb]VMT-FAP-2-59 in Human Cancer Xenograft Models In vivo biodistribution of [$^{203}$Pb]VMT-FAP-2-59 was determined in female athymic nude mice bearing hFAP-HT1080 human fibrosarcoma xenograft (n=4 at each timepoint) and in U87MG human glioma xenograft (n=3 at each timepoint) following injection of 74 kBq [$^{203}$Pb]PSV-359 (10-12 MBq/nmole). At each designated timepoint, tumor and organs of interest were harvest, and weighed Radioactivity of [$^{203}$Pb]PSV-359 was measured on automated gamma and normalized to percent of injected dose per gram (% ID/g). Of note, HT1080 human fibrosarcoma cells were engineered to express human FAP on the membrane of the cancer cells, whereas the expression of human FAP on U87MG human glioma cells were limited, as shownen in the in vitro cell binding assays, indicating that the expression of FAP in in vivo U87MG xenograft is located in stroma as mouse FAP. Results were shown in FIG. 57

Figure 58:
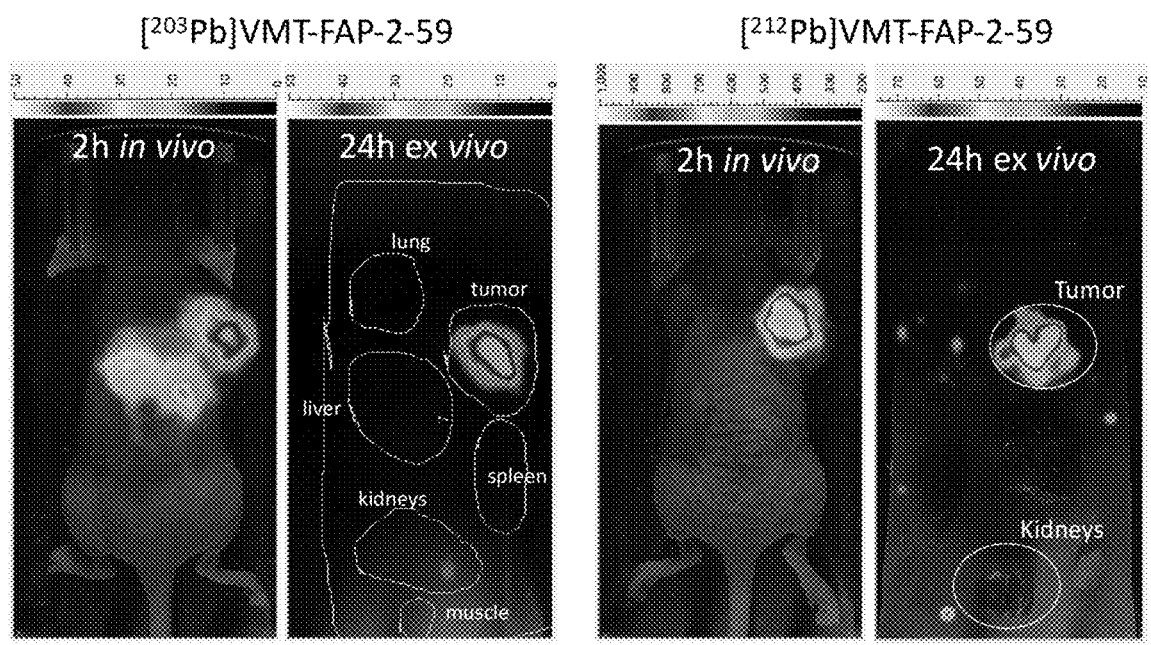
FIG. 58 is Micro-SPECT imaging of [$^{203}$Pb]VMT-FAP-2-59 and [$^{212}$Pb]VMT-FAP-2-59 in hFAP-HT1080 xenograft in athymic nude mice in accordance with Example 5.

Micro-SPECT imaging of hFAP-HT1080 xenograft in athymic nude mice were harvested at 2 h and 24 h post injection of 0.8 MBq [$^{203}$Pb]PSV-359 or 1.2 MBq [$^{212}$Pb] PSV-359. Fast accumulation, rapid clearance and low retention in normal tissues were observed. Results were shown in FIG. 58

Example 6

Figure 59:
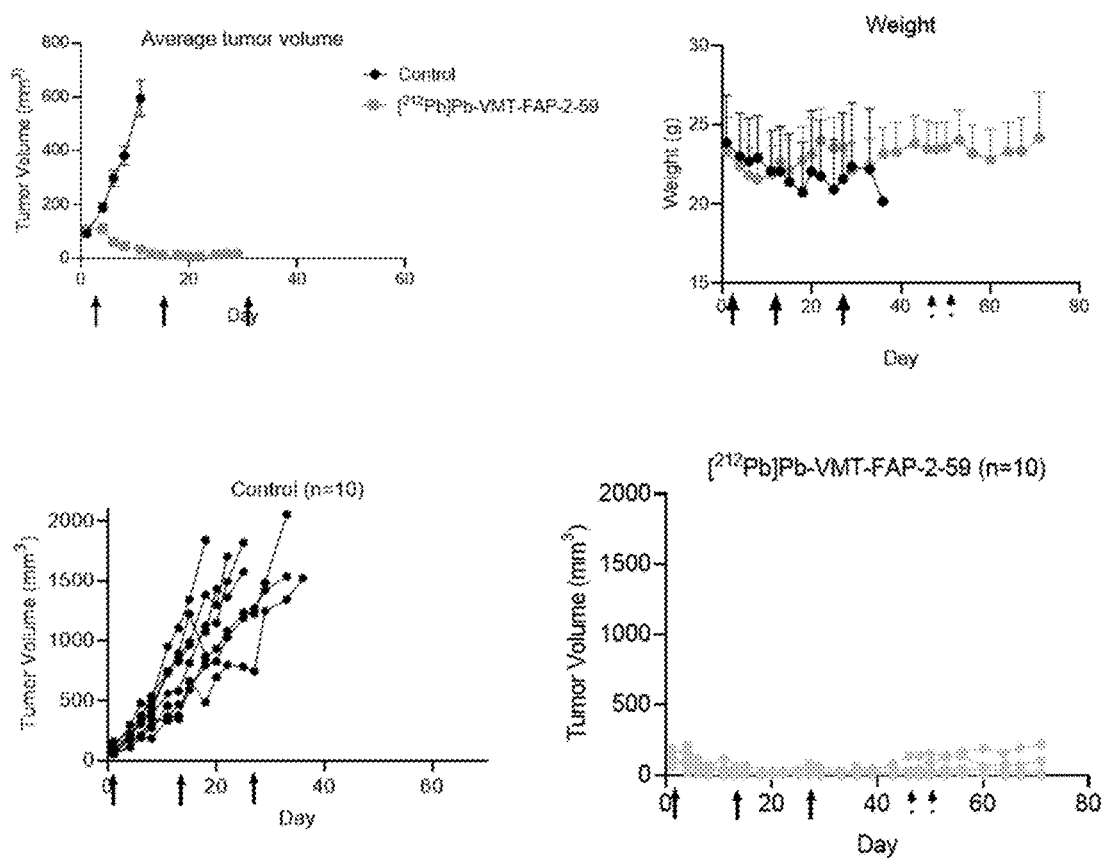
FIG. 59 illustrates the tumor volume and body weight in athymic nude mice bearing fFAP-HT1080 tumors following treatment with [$^{212}$Pb]VMT-FAP-2-59 in accordance with Example 6.

Radiotherapeutic Efficacy of [$^{212}$Pb]-Pb-VMT-FAP-2-59 in a Human Fibrosarcoma Xenograft Model In vivo efficacy was determined in a sarcoma model where hFAP is expressed on the membrane of cancer cell surface. HT1080 cells engineered to express hFAP. 8 days prior to treatment, athymic nude mice were inoculated with approximately 2 million cells. The mice were then randomized by tumor size and divided into two groups for control and treatment. The treated group was treated with 4.5-5.4 MBq [$^{212}$Pb]-Pb-VMT-FAP-2-59 over three fractionated doses approximately 2 weeks apart. Two mice were treated a fourth time, at day 48 and day 53 with an additional 1.9-2.1MBq. Tumor volume was measured via caliper, and weight recorded over 70 days. No treatment-related toxicity was observed. Efficacy of VMT-FAP-2-59 in athymic nude mice bearing HT1080-FAP tumors. Tumor volume and weight was monitored over 70 days. The treatment group was given 4.5-5.4MBq $^{212}$Pb-VMT-FAP-2-59 over 3 fractionated doses. Two mice with tumor recurrence were given an additional 1.9-2.1 MBq, as indicated by dashed arrows. Results were shown in FIG. 59

Example 7

Figure 60:
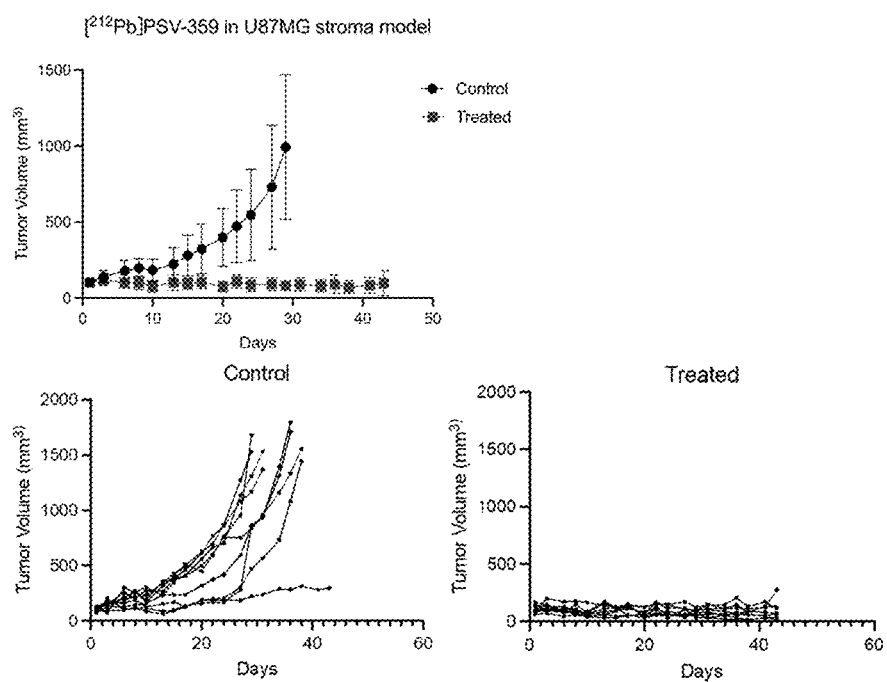
FIG. 60 illustrates the tumor volume in mice bearing U87MG tumors following treatment with [$^{212}$Pb]VMT-FAP-2-59 in accordance with Example 7.

Radiotherapeutic Efficacy of [$^{212}$Pb]Pb-VMT-FAP-2-59 in a Human Glioma Xenograft Model In vivo efficacy was determined in U87MG human glioma xenograft model. In this U87MG xenograft model, FAP is expressed is in stroma as mouse FAP, whereas human FAP expression on U87MG cell surface is limited. 2 million U87MG cells were subcutaneously inoculated athymic nude mice. The mice were then randomized by tumor size and divided into two groups for control and treatment. The treated group was treated with 4.6 MBq [$^{212}$Pb]-Pb-VMT-FAP-2-59 over three fractionated doses approximately 2 weeks apart. Tumor volume was measured via caliper, and weight recorded over 40 days. Following treatment with [$^{212}$Pb]VMT-FAP-2-59, significant inhibition on growth of U87MG tumor xenograft was observed, indicating that [$^{212}$Pb]VMT-FAP-2-59 is capable of suppress tumor growth in tumors that express high level of FAP in stroma but low level of FAP on cancer cells. Results were shown in FIG. 60

It should be appreciated that minor dosage and formulation modifications of the composition and the ranges expressed herein may be made and still come within the scope and spirit of the present invention.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

The foregoing description has been presented for the purposes of illustration and description. It is not intended to be an exhaustive list or limit the invention to the precise forms disclosed. It is contemplated that other alternative processes and methods obvious to those skilled in the art are considered included in the invention. The description is merely examples of embodiments. It is understood that any other modifications, substitutions, and/or additions may be made, which are within the intended spirit and scope of the disclosure. From the foregoing, it can be seen that the exemplary aspects of the disclosure accomplishes at least all of the intended objectives.

The invention claimed is:

1. A fibroblast activation protein (FAP)-targeted conjugate corresponding to either of the following:

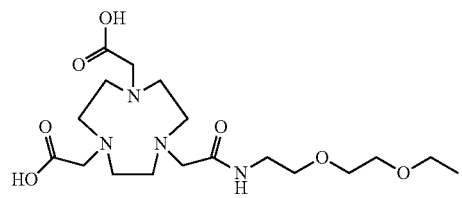

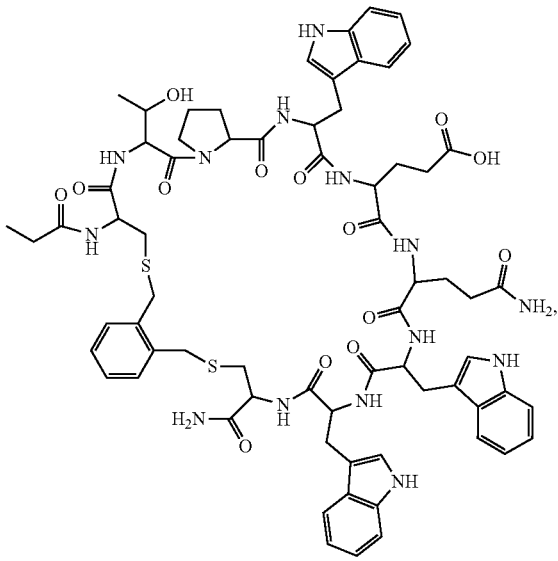

or

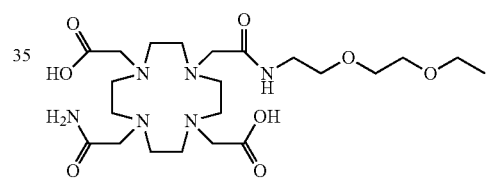

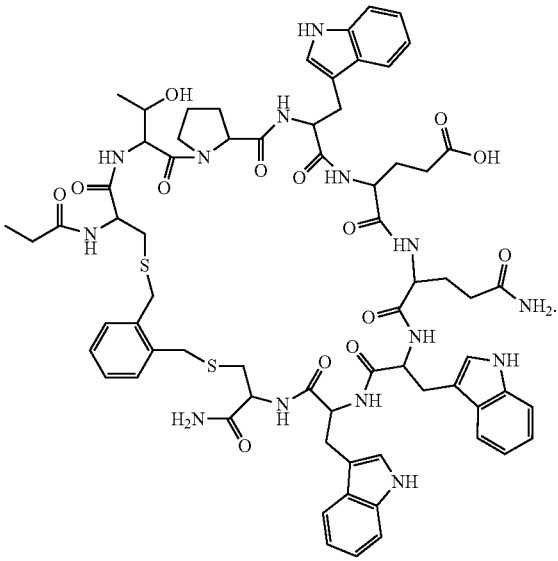

2. The FAP-targeted conjugate according to claim 1, wherein the conjugate is the following:

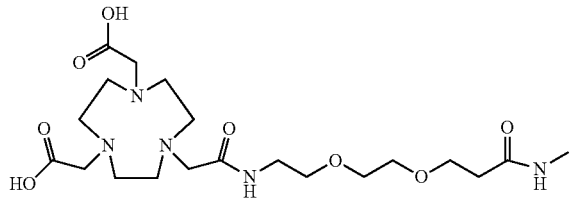

3. The FAP-targeted conjugate according to claim 1, wherein the conjugate is the following:

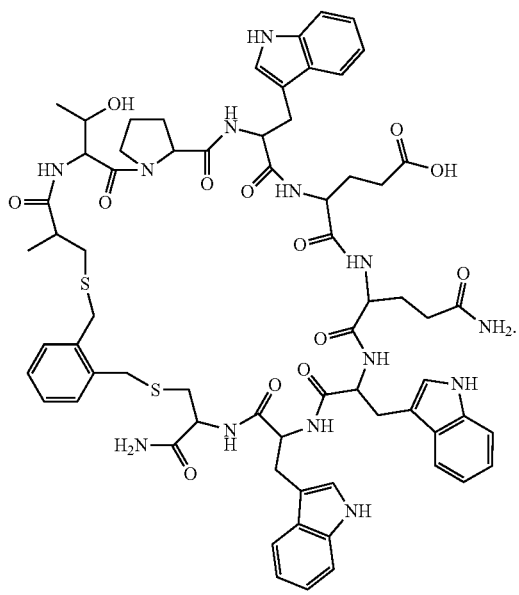

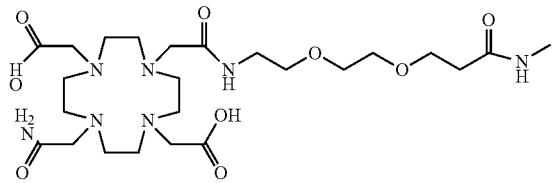

-continued

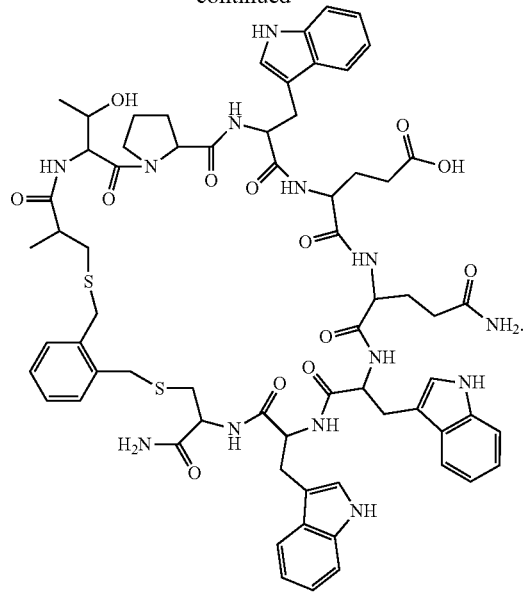

4. The FAP-targeted conjugate according to claim 1, wherein the conjugate is labeled with a radionuclide.

5. The FAP-targeted conjugate according to claim 4, wherein the radionuclide is selected from the group consisting of Sc-43, Sc-44, Mn-51, Cu-64, Ga-67, Ga-68, Y-86, Zr-89, Tc-99m, In-111, I-123, I-124, I-125, Tb-152, Pb-203, Sc-47, Cu-67, Sr-89, Y-90, I-131, Sm-153, Tb-149, Tb-152, Tb-161, Lu-177, Re-186, Re-188, At-211, Pb-212, Bi-212, Ra-223, Ra-224, Ac-225, Bi-213, Th-226, and Th-227.

6. The FAP-targeted conjugate according to claim 5, wherein the radionuclide is selected from the group consisting of Cu-64, Ga-67, Ga-68, Pb-203, Lu-177, At-211, Pb-212, Bi-212, Ra-223, Ra-224, Ac-225, Bi-213, Th-226, and Th-227.

7. A pharmaceutical composition comprising the FAP-targeted conjugate according to claim 1 and a pharmaceutically acceptable carrier, wherein the conjugate is labeled with a radionuclide.

8. The pharmaceutical composition according to claim 7, wherein the composition comprises an injectable or infusible aqueous formulation.

9. The pharmaceutical composition according to claim 7, wherein the composition further comprises any one or more of a sterile diluent for injection, a saline solution, an oil, a polyol, glycerol, a solvent, an antibacterial or antifungal agent, an antioxidant, a chelating agent, a buffer, and an agent for the adjustment of tonicity.

10. The pharmaceutical composition according to claim 7, wherein the composition further comprises any of saline, phosphate buffered saline (PBS), glycerol, propylene glycol, liquid polyethylene glycol, glycerine, a synthetic solvents, a paraben, chlorobutanol, phenol, ascorbic acid, thimerosal, gentisic acid, sodium bisulfite, EDTA, DTPA, DMSA, DMPS, acetates, citrates, phosphates, sodium chloride, mannitol, sorbitol, lecithin and dextrose.

* * * * *